United States Patent
Moshir et al.

(10) Patent No.: US 9,572,033 B2
(45) Date of Patent: Feb. 14, 2017

(54) SYSTEMS AND METHODS FOR ENCRYPTED MOBILE VOICE COMMUNICATIONS

(71) Applicants: Kevin K Moshir, Scottsdale, AZ (US); Sean Moshir, Scottsdale, AZ (US); Ali A Khanban, Scottsdale, AZ (US); Joshua Lindsay, Fountain Hills, AZ (US)

(72) Inventors: Kevin K Moshir, Scottsdale, AZ (US); Sean Moshir, Scottsdale, AZ (US); Ali A Khanban, Scottsdale, AZ (US); Joshua Lindsay, Fountain Hills, AZ (US)

(73) Assignee: CELLTRUST CORPORATION, Scottsdale, AZ (US)

( * ) Notice: Subject to any disclaimer, the term of this patent is extended or adjusted under 35 U.S.C. 154(b) by 196 days.

(21) Appl. No.: 14/514,063

(22) Filed: Oct. 14, 2014

(65) Prior Publication Data
US 2015/0072654 A1    Mar. 12, 2015

Related U.S. Application Data

(63) Continuation of application No. 13/775,008, filed on Feb. 22, 2013, now Pat. No. 8,862,129, and a
(Continued)

(51) Int. Cl.
*G08B 1/08* (2006.01)
*H04W 12/08* (2009.01)
(Continued)

(52) U.S. Cl.
CPC .............. *H04W 12/08* (2013.01); *G06F 21/35* (2013.01); *G06F 21/43* (2013.01); *G06F 21/44* (2013.01);
(Continued)

(58) Field of Classification Search
CPC ...... H04W 12/08; H04W 12/04; H04W 60/00; G06F 21/35; G06F 21/43; G06F 21/44; G06Q 10/10; G06Q 20/12; G06Q 30/00
(Continued)

(56) References Cited

U.S. PATENT DOCUMENTS 3,833,885 A    9/1974  Gentile
5,436,960 A    7/1995  Campana
(Continued)

FOREIGN PATENT DOCUMENTS

EP    1569482    8/2005
EP    1657944    5/2006
(Continued)

OTHER PUBLICATIONS

3GPP Organizational Partners: "3rd Generation Partnership Project, Technical Realization of the Shortm Message Service (SMS)," 3GPP TS 23.010 Release 7.0.0, 2007, pp. 1-7 and 69-107.
(Continued)

*Primary Examiner* — Eric M Blount
(74) *Attorney, Agent, or Firm* — Richard E. Oney; Tiffany & Bosco, P.A.

(57) ABSTRACT

A system for establishing a registration for secure communication between a mobile device and a server includes a server configured to: determine the phone number of the mobile device from which the SMS or MMS message is originated; and verify the phone number of the mobile device originating the SMS or MMS message against a whitelist to authorize a registration between the mobile device and the server. The server can establish an encryption key between the mobile device and the server, which can used to provide or enhance encryption of a voice communication, such as a VoIP communication, made using the mobile device. The server can renew the encryption key
(Continued)

based on one or more policies determined by an administrator. The server can be configured to verify a secure identification code that is input at the mobile device and which can be provided to a user of the mobile device before the mobile device is registered with the server.

12 Claims, 20 Drawing Sheets

Related U.S. Application Data continuation of application No. 13/531,177, filed on Jun. 22, 2012.

(51) Int. Cl.

| | | |
|---|---|---|
| G06F 21/35 | (2013.01) | |
| G06F 21/43 | (2013.01) | |
| G06Q 10/10 | (2012.01) | |
| G06Q 20/12 | (2012.01) | |
| G06Q 30/06 | (2012.01) | |
| G07C 9/00 | (2006.01) | |
| H04L 29/06 | (2006.01) | |
| H04M 3/493 | (2006.01) | |
| H04W 4/12 | (2009.01) | |
| H04W 60/00 | (2009.01) | |
| G06F 21/44 | (2013.01) | |
| H04L 9/08 | (2006.01) | |
| H04W 12/04 | (2009.01) | |
| H04L 9/32 | (2006.01) | |
| H04M 3/42 | (2006.01) | |
| H04W 4/00 | (2009.01) | |
| H04L 29/08 | (2006.01) | |

(52) U.S. Cl.
CPC .............. *G06Q 10/10* (2013.01); *G06Q 20/12* (2013.01); *G06Q 30/06* (2013.01); *G07C 9/00103* (2013.01); *H04L 9/0816* (2013.01); *H04L 9/3215* (2013.01); *H04L 63/083* (2013.01); *H04L 67/02* (2013.01); *H04M 3/4938* (2013.01); *H04W 4/12* (2013.01); *H04W 12/04* (2013.01); *H04W 60/00* (2013.01); *G06F 2221/2111* (2013.01); *H04L 9/3226* (2013.01); *H04L 67/04* (2013.01); *H04M 3/42348* (2013.01); *H04W 4/00* (2013.01)

(58) Field of Classification Search
USPC .......... 340/539.11, 539.13; 455/435.1, 422.1
See application file for complete search history.

(56) References Cited

U.S. PATENT DOCUMENTS

| | | | |
|---|---|---|---|
| 5,625,670 A | 4/1997 | Campana | |
| 5,668,880 A | 9/1997 | Alajajian | |
| 5,812,671 A | 9/1998 | Ross, Jr. | |
| 5,819,172 A | 10/1998 | Campana | |
| 6,041,123 A | 3/2000 | Colvin, Sr. | |
| 6,067,451 A | 5/2000 | Campana | |
| 6,081,601 A * | 6/2000 | Raivisto | H04L 63/0464 380/270 |
| 6,259,909 B1 | 7/2001 | Ratayczak | |
| 6,317,592 B1 | 11/2001 | Campana | |
| 6,493,758 B1 | 12/2002 | McClain | |
| 6,510,325 B1 | 1/2003 | Mack | |
| 6,769,607 B1 | 8/2004 | Pitroda | |
| 6,871,063 B1 | 3/2005 | Schiffer | |
| 6,925,568 B1 | 8/2005 | Heinonen | |
| 6,970,095 B1 | 11/2005 | Lee | |
| 6,988,657 B1 | 1/2006 | Singer | |
| 7,012,503 B2 | 3/2006 | Nielsen | |
| 7,039,708 B1 | 5/2006 | Knobl | |
| 7,050,945 B2 | 5/2006 | Oba | |
| 7,073,200 B2 | 7/2006 | Maliszewski | |
| 7,248,895 B2 | 7/2007 | Shiraogawa | |
| 7,286,818 B2 | 10/2007 | Rosenberg | |
| 7,299,263 B2 | 11/2007 | Claudatos | |
| 7,308,477 B1 | 12/2007 | Gress | |
| 7,394,761 B2 | 7/2008 | Foster | |
| 7,437,146 B2 | 10/2008 | Dudley et al. | |
| 7,537,152 B2 | 5/2009 | Chakiris | |
| 7,565,577 B2 | 7/2009 | Adams | |
| 7,643,821 B2 | 1/2010 | O'Hanlon | |
| 7,649,998 B2 | 1/2010 | Harran | |
| 7,702,898 B2 | 4/2010 | Tan | |
| 7,996,673 B2 | 8/2011 | Ivanov | |
| 8,037,297 B2 | 10/2011 | Pekkala | |
| 8,117,273 B1 | 2/2012 | Mathur | |
| 8,233,901 B2 | 7/2012 | Lee | |
| 8,320,944 B1 | 11/2012 | Gibson et al. | |
| 8,407,780 B2 | 3/2013 | Bandini et al. | |
| 8,463,296 B2 | 6/2013 | Huber et al. | |
| 8,631,227 B2 | 1/2014 | Olechowski et al. | |
| 2001/0003203 A1 | 6/2001 | Mache | |
| 2001/0011250 A1 | 8/2001 | Paltenghe | |
| 2002/0016175 A1 | 2/2002 | Marce | |
| 2002/0086656 A1 | 7/2002 | Mattison | |
| 2002/0088853 A1 | 7/2002 | Itoh | |
| 2002/0107745 A1 | 8/2002 | Loeser | |
| 2002/0116345 A1 | 8/2002 | Harrison | |
| 2002/0133557 A1 | 9/2002 | Winarski | |
| 2002/0161476 A1 | 10/2002 | Panofsky | |
| 2002/0165926 A1 | 11/2002 | Rensin | |
| 2002/0186845 A1 | 12/2002 | Dutta | |
| 2003/0022655 A1 | 1/2003 | Bogat | |
| 2003/0043036 A1 | 3/2003 | Merrem | |
| 2003/0109271 A1 | 6/2003 | Lewis et al. | |
| 2003/0115288 A1 | 6/2003 | Ljubicich | |
| 2003/0120957 A1 | 6/2003 | Pathiyal | |
| 2003/0144793 A1 | 7/2003 | Melaku et al. | |
| 2003/0153302 A1 | 8/2003 | Lewis et al. | |
| 2003/0169151 A1 | 9/2003 | Ebling | |
| 2003/0182559 A1 | 9/2003 | Curry et al. | |
| 2003/0204720 A1 | 10/2003 | Schoen et al. | |
| 2003/0224766 A1 | 12/2003 | Stockhammer | |
| 2003/0233409 A1 | 12/2003 | Awada | |
| 2004/0075594 A1 | 4/2004 | Kuo | |
| 2004/0117262 A1 | 6/2004 | Berger | |
| 2004/0124966 A1 | 7/2004 | Forrest | |
| 2004/0127256 A1 | 7/2004 | Goldthwaite | |
| 2004/0147270 A1 | 7/2004 | Petrovich | |
| 2004/0192274 A1 | 9/2004 | Vuori | |
| 2004/0204041 A1 | 10/2004 | Fillebrown | |
| 2004/0225565 A1 | 11/2004 | Selman | |
| 2005/0015451 A1 | 1/2005 | Sheldon | |
| 2005/0055578 A1 | 3/2005 | Wright | |
| 2005/0064814 A1 | 3/2005 | Matsuo | |
| 2005/0086261 A1 | 4/2005 | Mammone | |
| 2005/0096117 A1 | 5/2005 | Katz | |
| 2005/0114671 A1 | 5/2005 | Little | |
| 2005/0120230 A1 | 6/2005 | Waterson | |
| 2005/0160062 A1 | 7/2005 | Howard | |
| 2005/0187873 A1 | 8/2005 | Labrou | |
| 2005/0187882 A1 | 8/2005 | Sovio | |
| 2005/0192008 A1 | 9/2005 | Desai | |
| 2005/0221792 A1 | 10/2005 | Matthison | |
| 2005/0221800 A1 | 10/2005 | Jackson | |
| 2005/0222961 A1 | 10/2005 | Staib | |
| 2005/0238149 A1 | 10/2005 | De Leon | |
| 2005/0250538 A1 | 11/2005 | Narasimhan | |
| 2005/0280546 A1 | 12/2005 | Ganley et al. | |
| 2005/0282521 A1 | 12/2005 | Hermann | |
| 2006/0009234 A1 | 1/2006 | Freer | |
| 2006/0031328 A1 | 2/2006 | Malik | |
| 2006/0043201 A1 | 3/2006 | Vesikivi | |
| 2006/0052055 A1 | 3/2006 | Rowse | |
| 2006/0080232 A1 | 4/2006 | Epps | |
| 2006/0098805 A1 | 5/2006 | Tischer | |

(56) References Cited

U.S. PATENT DOCUMENTS

| | | |
|---|---|---|
| 2006/0099976 A1 | 5/2006 | Coskun |
| 2006/0117104 A1 | 6/2006 | Taniguchi |
| 2006/0120348 A1 | 6/2006 | Croak |
| 2006/0168657 A1 | 7/2006 | Baentsch |
| 2006/0180660 A1 | 8/2006 | Gray |
| 2006/0190729 A1 | 8/2006 | Uchida |
| 2006/0194572 A1 | 8/2006 | Fresonke et al. |
| 2006/0199598 A1 | 9/2006 | Lee |
| 2006/0223530 A1 | 10/2006 | Bumiller |
| 2006/0240806 A1 | 10/2006 | Demirbasa |
| 2006/0240809 A1 | 10/2006 | Yu |
| 2006/0258289 A1 | 11/2006 | Dua |
| 2007/0032225 A1 | 2/2007 | Konicek |
| 2007/0046477 A1 | 3/2007 | Kolo et al. |
| 2007/0129113 A1 | 6/2007 | Klicpera |
| 2007/0129144 A1 | 6/2007 | Katz |
| 2007/0130476 A1* | 6/2007 | Mohanty .............. H04L 63/068 713/191 |
| 2007/0202806 A1 | 8/2007 | Kim |
| 2007/0202897 A1 | 8/2007 | Smith |
| 2007/0208942 A1 | 9/2007 | May |
| 2007/0224980 A1 | 9/2007 | Wakefield |
| 2007/0232332 A1 | 10/2007 | Holur |
| 2007/0249375 A1 | 10/2007 | Zapata |
| 2007/0255620 A1 | 11/2007 | Tumminaro |
| 2007/0262862 A1 | 11/2007 | Barrett et al. |
| 2008/0014869 A1 | 1/2008 | Demirbasa |
| 2008/0019530 A1 | 1/2008 | Eldridge |
| 2008/0022418 A1 | 1/2008 | Wei |
| 2008/0058057 A1 | 3/2008 | Lau |
| 2008/0085728 A1 | 4/2008 | Reding |
| 2008/0094230 A1 | 4/2008 | Mock et al. |
| 2008/0096590 A1 | 4/2008 | Celik |
| 2008/0148042 A1 | 6/2008 | Brown |
| 2008/0171536 A1 | 7/2008 | Katz |
| 2008/0178300 A1 | 7/2008 | Brown |
| 2008/0292101 A1 | 11/2008 | Macchi |
| 2008/0300024 A1 | 12/2008 | Sweeney |
| 2009/0021350 A1 | 1/2009 | Hatta et al. |
| 2009/0060198 A1 | 3/2009 | Little |
| 2009/0075630 A1 | 3/2009 | McLean |
| 2009/0113543 A1 | 4/2009 | Adams |
| 2009/0163140 A1 | 6/2009 | Packham |
| 2009/0257593 A1 | 10/2009 | Losovsky |
| 2009/0265552 A1* | 10/2009 | Moshir .............. H04L 63/0464 713/168 |
| 2010/0002685 A1 | 1/2010 | Shaham et al. |
| 2010/0002686 A1* | 1/2010 | Rosenberg .......... H04L 63/0807 370/352 |
| 2010/0070448 A1 | 3/2010 | Omoigui |
| 2010/0128857 A1 | 5/2010 | Logan |
| 2010/0159962 A1 | 6/2010 | Cai |
| 2010/0197326 A1 | 8/2010 | Ngo |
| 2010/0217979 A1 | 8/2010 | Yaghmour |
| 2011/0070898 A1 | 3/2011 | Sanjeev et al. |
| 2011/0222688 A1 | 9/2011 | Graham et al. |

FOREIGN PATENT DOCUMENTS

| | | |
|---|---|---|
| FR | 2863811 | 6/2005 |
| GB | 2399670 | 9/2004 |
| JP | 2002279320 | 9/2002 |
| WO | WO9935784 | 7/1999 |
| WO | WO0178491 | 10/2001 |
| WO | WO2004075594 | 9/2004 |
| WO | WO2006007879 | 1/2006 |

OTHER PUBLICATIONS

Chen et al., "Short-range Wireless Technologies with Mobile Payments Systems," http://doi.acm.org/10.1145/1052220.1052302, XX/XX/2004, p. 649-656.

Noll et al., "Business through Mobile Phone initiated Near Field Communication," http://jnoll.homelinux.org/jnoll/ref/200505NUf-NFC-Mobile-Noll-Calvet.pdf, Nov. 5, 2005, p. 1-29.

James Lee, "NFC (Near Field Communication) technology + mobile phones=Interesting potential uses," http://jnoll.homelinux.org/jnoll/ref/200505NUf-NFC-Mobile-Noll-Calvet.pdf, Feb. 1, 2006, p. 1-6.

Sharp, Duncan Scott. "Adapting Ad Hoc Network Concepts to Land MOBilE Radio Systems." Masters Thesis submitted to Simon Fraser University. Published Dec. 2002. [retrieved on May 16, 2008]. Retrieved from the internet <URL:htlp:llwww.ensc.sfu.caHjilja/cnVpdffduncan.pdf>, p. 1-98.

Written Opinion of the Infl Searching Authority; Infl Search Report Jun. 26, 2008, p. 1-10 for PCT International Applicalion No. PCT/US08J55494.

Written Opinion of the Inn searching Authority; Infl Search Report. Feb. 15, 2008, p. 1-14 for PCT International Application No. PCT/US07112436.

PhoneFactor News. Two-Factor Authentication IMthout Tokens: Positive Networks Debuts PhoneFactorTM, May 22, 2007, htlp:llwww.phonefactor.comlnewsltow-fador-aulhenlication-without-tokens-positive-networks, p. 1-4, Overland, Park, KS.

Realwire From Webitpr, Clickatell Partners with RSA, The Security Division of EMC. to Provide Global Enterprise Customers with On-Demand Authentication using Cell Phones, May 27, 2008, hllp:/www.webitpr.comJ 0release_detail.asp7ReleaseID=8755, p. 1, Redwood City, CA.

CellTrust: "CellTrust Corporation Launches Worldwide Availability of SecureSMS Gateway at Mobile World Congress 2008" Press Release, Feb. 6, 2008.

Hassinen, M.; "SafeSMS—end-to-end encryption for SMS" Telecommunications 2005. Contel 2005. Proceedings of 2 the 9th Internet Ional Conference on Zagreb, Croatia Jun. 15-17, 2005, Piscataway, NJ, IEEE vol. 2, Jun. 15, 2005 pp. D359-D365.

Hassinen, M.; "Java based Public Key Infrastructure for SMS Messaging" [online] Apr. 28, 2006, p. 1-6.

Circletech: "Security of SMS Communication" [online] Jul. 4, 2007.

Toorani, M, et al.; "A Secure SMS Messaging Protocol for the M-Payment Systems," Department of Electrical Engineering Iran University of Science and Technology, IEEE 2008, Retrieved online Feb. 10, 2009.

Toorani, M, et al.: "Review of Security of Short Message Service," College of Electrical Engineering, University of Alem O Saanat of Iran and Apadana Research and Lab, Educational Paper, 2008, pp. 1-16.

* cited by examiner

FIG. 14: the codec switcher (codec hot-swap)

SYSTEMS AND METHODS FOR ENCRYPTED MOBILE VOICE COMMUNICATIONS

RELATED APPLICATION AND PRIORITY CLAIM

This patent application is a Continuation patent application of and claims priority to U.S. patent application Ser. No. 13/775,008, filed on Feb. 22, 2013, and entitled "Systems And Methods For Encrypted Mobile Voice Communications," which is incorporated herein in its entirety by this reference and which is a Continuation patent application of and claims priority to U.S. patent application Ser. No. 13/531,177, filed on Jun. 22, 2012, and entitled "Methods To Authenticate Access And Alarm As To Proximity To Location," which is incorporated herein in its entirety by this reference and which claims the benefit of U.S. Provisional Application No. 61/602,072, filed Feb. 22, 2012, and entitled "Systems And Methods For Encrypted Mobile Voice Communications," which is incorporated herein in its entirety by this reference.

BACKGROUND

This invention relates to systems and methods for managing mobile voice communications and information, including personal information. More particularly, the invention relates to systems and methods for transmitting, receiving, encrypting, storing, and the like, of encrypted mobile voice communications and of personal information. Specific embodiments and methods of the invention relate to wireless communication, cellular telephony, Internet-based systems and methods, software, computers, or a combination thereof for sending, receiving, and storing short messaging service (SMS) messages and multimedia messaging service (MMS) messages and mobile voice communications in an encrypted and secure manner.

Mobile voice communications are vulnerable to security breaches of the voice communications, unauthorized access to the voice communications, and other problems. Incorporation of mobile devices (often using disparate mobile phone networks and operating systems) into the information technology (IT) infrastructure of a business or enterprise has proven to be problematic with regard to both integration and security. For example, mobile devices can carry important information (and data) and communication on the mobile device can create a security leak of the information (and data) on the mobile device. Voice communication on a mobile device can be eavesdropped by a third party to the mobile device and the mobile phone network (e.g., hackers of the mobile phone network, employees, consultants, or vendors of the operators of the mobile phone network, or anyone else or anything else having access to the communication between the mobile device and the mobile phone network, such as tower operators, infrastructure providers, and backhaulers). As a result, there is a need for end-to-end mobile voice communications that are also encrypted. Additionally, the enforcement of regulated and/or proprietary informational policy on the mobile voice communications that are relayed on mobile phone networks has proven difficult. This is so because these types of communications between members of an organization and/or one or more members of an organization and their clients are external to an IT controlled environment (where an IT controlled environment is more secure). Standard mobile voice communications are not adequately (or end-to-end) encrypted, and are thus vulnerable to interception and other unauthorized access. Also, standard mobile voice communications have weak encryption, the encryption is compromised, or the encryption does not prevent service providers (such as mobile phone network operators and/or their vendors) from eavesdropping on the mobile voice communication. Vulnerabilities associated with the security of communicating proprietary and regulated information between members of organizations and/or enterprises using their mobile devices can lead to loss of revenue and/or fines associated with regulatory non-compliance.

In addition, mobile voice over IP communications that are encrypted are vulnerable when using SSL (Secure Sockets Layer) or TLS (Transport Layer Security) due to different problems. These problems include one or more man-in-the-middle (MITM) attacks, exploitation of root certificate authority, the need for reliance upon a pre-shared key for encryption, and/or forged certificate concerns related to getting a hold of the root certificate. A MITM attack in cryptography and computer security uses eavesdropping. A MITM attacker contacts users and communicates messages between the users, making the users believe that they are directly communicating with each other over a private connection. However, their communication or conversation is controlled by the MITM attacker. The need for reliance upon a pre-shared key (pre-defined and pre-shared) for encryption introduces challenges or failures for renewing of the pre-shared key. Furthermore, the encryption employed by various iterations of SSL is not secure enough (e.g., the bit encryption may be low for adequate encryption).

Moreover, as the number of subscribers of mobile devices and mobile services has grown, usage (e.g., transmission and reception) of mobile voice communications has greatly increased and throughput demand and bandwidth demand on the mobile phone network have increased at a higher rate than capacity. As the result, optimal throughput or bandwidth on the mobile phone network may not always be available for mobile voice communications.

This invention provides, among other things, a number of methods and embodiments to address the issues of security vulnerabilities, integrating the mobile devices that are not a part of the IT infrastructure into the IT infrastructure of a business or enterprise, throughput optimization on the mobile phone network, and the management of mobile devices, IT integration, and policy administration.

Potential for improvement exists in these and other areas that may be apparent to a person of skill in the art having studied this document.

SUMMARY

The contents of this summary section are provided only as a simplified introduction to the disclosure, and are not intended to be used to limit the scope of the appended claims.

In accordance with the purposes of the invention as embodied and broadly described in this document, there is provided a system for establishing a registration for secure communication between a mobile device and a server. The system includes a server configured to: receive a short messaging service (SMS) or multimedia messaging service (MMS) message originated from a mobile device; determine the phone number of the mobile device from which the SMS or MMS message is originated; and verify the phone number of the mobile device originating the SMS or MMS message against a whitelist to authorize a registration between the mobile device and the server. The server can be configured to establish an encryption key between the mobile device and the server, which key can be used to provide or enhance encryption of a voice communication made using the mobile device. The voice communication can be a Voice over Internet Protocol (VoIP) communication. The server can be configured to: renew the encryption key based on one or more policies determined by an administrator of the server; take one or more affirmative steps to facilitate routing of one or more messages between the mobile device and the server; and/or verify a secure identification code that is input at the mobile device. The secure identification code can be provided to a user of the mobile device before the mobile device is registered with the server, such as via an administrator of the server.

According to another aspect of the invention, the server can be configured to: measure network conditions of a mobile phone network used by the mobile device; and based on the measured network conditions, select a suitable codec for handling at least one of secure calls, conferencing, video, audio, multimedia and streaming on the mobile phone network.

Also according to the invention, there is provided a system for establishing a registration between a server and a VoIP application on a mobile device having an associated phone number. The system includes a mobile device is configured to: use a server encryption key to encrypt registration information, wherein the registration information includes at least one of an encryption key for a VoIP application and a secure identification code known to a server and provided to a user of the mobile device; and use an SMS or MMS message to send the encrypted registration information from the mobile device to the server, wherein the SMS or MMS message is originated at the mobile device and provides to the server the telephone number associated with the mobile device for comparison to telephone numbers known to the server. In this configuration, the encrypted registration information can be decrypted at the server. The encryption can be symmetric or asymmetric encryption, and the secure identification code can be provided to the user of the mobile device via an administrator of the server.

According to another aspect of the invention, the server can be configured to verify at least one of the secure identification code and phone number associated with the mobile device and to send to the mobile device an encryption key for communication between the server and the VoIP application on the mobile device.

Also according to the invention, there is provided a system of secure mobile voice communication over a mobile phone network. The system includes a server configured to communicate with a mobile device. The mobile device is configured to send an SMS or MMS message to the server, wherein the SMS or MMS message is originated at the mobile device and thereby provides the phone number of the mobile device to the server so that it can be compared against a whitelist to authenticate the mobile device. The server is configured to establish an encryption key for the purpose of communication between the voice communication application on the mobile device and the server. The voice communication application can include a VoIP application. The mobile device can be configured to send to the server a secure identification code associated with the user, and the server can be configured to use secure identification code to authenticate the user.

Also according to the invention, a system is provided for establishing a registration for secure communication between a server and an application on a mobile device. The system includes a software module configured to run as an application on a mobile device, wherein the mobile device has an associated phone number and the software module is configured to encrypt an SMS message or an MMS message via an encryption. The application is configured to create registration information including at least one of a secure identification code and an encryption key for encrypted communication between a server and the application. The mobile device is configured to send to the server a first SMS or MMS message originated by the mobile device and to thereby reveal the phone number to the server. The server is configured to verify the phone number of the mobile device originating the SMS or MMS message against a whitelist to authorize a registration between the mobile device and the server. The mobile device is configured to, if the registration is authorized, receive a code sent by the server to the application on the mobile device via a second SMS message or MMS message. Also, the mobile device is configured to, without user intervention, extract the code from the second SMS or MMS message and send at least one of the registration information and the code to the server. The registration information can include an encryption key for encrypting the second SMS or MMS message before being sent by the server. The application can be configured to use a server public key to encrypt the registration information and the server can be configured to decrypt the registration information using a server private key. The application can be downloaded to the mobile device via a mobile network.

According to another aspect of the invention, there is provided a system for VoIP communication over a mobile phone network. The system includes a server configured to communicate with a mobile device having a VoIP application on the mobile device. The server is configured to send a message to the mobile device when there is a phone call waiting to connect to the mobile device. The message includes at least one of an SMS message, an MMS message and a push notification; and the message includes information to cause the mobile device to contact the server to receive the phone call.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention. The drawings illustrate, among other things, various particular examples of embodiments, and certain examples of characteristics thereof. Different embodiments include various combinations of elements or acts shown in the drawings, described herein, known in the art, or a combination thereof.

Figure 4:
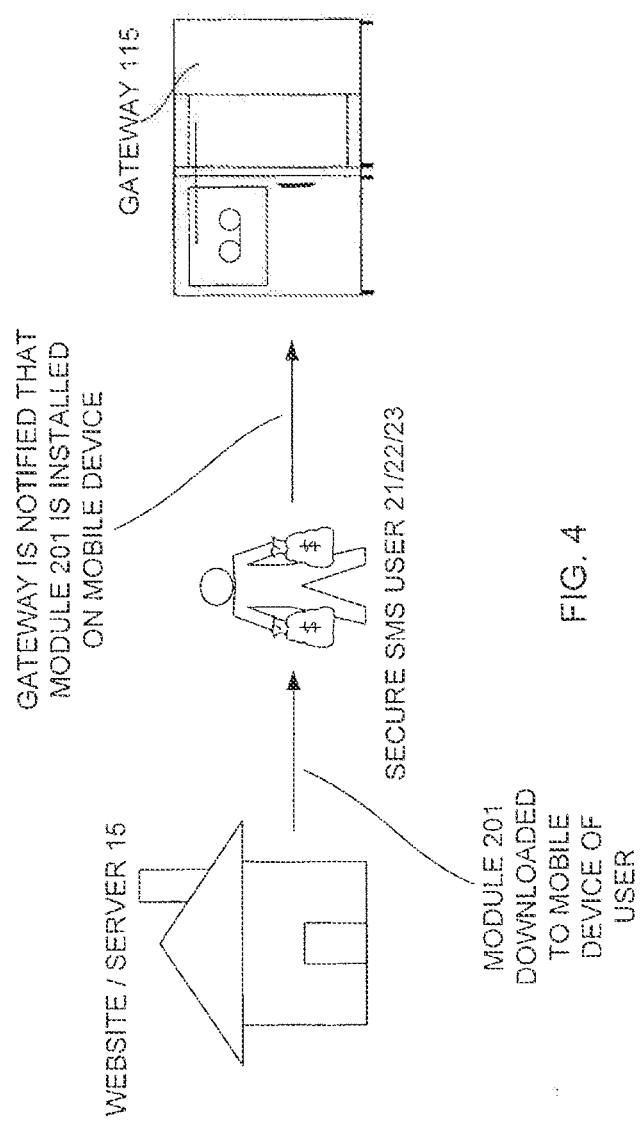
Figure 4A:
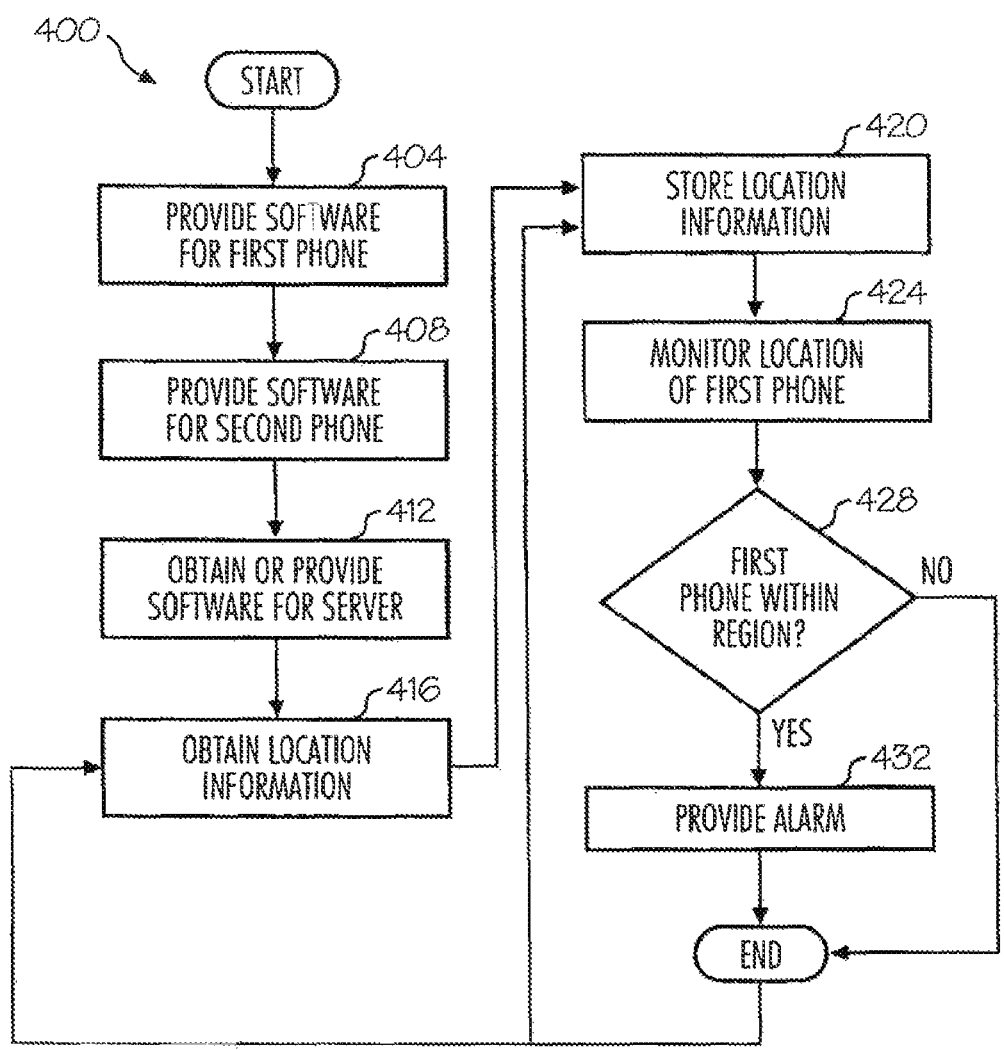
Figure 5:
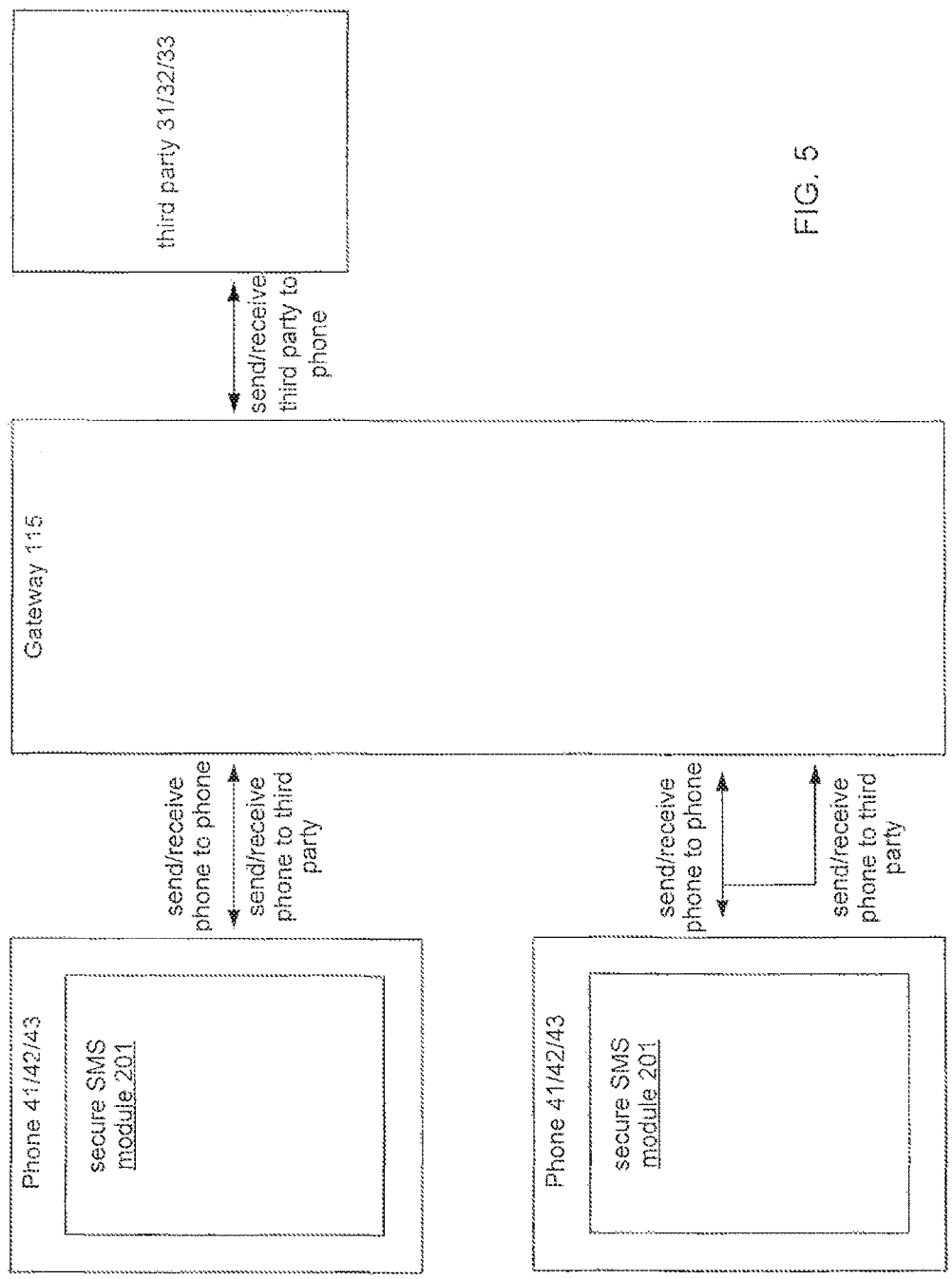
Figure 6:
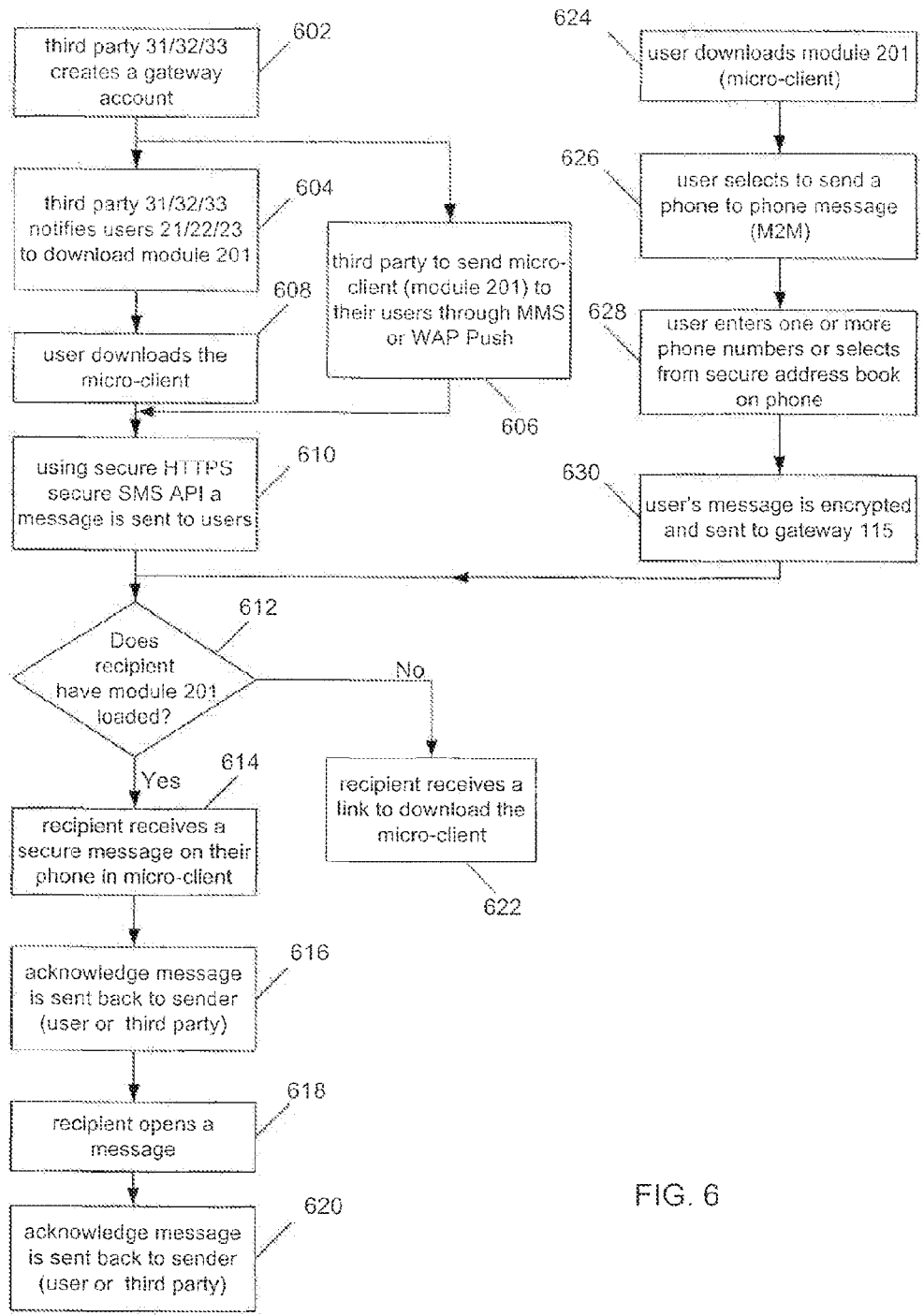
Figure 7:
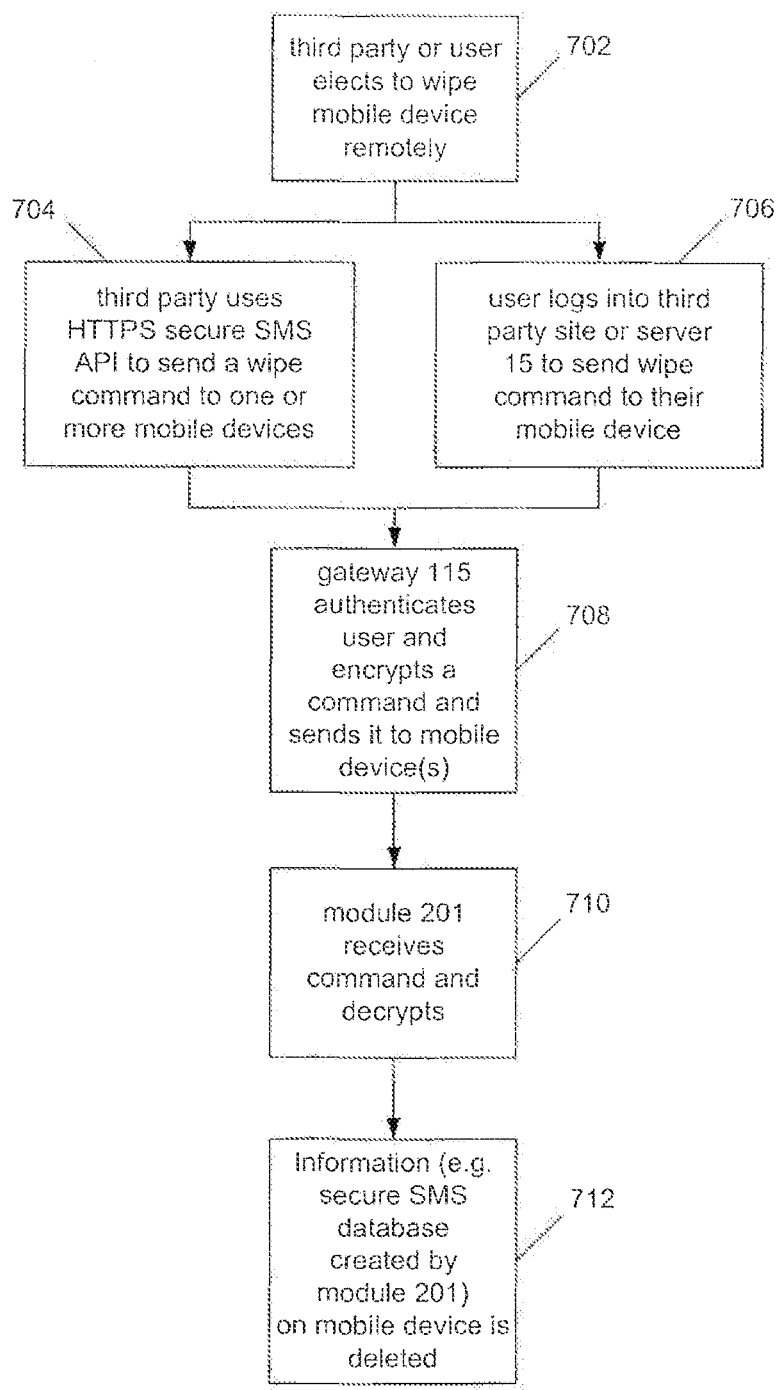
Figure 8:
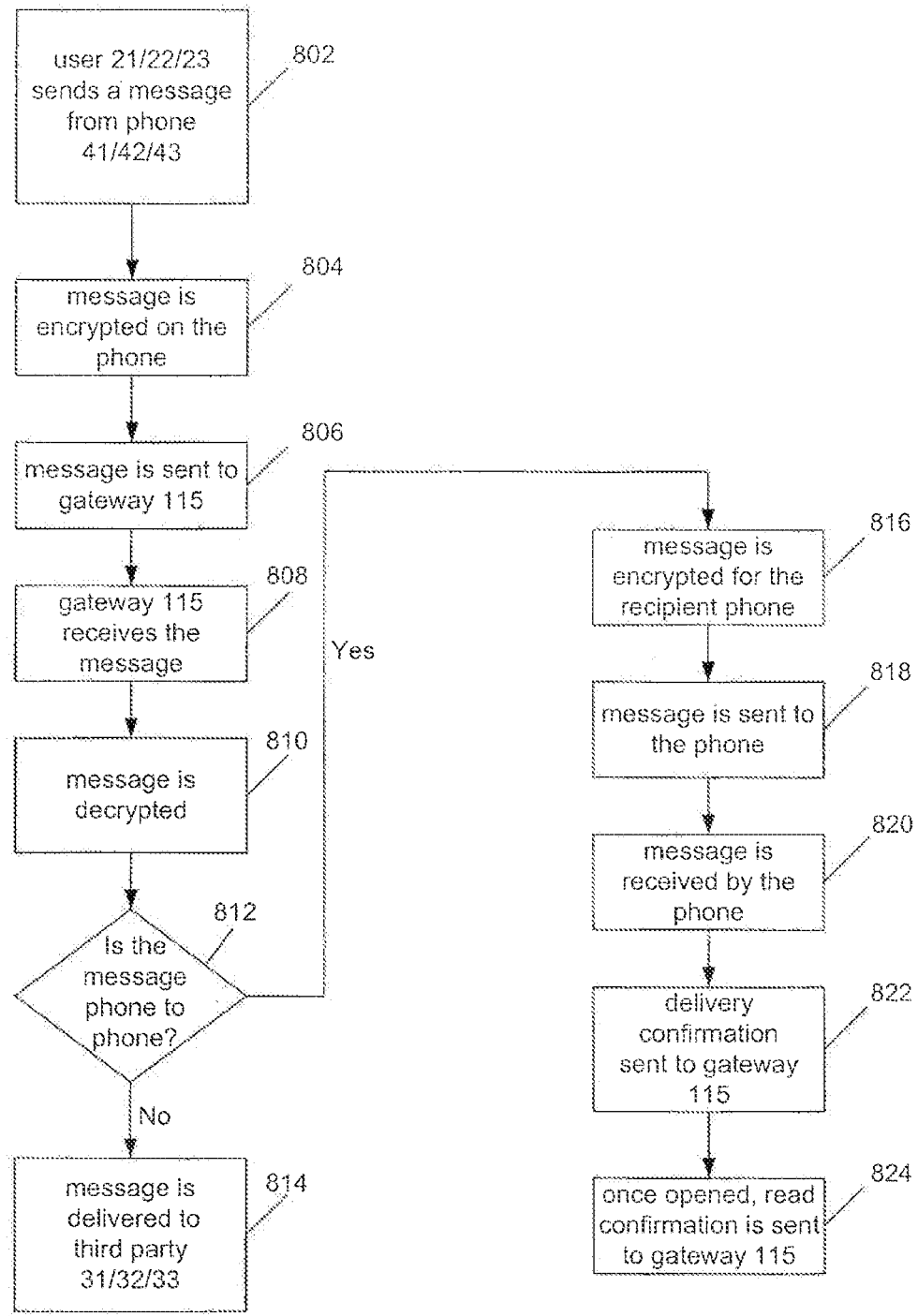
Figure 9:
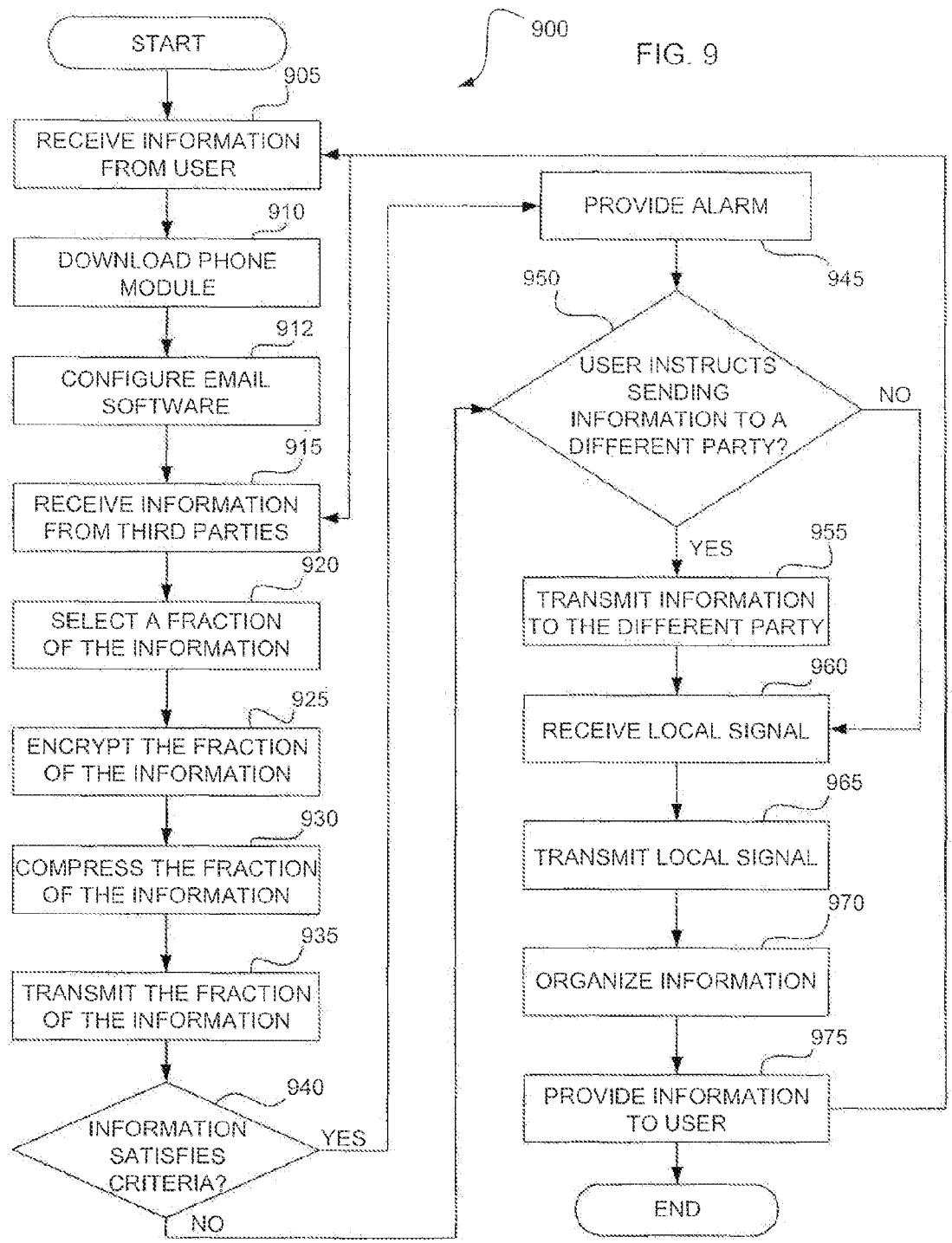
Figure 10:
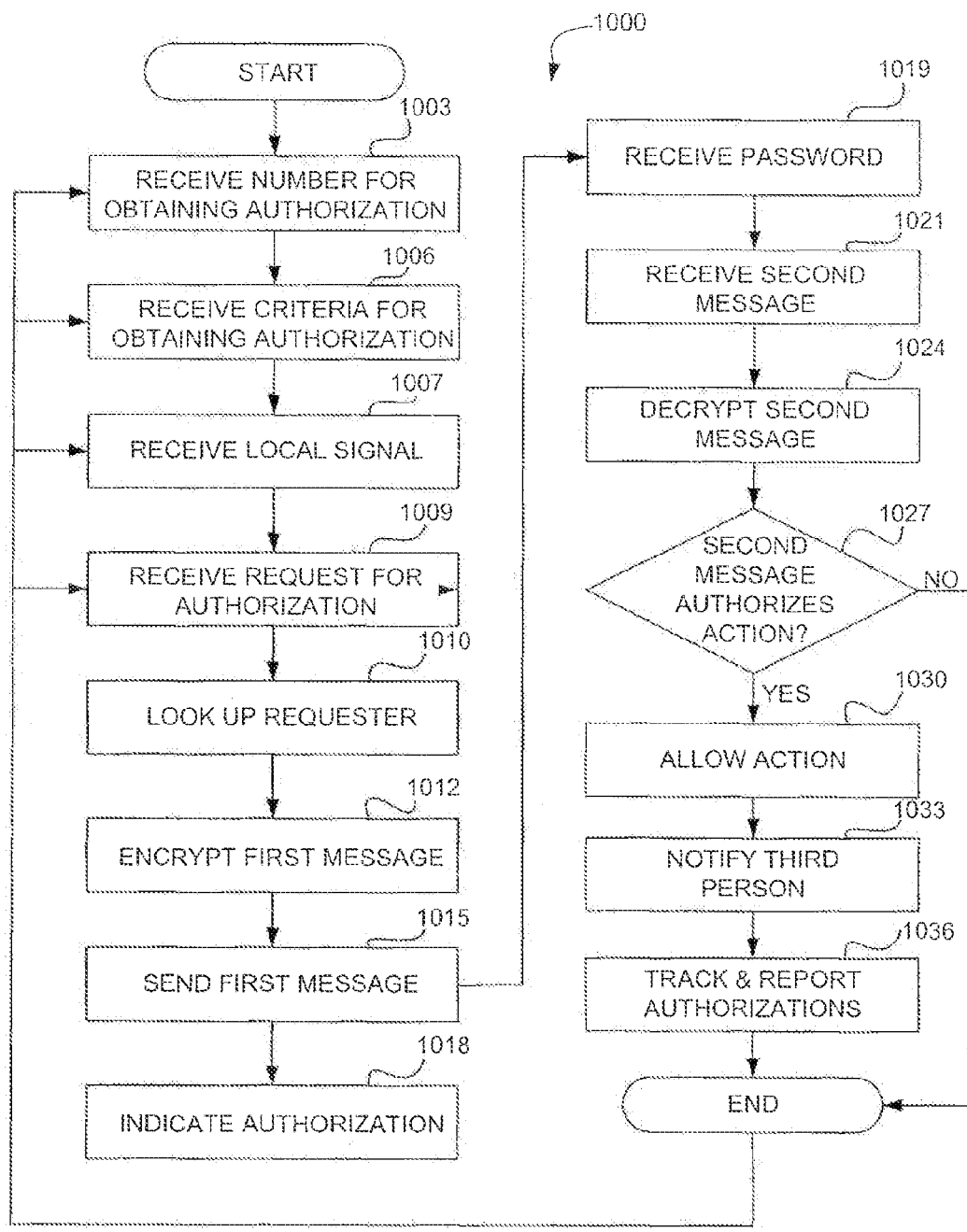
Figure 11:
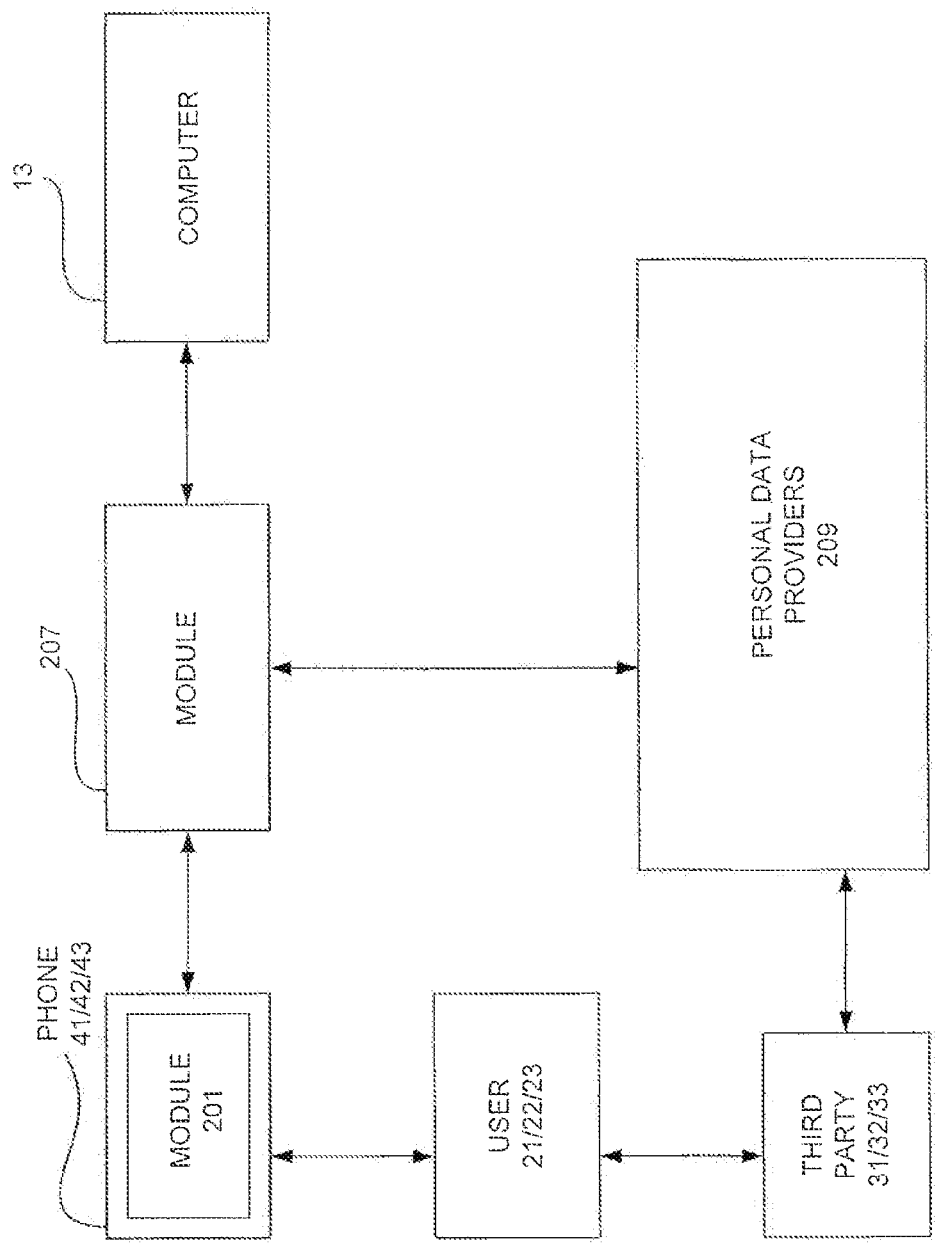
Figure 12:
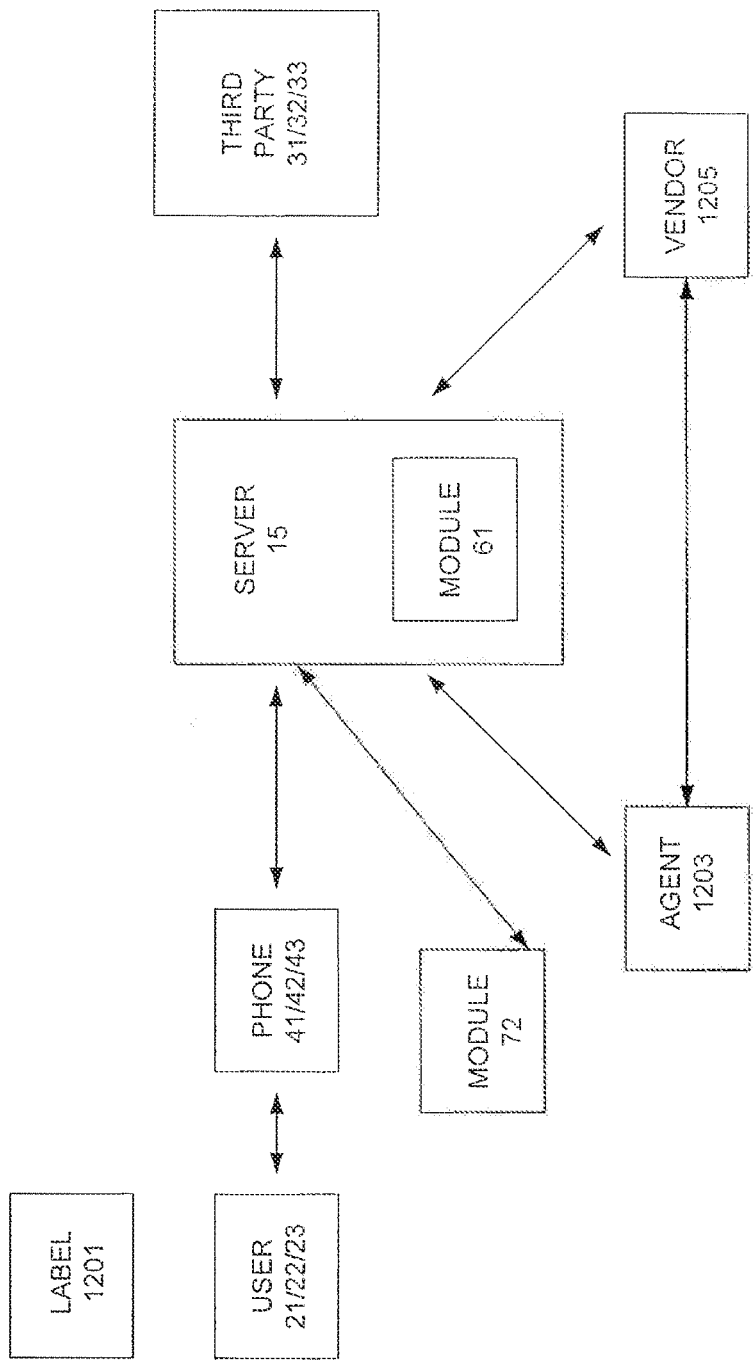
Figure 13:
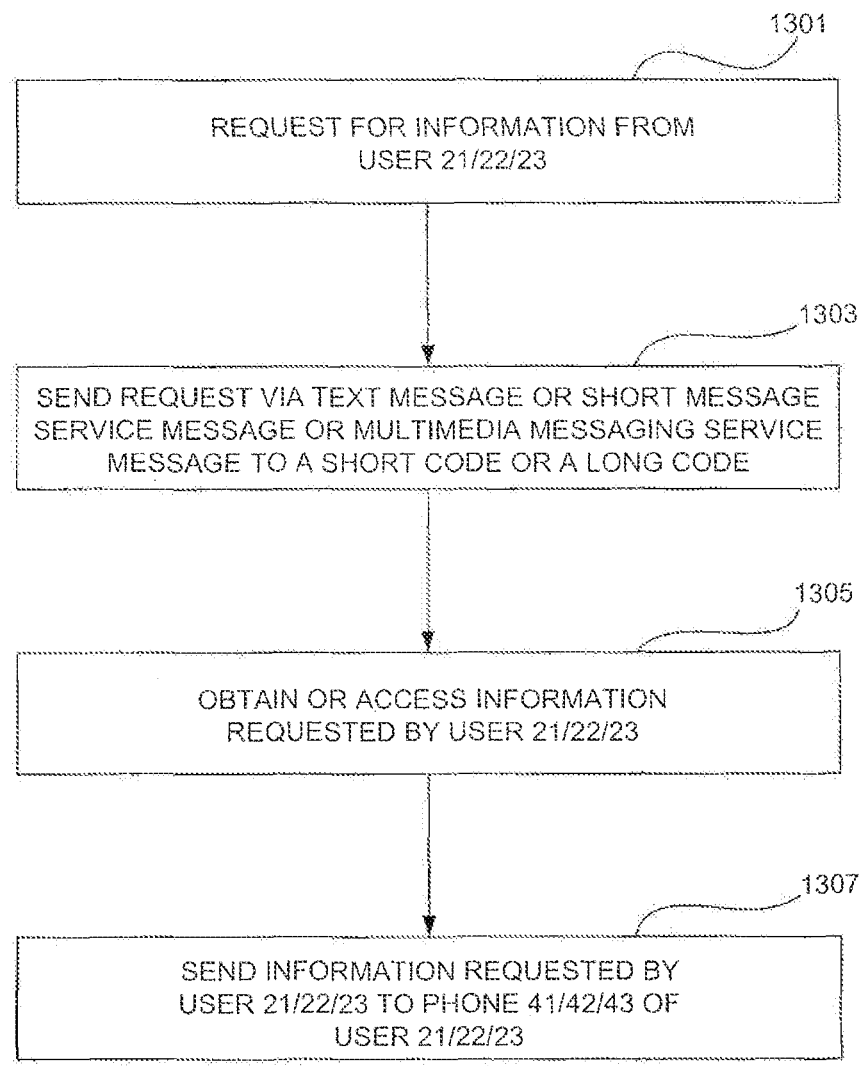
Figure 14:
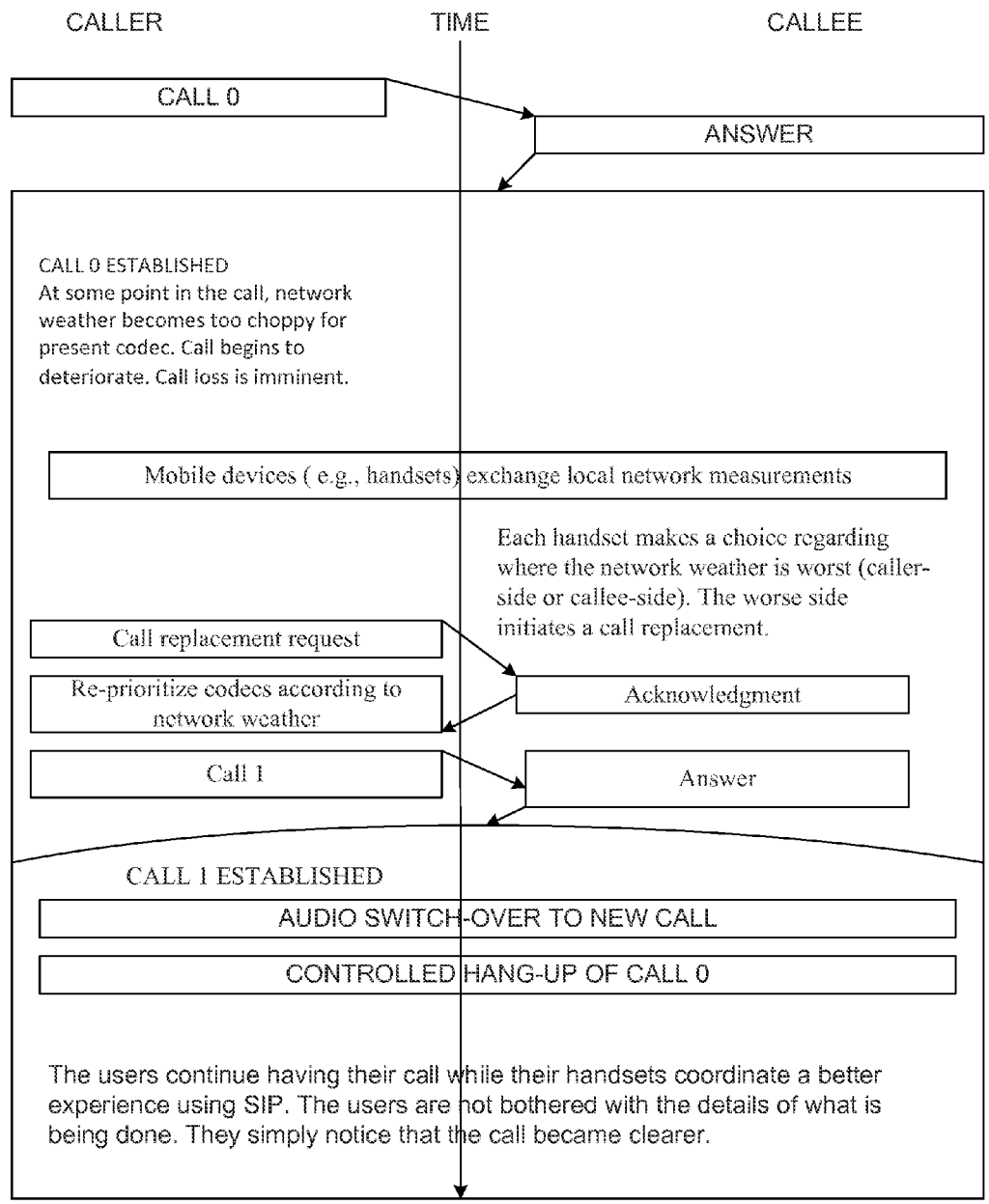
Figure 15:
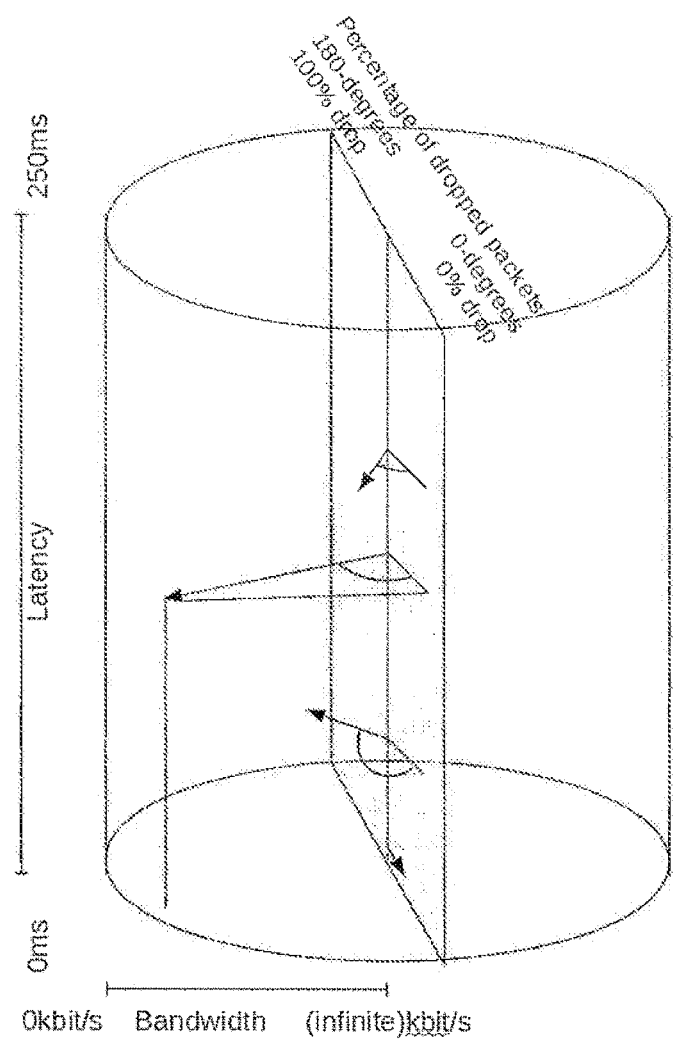
Figure 16:
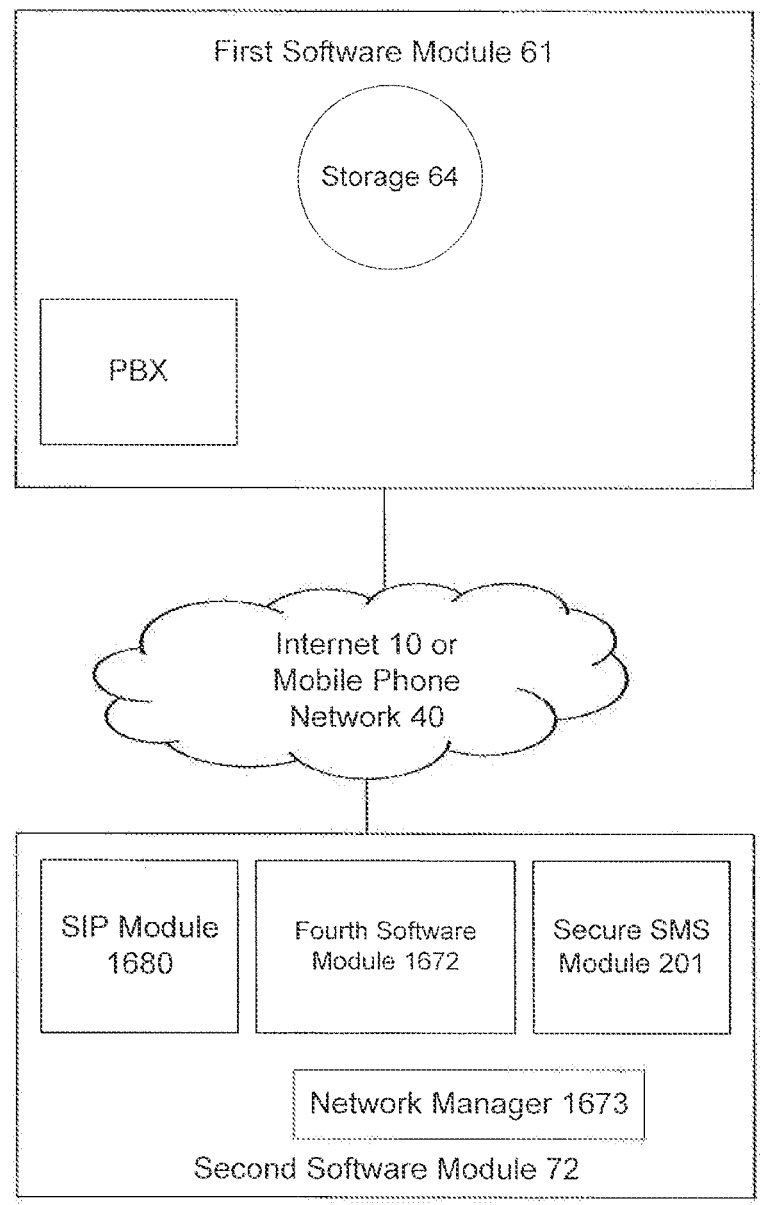
Figure 16A:
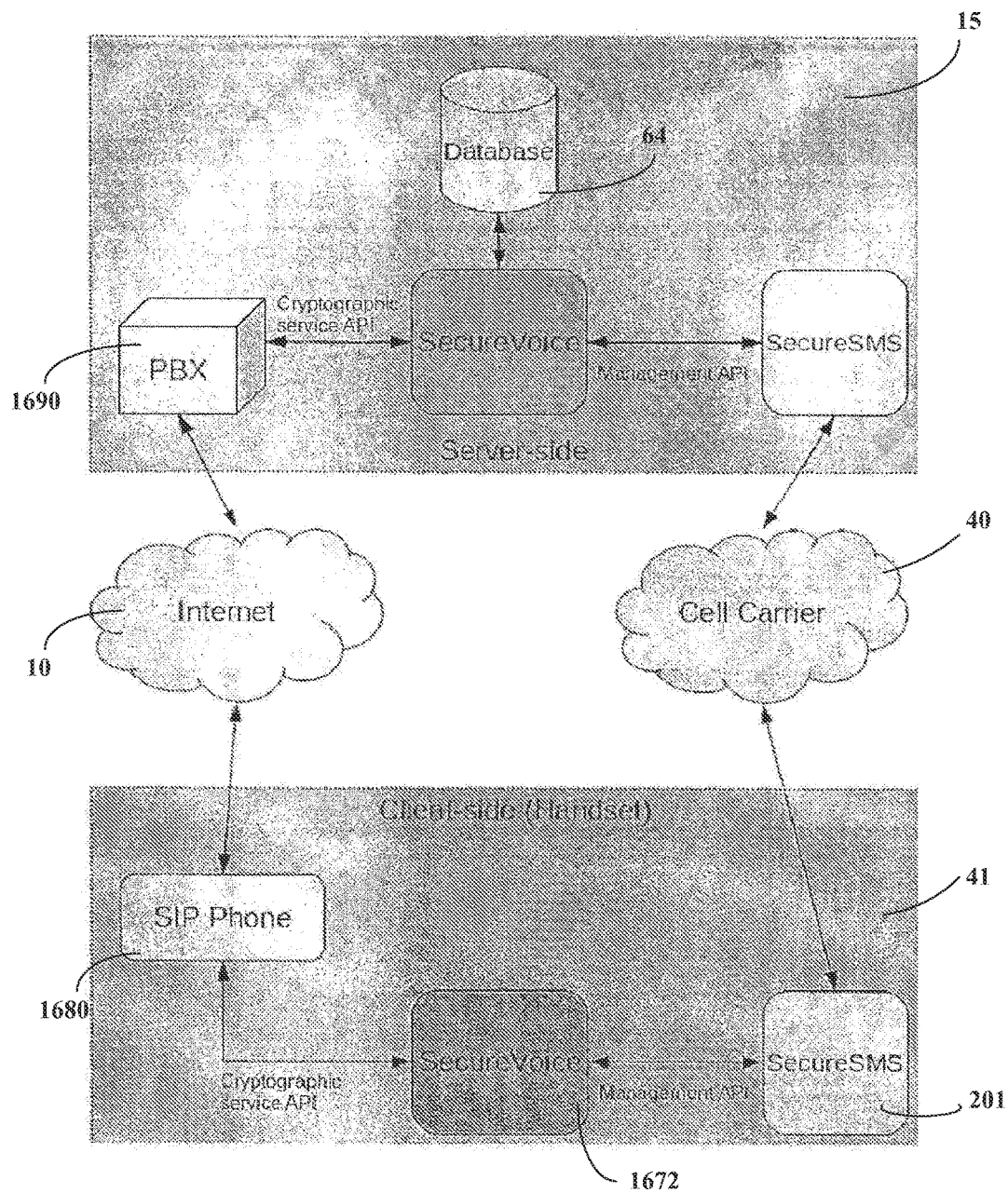
Figure 17:
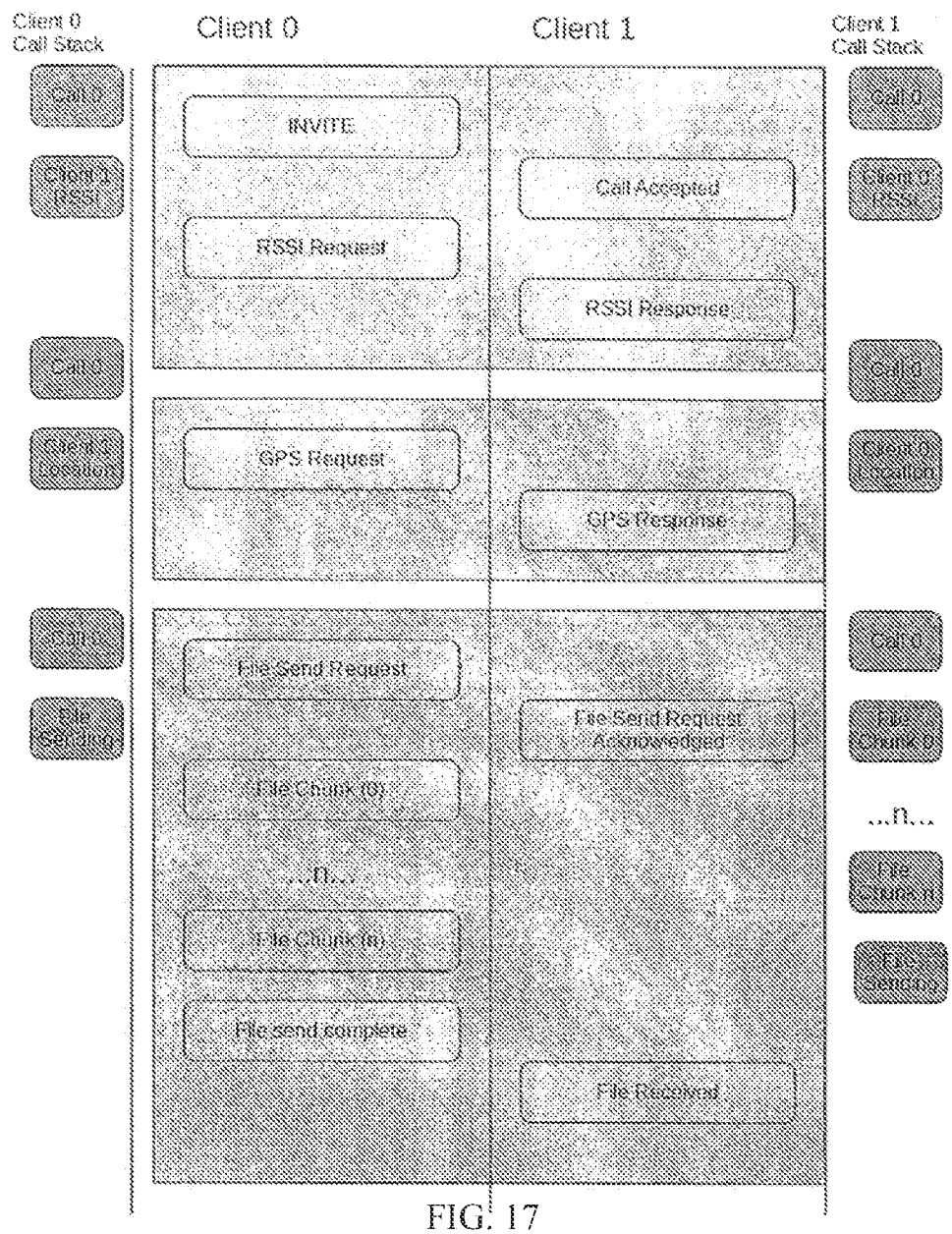
Figure 18:
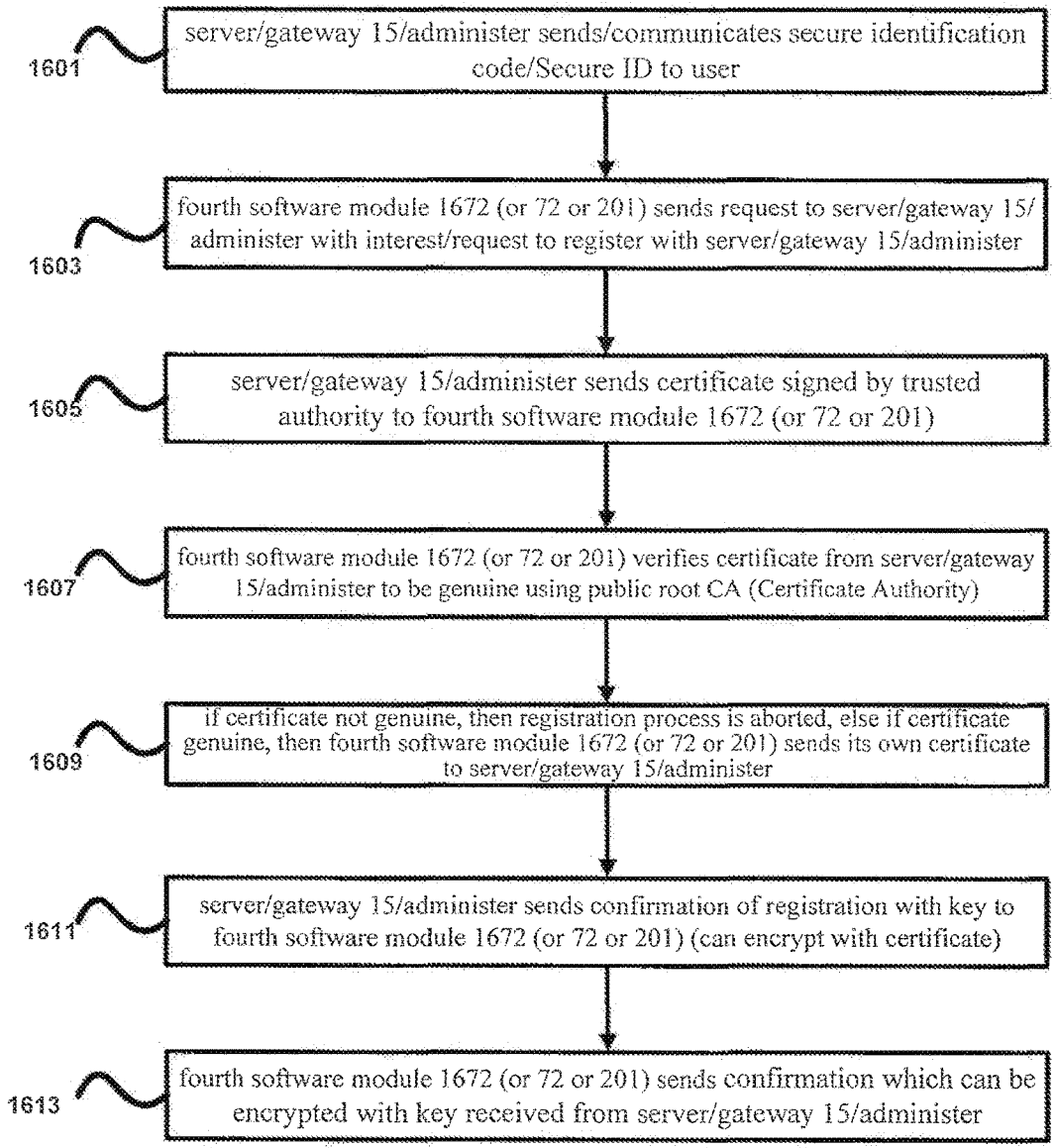

messages and multimedia messaging service (MMS) messages in a secure manner and to manage personal information for a number of users;

FIG. 4 illustrates installation and registration of a software module on a mobile device;

FIG. 4A is a flowchart illustrating an example of a method of providing positional awareness using mobile phones; and FIG. 5 further illustrates communication between mobile users and/or third parties via a gateway 115;

FIG. 6 is a flowchart illustrating an example of a method for securely transmitting a message, such as an SMS message or an MMS message;

FIG. 7 is a flowchart illustrating an example of a method for wiping a mobile device;

FIG. 8 is a flowchart illustrating another method for securely transmitting a message;

FIG. 9 is a flowchart illustrating an example of a method of managing information for at least a plurality of users using the Internet and mobile phones of the users;

FIG. 10 is a flowchart illustrating an example of a method of authenticating transactions, and methods of authenticating access, in many embodiments, using mobile phones;

FIG. 11 is a block diagram illustrating an example of a system of managing and disseminating information for a number of users;

FIG. 12 is a block diagram illustrating an environment where server 15 manages and disseminates information to users 21, 22, and 23;

FIG. 13 is a flowchart illustrating an example method of using server 15 to communicate with one or more of users 21, 22, and 23 to provide information to users 21, 22, and 23;

FIG. 14 is a flow diagram illustrating an example of a process for codec switching according to one aspect of the invention;

FIG. 15 is an example of a three-dimensional visualization of the showing the relationship between bandwidth, latency and quality (i.e., percentage of dropped packets) of a mobile phone network, which can be used to switch between codecs in accordance with one aspect of the invention;

FIG. 16 is a block diagram illustrating an example of a system for managing and disseminating information and/or messages for managing mobile voice communications in an encrypted and secure manner according to the present invention;

FIG. 16A is a block diagram illustrating an example of the server-side/client side information flow for an embodiment of a system for managing mobile voice communications in an encrypted and secure manner according to the present invention;

FIG. 17 is diagram showing examples of client software process operations for client-to-client communication for organizing metadata about calls; and FIG. 18 is a flowchart illustrating an example method of managing mobile voice communications in an encrypted and secure manner according to the present invention.

DETAILED DESCRIPTION

The present disclosure provides, among other things, a number of embodiments and methods for managing short messaging service (SMS) messages and multimedia messaging service (MMS) messages in a secure manner and for transmitting, receiving, encrypting, storing, and the like, of encrypted mobile voice communications and of personal information. While various embodiments and methods are described in sufficient detail to enable those skilled in the art to practice the invention, it should be understood that other embodiments may be realized and that various changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical and/or electronic couplings between the various elements. It should be noted that many alternative or additional functional relationships or physical connections may be present in a practical system.

Particular embodiments include methods for authorizing actions using mobile phones. Embodiments may include acts such as receiving from a person having authority to authorize the action, an identification of a phone number for obtaining authorization for the action, and receiving from a person seeking the action a request for authorization of the action. Certain embodiments also include acts such as sending a first message through a mobile phone network to the mobile phone, including a description of the action for which authorization is requested, and receiving, from the first mobile phone, a second message, which authorizes the action. Actions that are authorized, in different embodiments, include computer access, physical access, and financial transactions, as examples. In various embodiments, the phone number may be received through the mobile phone network, through the Internet, through a local signal, or directly from the user, as examples.

Various embodiments of the invention provide, on mobile devices, items or information that might otherwise be found in a person's wallet or purse, for example. Such a mobile device may be a phone, Palm Pilot, personal digital assistant, or the like, for example. The mobile device is often referred to herein as a "phone" or "mobile phone", but it should be understood that it may have other functionality or be another type of mobile device in some embodiments. Thus, in certain embodiments, a person may be able to leave their wallet or purse behind and bring just their phone, for example, when they leave home, go shopping, go to a restaurant, travel, or the like, or their phone may provide a backup to their wallet, for instance, or vice versa. In other embodiments, a phone may provide a portion of the functionality or information found in a wallet, or may contain additional information or functionality as well.

In some embodiments, a user may be able to enter information into a website, or may authorize entry of information into the website by others, which may be transmitted to the phone automatically for storage. In addition, in some embodiments, users may be able to enter information through their phone for transfer to the website server. In various embodiments, third parties, such as airlines, financial institutions such as banks, and the like, may provide information to the website, some or all of which may be transferred to the phone. Further, in some embodiments, certain such information may provide an alert or alarm to the user, for example, regarding important information such as notification of large deposits or withdrawals, changes in flight information, location of children, etc. In various embodiments, a user may be able to view other information on the phone, on the website, or both, such as, for example, bank account balances, transaction histories, frequent flier miles, credit card bills, automatic deposits and withdrawals, insurance information, warranties, service contracts, and the like.

Examples of embodiments of the invention include apparatuses, systems (for instance, with server modules and phone modules), and methods of managing information and providing voice communications. Particular embodiments include systems of managing personal information and voice communications for a plurality of users, each user having a mobile phone operating on a mobile phone network, and methods of managing information for at least a plurality of users using the internet and mobile phones of the users.

As used herein, a "mobile device" may be any device configured for transmitting and receiving electronic communications, for example a cellular phone, a satellite phone, a Palm Pilot™ device, personal digital assistant (PDA), BlackBerry™ device, iPhone™ device, iPad™ tablet computer, Samsung Galaxy Note™ smartphone and tablet computer, Samsung Galaxy Tab™ tablet computer, smartphone, desktop computer, laptop computer, tablet computer, netbook, portable device for communication, or the like. Throughout various exemplary embodiments illustrated or discussed in this disclosure, a mobile device may be referred to herein as a "phone" or "mobile phone", but it should be understood that it may have other functionality or be any other type of mobile device.

Example Environment and System

FIGS. 1 through 8 illustrate an example of an environment in which various embodiments may operate, and also illustrates various examples of systems, including systems of managing SMS messages in a secure manner. Various embodiments described herein are illustrated for use with a short messaging service (SMS) protocol. However, other protocols, for example, a multimedia messaging service (MMS) protocol, an Unstructured Supplementary Service Data (USSD) protocol, or other messaging protocol, and/or the like may suitably be employed. Moreover, various embodiments described herein are suitable for use when a messaging protocol is utilized for at least a portion of the communication. System 100 is, among other things, an example of a network-based system configured for managing information that is transferred to, transferred from, and/or stored on a mobile device, which is accomplished in many embodiments while maintaining an acceptable level of data security. In the example of system 100, users 21, 22, and 23 own, use, control, or have access to mobile phones 41, 42, and 43 respectively, which are serviced through a network, for example mobile phone network 40. Although one mobile phone network 40 is shown, some embodiments may include or use a number of mobile phone networks 40, which may be interconnected, for example. As used herein, unless specifically stated otherwise, a "mobile phone network" may be a cellular network, a satellite network, a WiFi network, a WiMAX network, a wireless network, or any other suitable network for transmission of information to mobile phones and/or other mobile devices. Moreover, a mobile device may connect to a network in any suitable manner, for example via a GSM modem, a CDMA modem, and the like. Additionally, a mobile device may connect to multiple networks simultaneously, for example to a GSM network of a first carrier via a GSM modem, and to a CDMA network of a second carrier via a CDMA modem. Further, the three users 21 to 23 and mobile phones 41 to 43 shown may serve as examples of a larger number of users and mobile phones. Many users of system 100 may have access to the Internet 10. For example, in various embodiments, user 23 has access to the Internet 10 through personal computer 13. Further, in certain embodiment, mobile phone network 40 is in communication with the Internet 10, or information is capable of being communicated (e.g., in one or both directions) between mobile phone network 40 and the Internet 10. In various embodiments, mobile phone network 40 may be connected to one or more additional mobile phone networks 40 or other networks in any suitable manner, for example via the Internet 10, via a public switched telephone network (PSTN), and/or the like.

Moreover, system 100 may be a public system (e.g., a system wherein any number of users may utilize system resources) or a private/closed system (e.g. a limited-access system with a "circle of trust" such that a user must be authorized to utilize particular system resources and/or send and receive communications with other members of the circle of trust). In various embodiments, system 100 may be configured to allow communication only between users (for example, users 21, 22, and 23) who are members of a particular trusted group. In this manner, system 100 may be particularly suitable for businesses, military, law enforcement, governments, and the like, who wish to exchange highly sensitive and confidential information via system 100. For example, system 100 may be configured to enable communication only between members of a pre-defined trusted group, such as FBI agents, ATF agents, Army personnel, and the like.

In the embodiment illustrated, server 15 is in communication with the Internet 10. However, server 15 may be in communication with a wireless carrier, a private network, a mobile phone, another server, and/or the like, via a wireless network or other means such that server 15 does not need to be in communication with the Internet 10. In this embodiment, server 15 is part of system 100, which provides an example of a system of managing personal information for a plurality of users (e.g., 21 to 23), each user having a mobile phone (e.g., 41 to 43) operating on a mobile phone network (e.g., 40). In this example, system 100 includes, on server 15, (at least one) first software module 61. Although shown just on server 15, in some embodiments, module 61 may be installed on or operating on more than one server. In certain embodiments, software module 61 may form at least one website 65. In this embodiment, at least a plurality of users (e.g., 21 to 23) may access or visit website 65 through the Internet 10 and elect to have their personal information managed through system 100 using their mobile phones (e.g., 41 to 43). For example, user 23 may access website 65 through computer 13 and internet 10. In different embodiments, computer 13 may be a desk top personal computer, a lap top or notebook computer, a PDA, etc. In some embodiments, users may access website 65 on server 15 through their phones (e.g., 41 to 43), through mobile phone network 40, or both.

In various embodiments, server 15 is part of system 100, and server 15 is configured as a trusted gateway configured to manage encrypted messages. Server 15 may provide any desired functionality to system 100, for example managing client software installed on one or more mobile devices, updating client software installed on one or more mobile devices, issuing commands to client software, tracking messages sent and received by client software, and the like. Server 15 may also manage encryption keys for client software, generate new encryption keys, communicate with a hardware security module (for example, a module located on another server 15 coupled to the instant server 15), and provide resiliency to increase the reliability of message delivery.

System 100 further comprises, on server 15, (at least one) first software module 61. Although shown just on server 15, in some embodiments, module 61 may be installed on or operating on more than one server. For example, server 15 may include multiple servers, such as one or more of a firewall server, a database server, an SMS gateway server, a web server, a domain server, or any other server. In certain embodiments, software module 61 may form at least one website 65. In certain embodiments, multiple users (e.g., 21 to 23) may access or visit website 65 (for example, through the Internet 10) and elect to send, receive, forward, reply, view, sort, and generate reports, including compliancy reports, through system 100 using their mobile devices or other communications devices. Moreover, one or more users may access or visit website 65 via any suitable protocol, for example WAP, https, and the like.

In some embodiments, first software module 61 provides secure storage 64 for each user's (e.g., 21 to 23) personal information, for example, received from the user. In a number of embodiments, storage 64 may also be used to store personal information about the users that has been received by module 61 or server 15 from at least one third party, which may be acting on behalf of the user to provide information to the user, for example. In the embodiment illustrated, third party 33 may provide such information to module 61 through the Internet 10, and third party 31 may provide such information to module 61 through mobile telephone network 40 and the Internet 10. In some embodiments, information that is communicated through mobile telephone network 40 may also, or instead, be communicated through a traditional phone network, for example, that provides direct wired phone service for a number of users.

In many embodiments, first software module 61 or module 201 (described below) provide secure storage 64 for each user's (e.g., 21 to 23) personal information, for example, information received from the user, contents of sent and received SMS messages, and the like. In a number of embodiments, storage 64 may also be used to store personal information about the users that has been received by module 61, module 501, or server 15 from at least one third party, which may be acting on behalf of the user to provide information to the user. In certain embodiments, third party 33 may provide such information to module 61 or module 201 through the Internet 10, and third party 31 may provide such information to module 61 or module 201 through mobile telephone network 40 and the Internet 10. In some embodiments, information that is communicated through mobile telephone network 40 may also, or instead, be communicated through a traditional phone network, for example, that provides direct wired phone service for a number of users. Moreover, third parties 31, 32, and 33 can choose to deploy gateway 115 at their respective data center behind their firewall. This provides each third party with another layer of security. Each third party can manage all access to server 15 according to their internal security policy. All communication between gateway 115 and mobile phone network 40 (e.g., carriers) can be direct.

Module 201 may be self-updating (e.g., when a new software update is available, gateway 115 may send a message to module 201 informing module 201 of the available update). The user's (or third party's) phone is informed of the update (e.g., via a SMS or MMS message (e.g., formatted with a command)) and asked for permission to update module 201. For example, the message (e.g., formatted with a command) queries the user as to whether the user would like to receive the update. If the user accepts to receive the update, then module 201 terminates itself, starts a browser to access server 15 or gateway 115, and downloads the latest version of module 201 from server 15 or gateway 115. Thus, once permission is given to update module 201, the new version of module 201 is downloaded to the user's (or third party's) phone and installed over the old version of module 201. A message confirming installation of module 201 may be sent to gateway 115. Moreover, module 201 may be configured to communicate with and/or utilize multiple gateways 115.

In various embodiments, customized versions of module 201 may be provided in order to make module 201 operative and/or available for use on varying hardware, for example various mobile phones and/or computing platforms (e.g., Google Android, Java 2 Mobile Edition, Windows Mobile, Linux, Microsoft Windows, Mac OS, Unix, and the like). Moreover, access to module 201 may be controlled via a password, a biometric, and the like. Additionally, module 201 may contain and/or be associated with information configured to identify a third party (e.g., a reseller, a referrer, a corporation, and the like), in order to provide customized services and/or tracking. For example, a reseller may receive a commission based on the number of secure SMS messages transmitted by module(s) 201 associated with the reseller.

Registration with the Gateway/Server

Moreover, module 201 may be configured to utilize registration with a gateway, for example gateway 115. In various embodiments, registration may comprise a user taking affirmative steps, for example inputting a secure identification provided by a gateway administrator; inputting a short code, a long code, or a phone number (for example, a number associated with a cellular modem) to facilitate routing of one or more messages. Furthermore, registration may comprise exchanging encryption keys between a mobile device and a gateway. For example, a server public key may be utilized to securely send the encryption key of module 201 to a mobile device.

In certain embodiments, module 201 is registered on gateway 115 in order to facilitate communications between module 201 and gateway 115. For example, registration may be accomplished through use of a default server public key, a unique module 201 public key, a short code, and a unique secure identification code. In this manner, a module 201 may know how to contact gateway 115 in order to register. Module 201 encrypts the unique secure identification code and the newly generated module 201 public key with the default server public key and sends the result in an SMS message to the short code. Gateway 115 decrypts the SMS message using a default server private key. Gateway 115 verifies the unique secure identification code and the phone number associated with module 201. If the result is not verified, an error message is returned to module 201. If the result is verified, gateway 115 transmits a new server public key to module 201.

Gateway 115 then creates a unique AES key and sends this key, together with registration information, to module 201 via a registration message encrypted with the module 201 public key. Module 201 decrypts the registration message using module 201 private key. Module 201 then transmits a registration acknowledgement message, encrypted with a unique AES key associated with module 201, to gateway 115. Upon receipt of the registration acknowledgement message at gateway 115, module 201 is registered with gateway 115.

In some embodiments as illustrated in FIGS. 1 through 18, system 100 can manage mobile voice communications in an encrypted and secure manner. Some of the problems and vulnerabilities of mobile voice communications have been described. A network manager 1673 can be configured as a part of a fourth software module 1672 in FIG. 16, module 201 in FIG. 2, or second software module 72 or 77 (or separate from modules 1672, 72, and/or 77). Network manager 1673 acts as a module to measure network conditions on both sides (transmit/receive) of a call through mobile phone network 40. Network conditions can include latency, throughput, and bandwidth of mobile phone network 40. The data thereby collected by network manager 1673 is used to make informed decisions about choosing a more suitable codec for handling the call on mobile phone network 40. In some embodiments, fourth software module 1672 can be configured as one or more of a secure messaging module 201, second software module 72, a secure voice module, secure audio module, secure video module, secure video streaming module, secure video conferencing module, and secure multimedia module.

Figure 1:
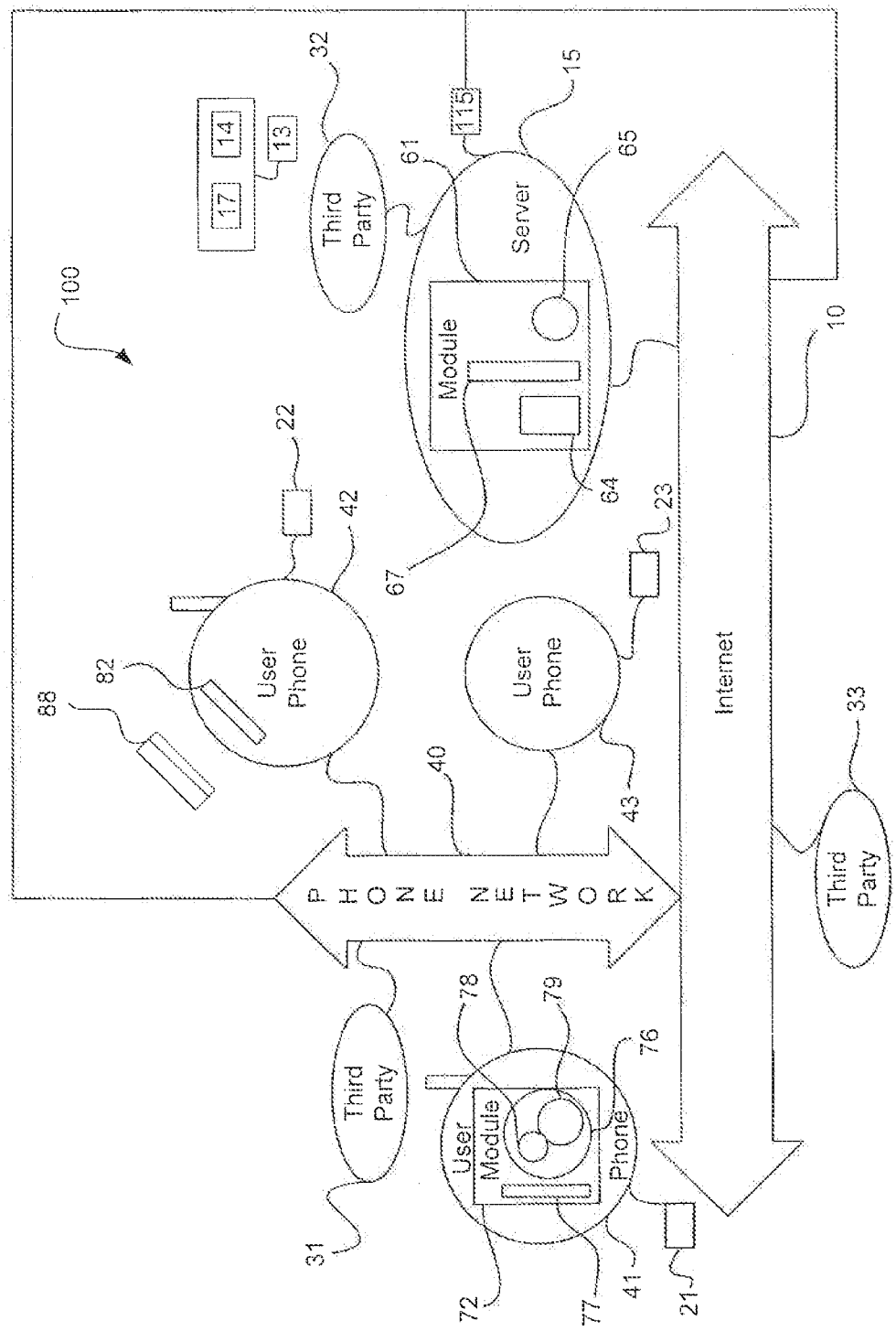
FIG. 1 is a block diagram illustrating, among other things, an example of an environment in which various embodiments may operate for managing mobile voice communications in an encrypted and secure manner in accordance with the invention.

FIG. 14 is a flow diagram illustrating an example of a process for codec switching according to one aspect of the invention, wherein the CALLER can be mobile phone 41, the CALLEE can be mobile phone 43 (in FIGS. 1 and 16), and the handsets can be mobile phones 41 and/or 43 (in FIGS. 1 and 16). FIG. 15 illustrates an example of a three-dimensional visualization of the mobile phone network 40 showing the relationship between bandwidth, latency and quality (i.e., percentage of dropped packets) of a mobile phone network, which can be used in some embodiments to switch between codecs. FIG. 17 is diagram showing examples of client software process operations for client-to-client communication between mobile devices 41, 43 for exchanging local network measurements or other attributes of the mobile devices, such as GPS and the like.

In FIG. 15, each combination of these parameters is associated with a vector in a 3D cylindrical representation. These vectors are generated during a call on mobile phone network 40, frequently with fixed/variable intervals. Depending on the call quality, each vector is going to fall in or out of a 3D volume with fuzzy boundaries. Over time, the 3D volume becomes a visualization of the good audio quality versus bad audio quality on the call. Each codec has its own 3D volume, so fourth software module 1672 or second software module 72 (in FIGS. 1 and 16) can decide to switch between codecs depending on how frequent the vectors fall in/out of a specific codec. FIG. 15 shows one of the possible representations of the aforementioned visualization. The network manager 1673 can periodically trade network measurements with its counter-party, so that disruptions in the status of mobile phone network 40 can be accommodated quickly and with assurance. The defined conical region within the cylinder demonstrates where a call can exist. That region's dimensions depend on the codec and the transport in use. The network manager 1673 can find and use the codec that best fits the vector inside the usable region.

Referring now to FIGS. 16 and 16A, a system 100 for managing mobile voice communications in an encrypted and secure manner includes the second software module 72, the secure messaging software module 201, a fourth software module 1672, a network manager 1673, and a SIP module 1680. The database in FIG. 16A can be in storage 64 (see FIG. 1). PBX 1690 is Private Branch Exchange, which is a PSTN telephone network (usually used within a private enterprise). The Internet 10 and mobile phone network 40 can be combined as Internet and/or a mobile phone network 40 (see FIG. 1). Fourth software module 1672 can be a part of secure messaging module 201 or second software module 72 in FIG. 1 or be separate from module 201 or second software module 72. Server 15, gateway 15, or the administrator of the server/gateway 15 can send or communicate a secure identification code or Secure ID to the user via fourth software module 1672, module 201, or second software module 72 (see step 1601 of FIG. 18). The secure identification code may be communicated via SMS, MMS, and/or data, or via a communication channel other than SMS, MMS, and/or data.

Fourth software module 1672 (configured as an application on mobile phone 43), module 201 (configured as an application on mobile phone 43), or second software module 72 (configured as an application on mobile phone 43) can send a request to server 15 indicating an interest or a request to register with server 15 (step 1603). In some embodiments, the request may or may not be encrypted. In some embodiments, the encryption of the request may or may not use a unique encryption key. In some embodiments, the encryption of the request may or may not use a pre-established key, which may be a symmetric key or an asymmetric key. Server 15 sends a certificate signed by a trusted authority to fourth software module 1672, module 201, or second software module 72 (step 1605). In some embodiments, the certificate may be encrypted using the unique encryption key. In some embodiments, the encryption of the certificate may use a pre-established key, which may be a symmetric key or an asymmetric key.

Fourth software module 1672, module 201, or second software module 72 verifies that the certificate from server 15 is genuine using a public root CA (Certificate Authority) (step 1607). If the certificate is not genuine, then the registration process is aborted and in some embodiments the incident is reported, logged, or alerted to the user and/or administrator of server 15. If the certificate from server 15 is genuine, then the fourth software module 1672, module 201, or second software module 72 sends its own certificate (e.g., the certificate from the application on mobile phone 41) to server 15 (step 1609). The certificate from fourth software module 1672, module 201, or second software module 72 can be encrypted with the certificate from server 15 before the certificate from fourth software module 1672, module 201, or second software module 72 is sent to server 15. In some embodiments, fourth software module 1672, module 201, or second software module 72 may also send the secure identification code or Secure ID from server 15 (if available) in an encrypted manner with the certificate from the server 15 to server 15.

In some embodiments, fourth software module 1672, module 201, or second software module 72 may also send additional information such as one or more of mobile device information (e.g., from mobile phone 41), an application version, an encryption version, a list of installed applications, and an Operating System version in an encrypted manner using the certificate from the server 15 to server 15. The server 15 sends a confirmation of the registration including a key to fourth software module 1672, module 201, or second software module 72 (the confirmation can be encrypted with the certificate from the fourth software module 1672, module 201, or second software module 72) (step 1611)

In some embodiments, server 15 may also send policies to instruct the fourth software module 1672, module 201, or second software module 72 to change its configuration (which also can be in an encrypted manner using the certificate from fourth software module 1672, module 201, or second software module 72). In some embodiments, the fourth software module 1672, module 201, or second software module 72 confirms that the confirmation from server 15 is received and processed correctly. In some embodiments, the confirmation can be encrypted with the key received from server 15 (step 1613). In some embodiments of FIG. 14 through 16, all or some of the steps are sent via SMS. In other embodiments of FIG. 14 through 16, some or all of the steps are via a data channel of the mobile phone network 40. In other embodiments of FIG. 14 through 16, all or some of the steps are sent via SMS/MMS.

Encryption

A number of embodiments of systems and methods of the present invention use encryption to address the problems associated with existing encryption models and limitations of throughput in mobile voice communications over a mobile phone network. Although some of the standard features of the mobile device, such as the address book, allow for sharing of information between voice calls and the SMS editor on the mobile phone 41, the challenges induced by the differences have resulted in keeping the secure SMS module 201 and the secure voice module (fourth software module 1672, module 201, or second software module 72) as separate applications on the mobile device. For example, the differences between the encryption techniques of the data channel and the control channel has resulted in keeping the secure SMS module 201 and the secure voice module (fourth software module 1672, module 201, or second software module 72) as separate applications on the mobile device. One of the important characteristics of traffic channel is support of Internet Protocol (IP) which is not available or feasible on control channel. Hence in this invention when discussing characteristics of the traffic channel, one can assume any channel capable of supporting IP. Some channels may be any part of the mobile phone network or the Internet.

Some embodiments and methods of the invention establish a secure voice communication based on a unique encryption key that is established between a first software module of the server and fourth software module 1672, module 201, or second software module 72 of the mobile device. The secure SMS registration process for establishing such a unique encryption key using SMS/MMS, data, or a combination thereof can include using one or more or any combination of AES (Advanced Encryption Standard), Blowfish encryption, ECC (Elliptic Curve Cryptography), RSA encryption, or any other suitable encryption. Furthermore, the invention uses a dynamic codec switcher to accommodate network changes on the mobile phone network for a variety of parameters such as latency, drop rate, and bandwidth on the mobile phone network. Furthermore, the invention allows for in-call switching of codecs (codec hot-swap) and uses a network manager. The network manager can be configured as a part of a fourth software module 1672, module 201, or a second software module 72 (or separate from them) and acts as a module to measure network conditions on both sides (transmit/receive) of a call through the mobile phone network. The network manager can also switch communications from a mobile phone network to the Internet, a WiFi network, or a local network (and vice-versa). Network conditions can include latency, throughput, and bandwidth of the mobile phone network. The data thereby collected by the network manager is used to make informed decisions about choosing a more suitable codec for handling the call on the mobile phone network.

Mobile communication takes place over traffic and control channels of a mobile phone network 40. While the traffic channel is basically used for carrying signals such as voice calls, data, and multimedia, the control channel is used for SMS (short messaging service) amongst other operating signals. Other operating signals can include synchronization signals, paging signals, and access signals. One of the common protocols for transmission of voice communication over Internet Protocol (IP) is Voice over IP (VoIP). VoIP is commonly used for end-to-end encryption of voice communication. VoIP takes place over the traffic channel as it uses data signals for the transmission. Similar to voice calls, one main assumption for VoIP communication is that both sides of the communication are online in real time and available simultaneously for the communication. Contrary to voice calls and VoIP, SMS is a store-and-forward technique, which does not require an end-to-end connection to be available simultaneously. Furthermore, SMS is optimized for transmission of short messages (as compared to longer messages used for voice, multimedia, or other). Traditionally, when securing VoIP communication, the encryption techniques that are used for encrypting VoIP rely on characteristics of the data channel and therefore vary in techniques used for encryption of SMS (which relies on characteristics of the control channel).

Embodiments and methods of the present invention can take advantage of some of the characteristics of the control channel to enhance encryption of VoIP communication. Furthermore, they can take advantage of combining a secure SMS module 201 with a secure voice module 1672, secure audio module, secure video module, secure video streaming module, secure video conferencing module, and secure multimedia module as well as secure IP (Internet Protocol) SMS which sends SMS over the traffic channel. IPSMS is a way of emulating SMS messages via data. SMS uses a control channel. Data uses a traffic channel. The characteristics of the two channels are somewhat different. It is possible to send short messages on a data channel to emulate SMS but not all characteristic of SMS on a control channel will be available on IPSMS.

A number of embodiments and methods use encryption to address the problems associated with the vulnerability of using SSL/TLS in mobile voice communications. They can use a control channel of a mobile phone network (e.g., for transmitting/receiving SMS/MMS messages), where possible, and can perform a security handshake such as using a secure SMS module 201 or API. The control channel of a mobile phone network can be used with a registration process, which provides additional reliability and a higher level of security for voice communication. Such methodology utilizes a secondary communication method or channel (e.g., using both the control channel and the traffic channel), which is more difficult to exploit by attackers. Furthermore, when SMS/MMS is used, the phone number of the sender (or user) can be verified and a whitelist process can establish the list of mobile devices authorized for registration. Whitelist is defined herein and can also include a process to determine which types of information or data are permitted to be transmitted or received through the mobile phone network. Furthermore, when SMS is used, then the control channel of the mobile phone network is used (which is more resilient and uses less bandwidth). Using whitelisting in the control channel is more secure than using the data channel.

Amongst other things, the registration process (that takes place over the control channel using SMS) authenticates the user of the mobile device (non-repudiation), the mobile device itself, and the server (gateway). Authentication of the mobile device is one of the important characteristics of registration through the control channel that is not available in the traffic channel. An authenticated mobile device acts as what-you-have, which enhances the security of what-you-know. Traditionally what-you-have has been established via security dongle that are provided to each individual user, which is costly compared to the mobile device (which is already owned by the user).

Additionally, via the registration process, a secure communication connection is established between the mobile device and the server and a unique encryption key is established between the mobile device and the server. The unique encryption key can be renewed based on policy decided by the administrator of the system.

Once the registration process is established over the control channel, all other modules operating on the traffic channel can utilize the unique encryption key that has been established for communication (transmission and receipt of information). Other benefits of combining the secure SMS module 201 with other modules is the sharing of one or more secure address books between all modules, having a single sign-on process, having common configuration, sharing of the storage area, enhanced user experience, enhanced overall efficiency of combining secure SMS communication with secure voice communication, and more.

By combining the secure SMS and secure voice modules, the secure SMS module can also benefit from characteristics of the traffic channel including send and receiving information such as IPSMS, policy information, group information over IP. In this invention, secure SMS and secure voice can sync the phones stored in the secure address book with the server and identify the phones in the secure address book that have similar software and are capable of secure communication.

In some embodiments, the unique encryption key of the registration process is used in conjunction with SSL/TLS and the SIP (Session Initiation Protocol) packets are encrypted and decrypted at the server and mobile device. In other embodiments, the unique encryption key or the registration process is used in conjunction with SRTP (Secure Real-time Transport Protocol) and packets are encrypted and decrypted at the server and mobile device.

An SIP packet containing the unique encryption key is encrypted at server 15 before being transferred through a TLS/SSL channel via mobile phone network 40 to mobile phone 41. Secure communication such as by SMS is used to more reliably authenticate mobile phone 41. Utilizing secure communication such as SMS, server 15 is capable of verifying the phone number of mobile phone 41. Furthermore, the secure communication (e.g., SMS message) is encrypted to prevent eavesdropping and further strengthen the security of the communication between server 15 and mobile phone 41. In an alternate embodiment, an MMS message can be used.

Some embodiments and methods of the invention use encryption, a unique encryption key, configuration of mobile devices, and dynamic command delivery by encrypted mobile communications (e.g., SMS/MMS message). This is done to address the problems associated with the vulnerability of using mobile voice communications. As illustrated in FIGS. 1 through 18, an encryption key or keys can be used and configurations and other information can be communicated through an encrypted method. The key or keys can also dynamically be changed through an encrypted method. Commands to perform tasks can additionally be delivered to a mobile device (such as a handset) or an application through an encrypted method.

In the past, mobile applications that primarily have used data for communication relied on pull technology to determine if the server intends to send information to the mobile application. In another words, the mobile application contacts the server periodically to determine if the server has some information than need to be sent to the mobile device. This process is not considered very efficient, as it excessively uses the resources of the mobile device. To this extent, some mobile Operating System manufacturers introduced the concept of push notification, by which the mobile application is notified when it needs to contact the server. On the other hand, mobile applications that utilize an SMS or MMS channel, rely on push technology where the message is pushed from server to the mobile application.

Since push notification is not reliable or for the purpose of redundancy, it is possible to send an SMS or MMS message, either encrypted or plain text, to a mobile application running on the mobile device to instruct the application to contact the server. This technique could be used along with push notification or just by itself. Secure voice mobile applications primarily utilize a data channel and are in constant communication with the server to know if there is a task waiting for them. For example, to learn if there is a phone call waiting for connection to the mobile device. If secure voice communications also utilize SMS or MMS, disclosed herein, the server can send a message to the mobile phone when there is a phone call waiting to connect, and the SMS can wake up the mobile application and instruct it to contact the server. Thus, with some embodiments and methods of the invention, commands to perform tasks can be delivered to handset or application through an encrypted method such as Secure SMS; including but not limited to the ability to stop activity on the data channel and application, or "put it to sleep" to preserve battery and device resources, as well as "wake up" a data connection via SMS, Push Notification, or another method.

Some embodiments and methods of the invention use an encrypted address book scan and encrypted mobile communications (e.g., SMS/MMS message) to address the problems associated with the vulnerability of using mobile voice communications. Depending on the server settings, the user's address book on the user's mobile device can be scanned and the server can find others who have such secure communication software module or application on their mobile devices, if such others users have chosen to be listed. This makes it convenient for the user to setup secure calls with other users using their mobile devices and encrypted mobile voice communications. Users can also share a secure contact list between applications on the mobile device and the server and/or among applications on the mobile device. Users can also share unique login, setup, configuration, and other similar features using mobile voice communications that are secure. All the information between users is transferred in an encrypted way (e.g., voice (talking on the mobile device), text (SMS/MMS messages), data, or any other).

Once the registration process is established over the control channel, all other modules operating on the traffic channel can utilize the unique encryption key that has been established for communication (transmission and receipt of information). Other benefits of combining the secure SMS module 201 with other modules is the sharing of one or more secure address books between all modules, having a single sign-on process, having common configuration, sharing of the storage area, enhanced user experience, enhanced overall efficiency of combining secure SMS communication with secure voice communication, and more.

By combining the secure SMS and secure voice modules, the secure SMS module can also benefit from characteristics of the traffic channel including send and receiving information such as IPSMS, policy information, and group information over IP. Secure SMS and secure voice can sync the phones stored in the secure address book with the server and identify the phones in the secure address book that have similar software and are capable of secure communication.

In some embodiments, the unique encryption key of the registration process is used in conjunction with SSL/TLS and the SIP packet are encrypted and decrypted at the server and mobile device. In other embodiments, the unique encryption key or the registration process is used in conjunction with SRTP (Secure Real-time Transport Protocol) and packets are encrypted and decrypted at the server and mobile device.

An SIP packet containing the unique encryption key can be encrypted at server 15 before being transferred through a TLS/SSL channel via mobile phone network 40 to mobile phone 41. Secure communication such as by SMS is used to more reliably authenticate mobile phone 41. Utilizing secure communication such as SMS, server 15 is capable of verifying the phone number of mobile phone 41. Furthermore, the secure communication (e.g., SMS message) is encrypted to prevent eavesdropping and further strengthen the security of the communication between server 15 and mobile phone 41. In an alternate embodiment, an MMS message can be used.

FIG. 18 illustrates one example method of managing mobile voice communications in an encrypted and secure manner according to the present invention. As shown in FIG. 18, the server/gateway IS/administer sends/communicates the secure identification code/Secure ID to user (act 1601). Fourth software module 1672 (or 72 or 201) then sends a request to server/gateway 15/administer with interest/request to register with server/gateway IS/administer (act 1603). The server/gateway IS/administer sends a certificate signed by a trusted authority to fourth software module 1672 (or 72 or 201) (act 1605). Fourth software module 1672 (or 72 or 201) then verifies the certificate from server/gateway 15/administer as genuine using a public root CA (Certificate Authority) (act 1607). If the certificate is not genuine, then the registration process is aborted; otherwise, if certificate genuine, then fourth software module 1672 (or 72 or 201) sends its own certificate to server/gateway IS/administer (act 1609). Server/gateway 15/administer sends confirmation of registration with a key to fourth software module 1672 (or 72 or 201) (can encrypt with certificate) (act 1611). Fourth software module 1672 (or 72 or 201) then sends confirmation which can be encrypted with the key received from server/gateway IS/administer (1613).

Storing and Making Available Information in the Mobile Device

Some embodiments and methods of the invention can store or make available information, items, functionality, or a combination thereof, in a mobile phone. Various embodiments include a software application loaded on a mobile phone that stores certain information for access by the user. In addition, various embodiments of the invention include an Internet website through which certain information can be transmitted to the phone. In some embodiments, the information on the website can be updated through the phone, by the user through a personal computer, or both. Furthermore, in some embodiments, various third parties, such as merchants, businesses, banks, airlines and the like may provide information to the website. Information may be transmitted from the website to the phone, or vice versa, via a telephone signal or through a mobile telephone network, for example, at particular times or as needed. In some embodiments, a user may be alerted to certain information or changes in information that meet certain criteria.

Various embodiments and methods of the invention provide as an object or benefit that they partially or fully address one or more of the needs, potential areas for benefit or improvement, and functions described herein. For instance, various embodiments may store or make available information, items, or functionality in a mobile phone. Various embodiments may provide a higher level of data security, be easier to use, accomplish more functions, contain more useful information, provide a better level of control, provide easier management and replacement if lost or stolen, or a combination thereof, in comparison with various prior art. Various embodiments may, for example, manage personal information for a number of users, sort certain information, provide alarms, transfer information between a server and mobile phones, and store information on mobile phones in a manner that facilitates access by the users. Further features and advantages of the invention may be apparent to those skilled in the art In particular embodiments, this invention provides, for example, systems of managing personal information for a plurality of users, each user having a mobile phone operating on a mobile phone network. In particular embodiments, the system includes at least one first software module operating on at least one server and forming at least one website wherein a plurality of users visit the website through the Internet and elect to have their personal information managed through the system using their mobile phones. In addition, in these embodiments, the first software module provides secure storage for each user's personal information received from the user and from at least one third party acting on behalf of the user to provide information to the user, and the first software module filters the personal information and selects nuggets of the personal information which the first software module sends to the mobile phone. Furthermore, such systems also include a second software module operating independently on at least a plurality of the mobile phones, and the second software module is configured to receive the nuggets of the personal information of the user from the first software module through the Internet and through the mobile phone network, and to store the personal information on the mobile phone so that the personal information may later be accessed by the user even when the mobile phone is not connected to a mobile phone network, by viewing a folder containing nuggets organized by subject matter.

In some such embodiments, for at least a plurality of the users, the second software module is downloadable by users from the first software module to the mobile phones through the website and through the mobile phone network. In addition, in some embodiments, for at least a plurality of the users, the first software module includes instructions to search at least a plurality of e-mails for keywords, identifying numbers, or both, and to select the nuggets of the personal information from the e-mails using the keywords or identifying numbers. In some such embodiments, for at least a plurality of the users, the first software module contains instructions to receive a command from the user through the mobile phone network to dispute a financial transaction for a particular account described in the nuggets of the personal information, and upon the receipt of the command, to communicate or transmit a dispute of the transaction to a manager of the particular account, for example, through the Internet.

Furthermore, in some embodiments, for at least a plurality of the users, the second software module contains instructions to allow the user to select at least a portion of the personal information that is stored on the mobile phone, select or enter an identifier of a different party, a different party mobile phone, or both, and elect to send the (at least a) portion of the personal information to the different party mobile phone. In many embodiments, for at least a plurality of the users, the first software module further contains instructions to evaluate whether the different party mobile phone contains a copy of the second software module, and if the different party mobile phone contains a copy of the second software module, then to send the (at least a) portion of the personal information to the copy of the second software module on the different party mobile phone through the mobile phone network. In some such embodiments, for at least a plurality of the users, the first software module further contains instructions to receive a command from the user through the mobile phone network, and upon the receipt of the command, to transmit at least a portion of the nuggets of the personal information to a different party through the Internet.

In other embodiments, the invention provides various methods of managing information for at least a plurality of users using the Internet and mobile phones of the users. In a particular such embodiment, the method includes for each of a plurality of the users, (in any order) receiving a first set of personal information of the user from the user through the Internet, the mobile phone of the user, or both, wherein the first set of personal information includes identification of a criteria for alarming, and for each of a plurality of the users, receiving a second set of personal information of each user from at least one third party through a network. In this embodiment, the method also includes, for each of a plurality of the users, selecting a fraction of the second set of personal information, and for each of a plurality of the users, transmitting the fraction of the second set of personal information to the user's mobile phone through the mobile phone network for storage on the user's mobile phone using a second software module residing on the phone. Furthermore, in this embodiment, the second software module organizes the fraction of the second set of personal information and makes the fraction of the second set of personal information accessible to the user. This embodiment also includes, for each of a plurality of the users, repeating at least a plurality of times the receiving of the second set of personal information, the selecting of the fraction, and the transmitting of the fraction. And this method also includes, for each of a plurality of the users, using the second software module, providing an alarm to the user if at least a portion of the fraction of the second set of personal information satisfies the criteria.

Another embodiment of such a method includes receiving a first set of personal information of the user from the user through the Internet or through the mobile phone of the user (or both), and upon instruction by the user, downloading a second software module to the user's mobile phone through the mobile phone network. This embodiment also includes receiving a second set of personal information of the user from at least one third party through a network. This embodiment further includes selecting a fraction of the second set of personal information, encrypting the fraction of the second set of personal information, and transmitting the fraction of the second set of personal information to the user's mobile phone through the mobile phone network for storage on the user's mobile phone using the second software module residing on the phone. Further, this embodiment includes decrypting the fraction of the second set of personal information, and using the second software module residing on the phone, organizing the fraction of the second set of personal information based on topic, as well as using the second software module residing on the phone to make the fraction of the second set of personal information accessible to the user based on the topic of the information. Even further, this embodiment includes repeating at least a plurality of times the receiving of the second set of personal information, the selecting of the fraction, the encrypting of the fraction, the transmitting of the fraction, the decrypting of the fraction, the organizing of the fraction, and the making the fraction accessible to the user, and the repeating further includes synchronizing at least a portion of the fraction of the second set of personal information that is stored on the user's mobile phone with corresponding personal information that was already stored on the mobile phone, while maintaining the organization of the information based on the topic of the information.

In various embodiments of either of these methods, for each of a plurality of the users, the first set of personal information includes an identification of at least one financial account, the second set of personal information includes an identification of deposits into the account, withdrawals from the account, and a balance of the account, and the providing an alarm includes (or an alarm is provided that includes) alarming if a withdrawal exceeds a first threshold identified within the criteria, alarming if the balance of the account drops below a second threshold identified within the criteria, or both. Further, in some of these methods, for each of a plurality of the users, the first set of personal information includes travel information, an identification of a common carrier or a travel agent, or a combination thereof, the second set of personal information includes identification of a departure time and a departure location, and the providing of an alarm includes (or an alarm is provided that includes) alarming if there is a change in the departure time, the departure location, or both.

In many embodiments the method further includes, for each of a plurality of the users, using local signal transmitting hardware located on the user's mobile phone, and using the second software module, under the control of the user, transmitting a local signal includes at least a portion of the first set of personal information or the second set of personal information (or both) to a reader within proximity to the mobile phone. Further, in particular embodiments, for each of a plurality of the users, the first set of personal information includes loyalty information or identification of a merchant or a service provider (or a combination thereof), the first set of personal information or the second set of personal information (or both) includes the loyalty information, the local signal includes at least a portion of the loyalty information, and the transmitting of the local signal includes transmitting the (at least a) portion of the loyalty information to the merchant, the service provider, or both. Further, in particular embodiments, the method further includes using signal receiving hardware located on the user's mobile phone, and using the second software module, under the control of the user, receiving a local signal from a transmitter within proximity to the mobile phone.

Further still, in various embodiments, the method further includes, in any order, for at least a plurality of the users, upon instruction by the user, transmitting at least a portion of the second set of personal information to a different party mobile phone through the mobile phone network for storage on the different party mobile phone, for access by the different party. In some embodiments, the method further includes, in any order, for at least a plurality of the users, upon command by the user, wherein the command is provided through the mobile phone of the user, transmitting at least a portion of the second set of personal information to a different party through the Internet. And in particular embodiments, the portion of the second set of personal information includes a travel itinerary.

Still further, in some embodiments, the method further includes, for each of a plurality of the users, before the transmitting of the fraction of the second set of personal information to the user's mobile phone, encrypting the fraction of the second set of personal information, compressing the fraction of the second set of personal information, or both and the repeating includes repeating the encrypting, compressing, or both. In some such methods, for each of a plurality of the users, the second software module organizes the fraction of the second set of personal information based on topic and makes the fraction of the second set of personal information accessible to the user based on the topic of the information.

Additionally, in many embodiments, for each of a plurality of the users, the repeating includes replacing at least a portion of the fraction of the second set of personal information that is stored on the user's mobile phone, while maintaining the organization of the information based on the topic of the information. And in various embodiments, for each of a plurality of the users, the repeating includes synchronizing at least a portion of the fraction of the second set of personal information that is stored on the user's mobile phone with corresponding personal information that was already stored on the mobile phone, while maintaining the organization of the information based on the topic of the information. And further, in many embodiments, the receiving of the first set of personal information, the receiving of the second set of personal information, the selecting of the fraction, and the transmitting of the fraction, are all performed by the first software module residing on a server connected to the Internet, wherein the first software module further forms at least one Internet website.

Secure Messaging Communication

Some embodiments and methods of the invention are configured for managing (i.e., creating, editing, viewing, compressing, decompressing, disassembling, reassembling, queuing, routing, encrypting, decrypting, sending, receiving, replying, forwarding, storing, and/or the like) communications (for example, short messaging service (SMS) messages, multimedia messaging service (MMS) messages, and other information transmission, and/or the like) in a secure manner (e.g., in an encrypted or otherwise secured manner). In an embodiment, a secure short messaging service (SMS) system comprises a software module configured for use on a device, such as a mobile device. The software module is configured to encrypt an SMS or MMS message via a first encryption. A gateway is configured to communicate with the mobile device. The gateway is configured to receive the encrypted SMS message from the mobile device.

In yet another embodiment, a method of deleting information on a mobile device, comprises transmitting, to a mobile device, a secure message comprising a wipe instruction. At the mobile device, at least one item of information is deleted responsive to the wipe instruction.

Referring to FIG. 18, a registration process (steps 1601 through 1613) is put in place to authenticate the user, mobile phone 41, and server 15, and to create a secure communication between mobile phone 41 and server 15.

In addition, module 201 may be configured to support methods for determining unauthorized access to module 201 (i.e., intrusion detection, and the like). For example, if the correct password to gain access to module 201 is not provided for three (3) consecutive times (or any desired value chosen by a user or a gateway administrator), data stored by module 201 and/or module 201 itself may be deleted.

Additionally, a module 201 on a mobile device may be registered with multiple gateways 115 simultaneously. For example, a module 201 may be registered with a first gateway 115 associated with a GSM network of a first carrier, and communications between module 201 and the first gateway 115 may be transmitted via a GSM modem. The same module 201 may also be registered with a second gateway 115 associated with a CDMA network of a second carrier, and communications between module 201 and the second gateway 115 may be transmitted via a CDMA modem. Module 201 may be registered with any suitable number of gateways 115 in order to facilitate communications with various intended message recipients. Similarly, a gateway 115 may be configured to communicate with a first group of modules 201 associated with a first carrier via a first GSM modem, configured to communicate with a second group of modules 201 associated with a second carrier via a second GSM modem, configured to communicate with a third group of modules 201 via a dedicated short code, and so on. In this manner, gateway 115 may communicate with multiple modules 201 via a cellular modem and/or other communications device appropriate for each particular module 201 (e.g., based on particular mobile phone hardware, for example).

In certain embodiments, gateway 115 may be configured to allow message, such as SMS or IPSMS message, from a module 201 to be delivered only to other modules 201 who are in a common circle of trust with the message sender. Stated another way, in various embodiments, a module 201 may only be permitted to communicate with other members of a predefined group. For example, a module 201 utilized by a sensitive government agency may be permitted to communicate only with other members of the same agency. Moreover, gateway 115 may also be configured to allow an SMS message from a module 201 to be delivered only to other modules 201 who are in a common circle of trust with each other, but not with the message sender. In this manner, gateway 115 may be further secured, as unintended and/or undesired communications outside a particular circle of trust or other group may be reduced and/or eliminated. Further, gateway 115 may be configured to allow an SMS message from a module 201 to be delivered to any other module 201. Moreover, gateway 115 may be configured to contact another gateway 115 for information regarding a module 201 registered with the other gateway 115. Gateway 115 may also be configured to route at least one message of module 201 to another gateway 115.

In various embodiments, gateway 115 may be configured with a "whitelist" comprising a list of approved modules 201 and/or mobile devices which may be authorized to be registered with gateway 115. For example, a user 21 may desire to enroll in mobile banking services offered by third party 31. User 21 communicates the desire to third party 31, who approves the request. The module 201 associated with user 21 may then be added to a whitelist on gateway 115 associated with third party 31. User 21 may then register their module 201 with gateway 115. In this manner, a pre-approved, trusted set of modules 201 may be defined and/or registered such that communications between members of the whitelist and/or one or more third parties may be facilitated. Moreover, each module 201 and/or mobile device in a whitelist may be configured with a unique identification code. The unique verification code may be valid for a limited period of time, for example six hours. In this manner, security may be improved, as a module 201 may be required to both be a member of a whitelist and provide a unique identification code in order to register with gateway 115 and/or to communicate with other modules 201 via gateway 115.

In certain embodiments, third party 32 also provides information to module 61 or module 201 on server 15 through a communication means other than the Internet 10. Such a communication means may be, for example, a private network, a local area network (LAN), a wide area network (WAN), a telephone network, a financial or bank card network, etc. Third parties 31, 32, and 33 are examples of data providers, or personal data providers. Third parties 31 to 33 may be, for example, lottery organizers or operators (e.g., a government agency, a state, or a gambling organization), brokers for lottery organizers (e.g., resellers, convenience stores, or server 15), distributors for lottery organizers (e.g., resellers, convenience stores, or server 15), financial institutions, airlines, bank card providers, merchants, an employer or employee of the user, news providers, health care providers, insurance companies, stock brokers, governmental agencies, non-governmental organizations, etc., or any of these that may be functional on-line.

Module 201, server 15, and/or gateway 115 or other components utilizing encryption may utilize any suitable encryption techniques and/or security models to encrypt, decrypt, compress, decompress, or otherwise manipulate and/or process information, for example symmetric key, asymmetric key, AES, block cipher, and the like. Moreover, module 201, server 15, gateway 115, and/or other components may update, revise, expand, replace or otherwise modify the security model and/or encryption technique utilized, as desired.

Module 201 can be configured to store a set number of messages on server 15, gateway 115, or the user's phone. Module 201 can be configured to store the latest specified number of messages (set by the user, server 15, or gateway 115). Older messages may be deleted to make room for new messages (although permanent means of storage can also be used). Users can mark messages that should be exempt from this deletion process. Such marked messages may be stored until manually deleted by the user, server 15, or gateway 115.

In certain embodiments, users 21, 22, and 23 may communicate with each other through SMS messages or other messages in a secure manner. For example, module 201 or a second software module 72 (described below) on the mobile phone of user 21 may send an SMS message intended for delivery to a mobile phone of user 22. Module 201 is accessed and installed onto the user's mobile phone much like module 61 or module 72 are accessed and installed onto the user's mobile phone. In many embodiments, a text message, large text file, or other information desired to be transmitted may need to be in a particular format in order to be able to transmit it using one or more SMS messages (e.g., due to the limitation of the number of characters that can be transmitted in an SMS message). In one example, numerous text messages are sent from server 15 (or phone 41 of user 21) to phone 42 of user 22, the text messages are compiled at phone 42 of user 22, and user 22 reviews one large text file (or text message) on phone 42. In this example, the transmission of one text message or multiple text messages is seamless to user 22 (e.g., user 22 receives one large text file or text message (instead of multiple text messages)). This format can be useful in sending information using text messages without the limitation of the number of characters typically found in text messaging. Stated another way, when the size of a particular piece of desired information exceeds a message size threshold, multiple messages may be utilized to convey such desired information to and/or from a mobile device.

Figure 3:
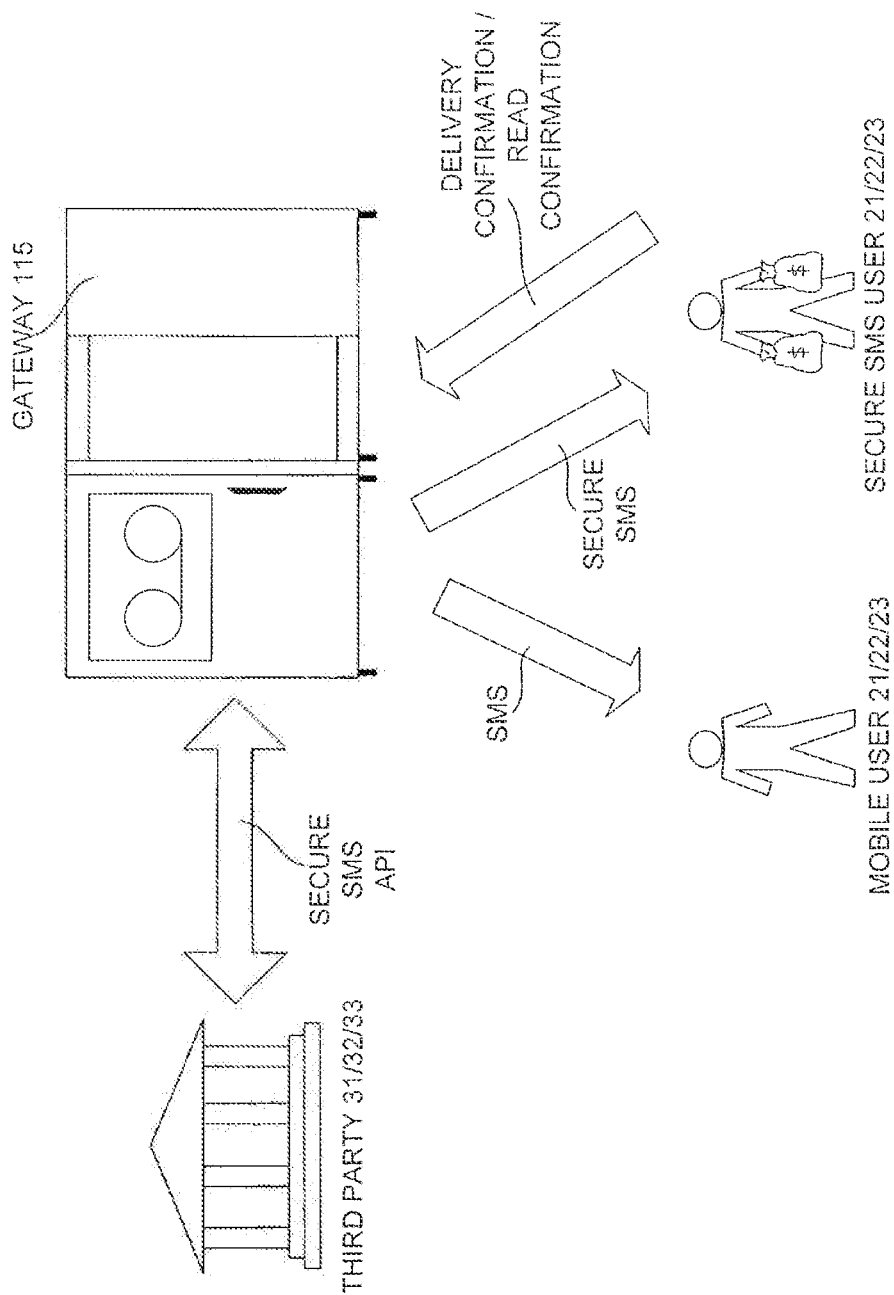
FIG. 3 illustrates communication between mobile users and/or third parties via a gateway 115 in order to create, send, receive, and/or store short messaging service (SMS)

With reference now to FIGS. 3, 4, and 5 and in various embodiments, communications between one or more users 21/22/23 and/or third parties 31/32/33 can be routed through a trusted gateway 115. In this manner, system security may be improved. Gateway 115 communicates with one or more third parties 31/32/33 and/or users 21/22/23 (for example, via mobile phones 41/42/43) to send, receive, and store short messaging service (SMS) messages and multimedia messaging service (MMS) messages in a secure manner. Gateway 115 may also communicate with users 21/22/23 in a conventional (unsecured) manner, if desired. Moreover, users 21/22/23 and/or phones 41/42/43 may download software (e.g., secure SMS module 201) from a server 15. Gateway 115 may be notified of such installation and be configured to communicate with module 201 accordingly.

In an embodiment, gateway 115 may be configured as Software as a Service (SaaS). Gateway 115 may be accessed by third parties authorized to utilize the SaaS via a secure network connection, such as HTTPS. Performance of gateway 115 may be scaled, for example through use of load-balanced server farms. Moreover, gateway 115 may be connected to wireless carrier networks via multiple redundant connections. In this manner, gateway 115 may be configured to support a scalable number of users.

In another embodiment, gateway 115 may be configured as an on-site enterprise server. Gateway 115 may thus be accessed by an organization's internal resources, for example via a dedicated short code hosted with any supported aggregator or carrier. Moreover, gateway 115 may be configured to support a limited-access "circle of trust" allowing communication only between certain authorized users. Gateway 115 may also be configured with a customizable encryption scheme, message storage and/or archiving functionality and other features as desired by a particular organization deploying gateway 115 on-site.

In another embodiment, gateway 115 may be configured as a wireless carrier managed service. Gateway 115 may thus be partially or fully integrated into a wireless carrier's gateway, for example a wireless carrier's short messaging service center (SMSC). Alternatively, gateway 115 may operate as a stand-alone system. For example, gateway 115 may communicate with a SMSC of a first wireless carrier and with a SMSC of a second wireless carrier. Moreover, a gateway 115 may be associated with and/or coupled to any number of SMSCs. Similarly, one SMSC may associated with and/or coupled to any number of gateways 115. In this manner, gateway 115 may be configured to support a scalable number of users in a wireless carrier environment, and gateway 115 may facilitate secure delivery of messages across various networks.

With reference now to FIG. 6 and in various embodiments, one or more of third parties 31, 32, and 33 can create an account associated with gateway 115 (step 602). Third parties 31, 32, and 33 notify users 21, 22, and 23 to download module 201 onto phones 41, 42, and 43 (step 604). Alternately, third parties 31, 32, and 33 can send module 201 to users 21, 22, and 23 through a MMS (Multimedia Messaging Service) or WAP (Wireless Application Protocol) push (step 606). The user downloads the module 201 (step 608). One or more APIs (Application Programming Interfaces) and https (Hypertext Transfer Protocol over Secure Socket Layer) or http (Hypertext Transfer Protocol) can be used between server 15 or gateway 115 and third parties 31, 32, and 33 or users 21, 22, and 23. Moreover, server 15, gateway 115, third parties 31, 32, and 33, and/or users 21, 22, and 23 may communicate via any suitable protocol, method, or means. Accordingly, the methods of the present disclosure are suitable for use on Global System for Mobile Communications (GSM) networks, code division multiple access (CDMA) networks, time division multiple access (TDMA) networks, frequency division multiple access (FDMA) networks, transmission control protocol/internet protocol (TCP/IP) networks, satellite communications networks, and/or the like, and/or any combination of the same.

A secure SMS API is used by third parties 31-33 to send a SMS or MMS message to gateway 115 or server 15 (step 610). A secure SMS API may utilize HTTPS, Web Services, Java API, and/or any other suitable protocols. A determination is made as to whether the user has module 201 loaded on their phone 41, 42, or 43 (step 612). If the user has module 201 loaded on its phone, then the user receives a secure SMS or MMS message on their phone in module 201 (step 614). An acknowledgement message may be sent back to the sender of the message (e.g., user 21, 22, or 23 or third party 31, 32, or 33) (step 616). Once the receiving user opens the message it received (step 618), another acknowledgement message may be sent to the sender via server 15 or gateway 115 confirming that the user opened the message (step 620). If the user does not have module 201 loaded on their phone, then the user may receive a link to download module 201 onto their phone (step 622), the message may be sent in clear text, the message may be skipped, an anonymous message retrieval method (as discussed above) may be utilized, and/or the like.

In various embodiments, with continued reference to FIG. 6, a user downloads module 201 (step 624). When the user elects to send a message from its phone to the phone of another user or third party (step 626), the user enters one or more phone numbers to send a message to in its phone (alternatively, the user may select from a secure address book on the user's phone) (step 628). For example, using a secure address book, the user can import their general address book content (from their phone) into their secure SMS address book (e.g., located in a database created by module 201). The information in the secure SMS address book is encrypted and stored on the phone. In this manner, if the phone is lost or stolen, those with access to the phone may be prevented from extracting personal contact information (or other sensitive information) from the phone.

The user's message is encrypted and sent to gateway 115 (step 630). As previously discussed, a determination is made as to whether the receiving user has module 201 loaded on its phone (step 612). If the user has module 201 loaded on its phone, then the user receives a secure SMS or MMS message on their phone in module 201 (step 614). An acknowledgement (for example, a delivery confirmation) is sent back to the sender of the message (step 616). Once the receiving user opens the message it received (step 618), then another acknowledgement (for example, a read confirmation) is sent to the sender via server 15 or gateway 115 confirming that the user opened the message (step 620). In certain embodiments, when a user replies to or forwards a message, a message identification is included in the message to enable tracking of which message was replied to, forwarded, and the like. In some embodiments, additional information may be embedded into the message, for example a total number of messages, a number representing the sub-message in the message chain, and the like. In this manner, a "thread" of related messages may be managed.

In various embodiments, the sender could log into a website associated with server 15 or gateway 115 to determine if the message has been delivered and opened. In another example, when the receiving user opens the message, module 201 automatically deletes the message within a predetermined period of time after the message is opened. In another example, when the receiving user opens and closes the message, module 201 automatically deletes the message (either immediately or within a predetermined period of time after the message is closed). Server 15, gateway 115, or module 201 can create such an automatic deletion process by including a field in the header of the message (or in the body of the message) with a command to delete the message upon one of the exemplary events (or other defined event, time period, and the like). Users and third parties can view the status of every message. For sent messages, users and third parties can tell when each message was sent, when each message was delivered, and when each message was opened (e.g., via time, date, and status information about the message). For example, one or more icons may be provided (e.g. within module 201, via a web browser, and the like) in order to indicate the status of a particular message (e.g., sent, delivered, read, replied to, forwarded, deleted, and the like).

With reference now to FIG. 7 and in some embodiments, third parties 31, 32, and 33, and/or users 21, 22, and 23 can elect to wipe their phone (e.g., delete one or more items of information or data) remotely (step 702). For example, if a phone is lost, misplaced, or no longer being used, wiping the phone of any personal information, messages, or other information may be desired. Third parties 31, 32, or 33, and/or users 21, 22, or 23 may utilize a secure SMS API or other method to send a wipe command to one or more phones (step 704). In one example, the user can access the third party's website or server 15 in order to send a wipe command to the user's phone (step 706). Gateway 115 authenticates the user, encrypts a wipe command, and sends the encrypted wipe command to the user's phone via a SMS or MMS message, or via other suitable method (e.g., within the body of a message, in the header of a message, and the like) (step 708). Module 201 on the user's phone receives the encrypted wipe command and decrypts the encrypted wipe command (step 710). A secure SMS database (created by module 201) on the user's phone is deleted based on the decrypted wipe command (step 712). Moreover, a wipe command may also result in deletion of data other than or in addition to a secure SMS database. For example, via a wipe command, the memory contents of a phone or data for other applications may be at least partially and/or entirely wiped, deleted, reset, and the like. Additionally, module 201 may be configured to automatically wipe a secure SMS database and/or an entire phone memory responsive to repeated failed local authorization attempts or other reasons as desired. In this manner, security of data located on a phone may be enhanced.

Moreover, in various embodiments, one or more components of system 100 may be configured to log, record, or otherwise monitor communications between a phone and a server, for example, to detect attempts to "spoof" or otherwise impersonate a phone or other telecommunications device, or otherwise misrepresent the origination or other attributes of one or more messages. System 100 may also inform a user, a system administrator, a third party, and the like, of the contents of such records, for example, attempts to spoof a user's identity or to send messages purporting to come from a particular user or a particular mobile device.

Turning now to FIG. 8, in some embodiments, a user sends a message from one phone to another (e.g., from phone 41, 42, or 43 to phone 41, 42, or 43) in a secure manner (step 802). Prior to sending the message, the message is encrypted on the first phone (e.g., using a first encryption key) (step 804). The encrypted message is sent to gateway 115 (or server 15) (step 806) and gateway 115 (or server 15) receives the encrypted message (step 808). The encrypted message is decrypted at gateway 115 (or server 15) (e.g., using the first encryption key) (step 810). A determination is made as to whether the message is from one phone to another of a user (step 812). If the message is not from one phone to another of a user (e.g., from a user phone to a third party), then the message is sent to the third parties server, for example using Web Services, Java remote method invocation (RMI), HTTP/S Post, and the like (step 814). A delivery confirmation may then be sent to the phone. If the message is from one phone to another of a user, then the message is encrypted (e.g., using a second encryption key) at gateway 115 (or server 15) for the recipient user (step 816). The encrypted message is sent to the receiving user's phone (step 818). The receiving user's phone receives the encrypted message. (step 820). A delivery confirmation is sent to gateway 115 (or server 15) that the message was delivered to the receiving user's phone (step 822). The encrypted message is decrypted (e.g., using the second encryption key) at the receiving user's phone and opened. A delivery confirmation may be displayed on the sender's phone by changing the icon associated with the sent message, or may be shown on a status page. Once the receiving user opens the decrypted message, an open acknowledgement or other suitable read confirmation is sent to gateway 115 (or server 15) (step 824). Gateway 115 or server 15 may forward the open acknowledgement to the sender's phone. The open acknowledgement may be displayed on the sender's phone by changing the icon associated with the sent message, may be shown on a status page, and/or the like.

In various embodiments, the original message sent is encrypted differently than the message finally received, so that only users or third parties who have the relevant encrypted key can decrypt, open, and read the message. Each user or third party can have their own unique key, so that one user or third party cannot access, open, or read another user or third party's message. Each unique key can also be changed as desired, for example periodically, for additional security. Moreover, a user may modify its own encryption key manually or at a specific time interval. This key change made by the user is communicated to gateway 115 to keep module 201 in synchronization with gateway 115. Moreover, the encryption key associated with a particular mobile device may be stored off the mobile device for additional security.

In certain embodiments, an encryption key associated with a particular module 201 may be updated. Gateway 115 is configured with two encryption keys per module 201, a current key and a new key. Module 201 is configured to use the current key. Responsive to a predetermined interval, a key change request from module 201, and/or a key change instruction from gateway 115, module 201 is configured to replace the current key with the new key. The current key is kept active on gateway 115, and a new key is generated. A key change command, including the new key, is sent to module 201. The status of module 201 is changed to from "current" to "pending". Messages to and from module 201 are held in a queue on gateway 115 until the status of module 201 returns to "current".

When the key change command is received by module 201, module 201 stores the new key in place of the current key, and transmits a key change acknowledgement to gateway 115 using the new key. When gateway 115 receives the key change acknowledgement from module 201, the new key is copied to the current key, and the new key is set to a blank value. The status of module 201 is changed to "current". Messages in the queue for module 201 may then be processed utilizing the current key (which was formerly the new key), and messages sent and/or received using the old key (formerly the current key) will fail and may be logged.

In the event module 201 does not return a key change acknowledgement after a key change command is sent to module 201, gateway 115 may re-send the key change command to module 201 one or more times. If a key change acknowledgement is not received from module 201, for example within a predetermined time period, in response to a predetermined number of transmitted key change commands, and the like, the status of module 201 may be changed to "suspended". Moreover, gateway 115 may be configured to periodically check all pending key change requests, resend key change commands, and/or disable one or more modules 201, as appropriate.

If module 201 is suspended responsive to an uncompleted key change, or disabled by an administrator associated with gateway 115, module 201 may be required to re-register with gateway 115. Upon re-registration with gateway 115, the status of module 201 may be set to "current" and queued messages for module 201 may be processed.

In various embodiments, one or more messages may be queued and/or otherwise stored on gateway 115. Messages queued on gateway 115 may be encrypted via a third encryption key, for example a storage encryption key associated with gateway 115. Queued messages may be marked for automatic or manual processing. Messages marked for automatic processing may be processed when the associated module 201 returns to "current" status. Messages marked for manual processing may be processed via a system administrator or other manual process. Messages may be kept in a queue for a predetermined period of time, for example three days. Messages which have been in a queue longer than a predetermined period of time may be archived.

As discussed above, in various embodiments, module 201 may have a status associated therewith, for example "pending", "whitelisted", "current", "suspended", "disabled", and the like. A whitelisted module 201 has been placed on a whitelist but has not registered with gateway 115. A current module 201 has registered with gateway 115 and its encryption key is up-to-date. A pending module 201 has registered with gateway 115 and a key change command has been sent to module 201, but a key change acknowledgement has not yet been received from module 201. A suspended module 201 has registered with gateway 115 and a key change command has been sent to module 201, but a key change acknowledgement has not been received from module 201 within an allowed time, within a predetermined number of requests, and the like. A disabled module 201 was once registered with gateway 115, but has been disabled by an administrator or other supervisory entity associated with gateway 115, for example in response to an unpaid bill, a report of a lost mobile device, repeated entry of an incorrect password, and the like.

When module 201 is pending, messages may be queued. When module 201 is whitelisted, messages may be queued. When module 201 is current, messages may be processed. When module 201 is suspended, messages may be queued. When module 201 is disabled, messages may be flagged as invalid and/or deleted. Moreover, module 201 may be associated with any appropriate status, and messages associated with module 201 may be queued, processed, deleted, and the like, in any suitable manner to enable secure communications between module 201 and gateway 115.

A message sender can run reports to determine which messages have been received and/or read/opened. Moreover, server 15 and/or gateway 115 may be configured to store various information related to a user, for example a "mirror" or duplicate copy of one or more items of information stored on a users phone (e.g. personal information, credit card information, identification information, financial information, health records, and the like), records of user messages sent and received, and the like. Because server 15 and/or gateway 115 may track, monitor, and/or store each message in and out of server 15 and gateway 115 (and whether the message was delivered and opened, and the like), such tracking of information can be used for compliancy reports (e.g., under the Sarbanes-Oxley Act or Federal Information Security Management Act), audit trail evidence, internal company control of information within company (e.g., through information technology) or in and out of company, fraud risk assessment and detection, or any other desired use. Since gateway 115 tracks delivery of every message, gateway 115 can be configured to resubmit a message that has not been delivered (e.g., due to error or any other reason). Gateway 115 can be configured to set the duration between resubmission of a message to a predetermined period of time or based on the status of the message (e.g., received, opened, and the like).

The present disclosure also provides various methods, including, for example, methods of managing information for a number of users, methods of authorizing actions, methods of authenticating transactions, methods of authenticating access, and methods of alarming as to proximity to a location. FIGS. 9 and 10 illustrate examples of such methods, and different methods in accordance various embodiments may include a selection of the operations or acts shown in FIGS. 9 and 10, described herein, or both, which may be performed or accomplished in the order presented, or in many embodiments, in a different order.

Turning now to FIG. 9, this figure is a flowchart illustrating examples of various methods, including, for instance, methods of managing information for a number of users using the Internet and mobile phones of the users. Many embodiments have some but not all of the acts shown in FIG. 9. In certain embodiments, method 900 includes receiving information from a user (act 905). This may include, in some embodiments, at least for some of the users, receiving a first set of personal information (e.g., of the user) from the user through at least one of the Internet and the mobile phone of the user.

For example, user 23 shown in FIG. 1 may access website 65 through computer 13 and the Internet 10, may open an account, and may enter information, select options, etc. Information that may be entered or selected may include, for example, names of financial institutions, account numbers, names of airlines, frequent flyer numbers, names of insurance companies, insurance policy numbers, driver's license numbers, passport information, and the like. In some cases, this personal information may be complete, while in other cases, the first set of personal information may include information to facilitate receipt or completion of information from one or more third parties (e.g., 31 to 33), such as by identifying the third parties, accounts, and the like.

In certain embodiments, method 900 further includes downloading a mobile phone module (act 910). In some embodiments, for example, for multiple users, the user instructs the server (e.g., 15) or selects at a website (e.g., 65) to download a mobile phone module, for example, second software module 72, 77, or both, shown in FIG. 1. In a particular embodiment, for instance, second software module 72 is downloaded from first software module 61 through the Internet 10 and mobile phone network 40 to mobile phone 41, upon instruction by user 21. In other embodiments, software module 72 may be downloaded to mobile phone 43, for example, through the Internet 10, and computer 13, for instance, through a USB port or a wireless network. In other embodiments, software module 72, 77, or both, may be loaded onto the phone at a store where the mobile phone was purchased, or at an establishment of the entity that controls server 15, that operates website 65, or that provides a service or system of managing information for a number of users.

In various embodiments, method 900 further includes transmitting information to a different party (act 955). In many such embodiments, the user may (e.g., first) select, or otherwise provide instructions or commands to send certain information to the third party (evaluated in act 950). In particular, in some embodiments, (e.g., in the order indicated or in another order), at least for several of the users, method 900 may include, upon instruction by the user (e.g., evaluated in act 950), transmitting (e.g., in act 955) at least a portion of the second set of personal information (e.g., received in act 915, selected in act 920, transmitted in act 935, or a combination thereof) to a different party mobile phone. In some embodiments, this may be accomplished through the mobile phone network (e.g., 40) for storage on the different party mobile phone, for instance, for access by the different party.

Referring to FIG. 1 for an example, user 21 may provide an instruction or command (e.g., in act 950), for instance, through user 21's mobile phone 41, to send at least a portion of the information received (e.g., in act 935), to different user 22, specifically, via mobile phone 42. In different embodiments, mobile phone 41 may send the portion of the information to mobile phone 42, for example, through mobile phone network 40, or mobile phone 41 may instruct server 15 or first software module 61 to send the portion of the information to mobile phone 42, for instance, through the Internet 10, mobile phone network 40, or both, as examples. In some embodiments, delivery may be certified, or delivery may be tracked and the sender may be notified when delivery has been accomplished, or alternatively, when delivery has been unsuccessful.

In some embodiments, the first software module 61 receives a command (e.g., in act 950) from the user (e.g., 21), for instance, through mobile phone network 40, and upon the receipt of the command (e.g., in act 950), transmits (e.g., in act 955) at least a portion of the nuggets (e.g., 78) or fraction of the personal information to the different party (e.g., 22) through the Internet 10. In some embodiments, the system (e.g., system 100) may send the particular information, fraction thereof, or nuggets in different ways (e.g., in act 955), depending on whether the different party is a user of system 100 [e.g., has visited website 65 and elected to have their personal information managed by system 100, or has downloaded (e.g., act 910) or otherwise received, or has installed, the second software module 72 on their mobile phone].

In some embodiments, the user (e.g., 21) may select (e.g., in act 950) at least a portion of the personal information that is stored on the mobile phone (e.g., 41), select or enter (e.g., in act 950) an identifier of at least one of a different party (e.g., 22) and a different party mobile phone (e.g., 42), and elect (e.g., in act 950) to send (e.g., in act 955) the at least a portion of the personal information to the different party mobile phone (e.g., 42). In many embodiments, the first software module 61 evaluates whether the different party mobile phone (e.g., 42) contains a copy of the second software module 72, and if the different party mobile phone (e.g., 42) contains a copy of the second software module 72, then the first software module 61 sends (e.g., in act 955) the portion of the personal information to the copy of the second software module 72 on the different party mobile phone (e.g., 42), for example, through the mobile phone network 40 (e.g., by SMS). In some embodiments, delivery may be certified, or a notification message may be sent (e.g., by SMS to user 21) when delivery has been accomplished, or alternatively, after a certain amount of time or number of attempts when delivery has been unsuccessful.

Still referring to FIG. 9, in many embodiments, method 900 further includes receiving a local signal (act 960), transmitting a local signal (act 965) or both. As used herein, a local signal is a signal that is transmitted and received without going through the main transmitter that the mobile phone uses for placing telephone calls and without going through the main receiver that the mobile phone uses for receiving telephone calls. In addition, a local signal does not go through the mobile phone network (e.g., 40). For example, a local signal from mobile phone 42 may be transmitted by local transmitter or communications device 82 and received (i.e., directly) by reader or communications device 88, or vice versa. Examples of local signals include near field communication (NFC) signals and Bluetooth communication signals, for example, that use transmitters, receivers, or both (e.g., device 82), on the mobile phone that are separate from the transmitter and receiver that are used for telephone conversations.

In particular embodiments, method 900 further includes, for each of multiple users, using signal receiving hardware (e.g., device 82 shown in FIG. 1) located on the user's mobile phone (e.g., 42), and using the second software module (e.g., 72), under the control of the user (e.g., user 22), receiving (e.g., in act 960) a local signal from a transmitter (e.g., device 88) within proximity to the mobile phone (e.g., 42). Further, some embodiments include, for example, for each of a number of the users, using local signal transmitting hardware (e.g., device 82) located on the user's mobile phone (e.g., 42), and using the second software module (e.g., 72), under the control of the user (e.g., 22), transmitting a local signal (e.g., in act 965) that includes at least a portion of at least one of the first set of personal information (e.g., received in act 905) and the second set of personal information (e.g., received in act 915) to a reader (e.g., device 88) within proximity to the mobile phone (e.g., 42). As used herein, "proximity", in this context, means within ten (10) feet, and "close proximity" means within one (1) foot.

In certain embodiments, method 900 further includes organizing certain information (act 970), for example, information that is handled by system 100. For example, in many embodiments, the second software module 72 organizes (act 970), at the mobile phone (e.g., 41), the fraction (e.g., nuggets 78, 79, or both) of the second set of personal information (e.g., selected in act 920 and transmitted in act 935), which may include, in various embodiments, where applicable, decrypting the information, decompressing the information, making the fraction of the second set of personal information accessible to the user (act 975), for instance, on the user's mobile phone, or a combination thereof. In some embodiments, for each of multiple users, the second software module (e.g., 72) organizes (act 970) the fraction of the second set of personal information based on topic and makes the fraction of the second set of personal information (e.g., nuggets 78, 79, or both) accessible (act 975) to the user (e.g., 21), for instance, based on the topic of the information (e.g., in folder or folders 76).

In various embodiments, some or all of the acts of method 900 may be repeated. For example, in some embodiments (e.g., for each of some or all of the users) method 900 may involve repeating, at least a number of times, the receiving (act 915), for example, of the second set of personal information, the selecting of the fraction (act 920), and the transmitting of the fraction act 935). In many embodiments, where applicable, the encrypting (act 925), compressing (act 930), providing of an alarm (act 945), transmitting of information to a different party (act 955), receiving or transmitting (or both) of local signals (acts 960, 965, or both), the organizing of the information (act 970), the providing of the information to the user (act 975) or a combination thereof, may be repeated, as appropriate. Further, in some embodiments, the receiving of information from the user (act 905) may be repeated, but may be repeated less often than certain other acts, such as the receiving of information from third parties (act 915), for instance.

In many embodiments (e.g., for each of multiple users), the repeating includes (e.g., as part of act 970) replacing at least a portion of the fraction of the second set of personal information that is stored on the user's mobile phone, while maintaining the organization of the information, for instance, based on the topic of the information. Further, in various embodiments, for each of more than one of the users, the repeating includes (e.g., as part of act 970) synchronizing at least a portion of the fraction of the second set of personal information that is stored on the user's mobile phone with corresponding personal information that was already stored on the mobile phone, while maintaining the organization of the information based on the topic of the information. As used herein, "synchronizing" of information includes both replacing and appending the information, while sorting or maintaining a sorted organizational structure based on topic. Topics may include, for example, travel information, account information (which may be sorted for different accounts), bank card information, loyalty information, insurance information, etc.

In various embodiments, a user (e.g., 22) may be able to use a mobile phone (e.g., 42) to gain access to a physical space, such as an elevator, floor or area of a building, parking garage, etc. Access may be obtained, in some embodiments, for example, by passing the phone (e.g., 42) by or over a reader (e.g., communications device 88), transmitting a local signal (e.g., in act 965), for example, using near field communication (NFC). In some embodiments, for instance, user 22 selects the desired code or number on phone 42, and then rubs phone 42 against the reader or device 88 or passes phone 42 over or by device 88. In certain embodiments, user 22 may provide or select the code by name, for example, "elevator", which may be selected from a menu on mobile phone 42 or input as a voice command, for instance.

In some embodiments, the mobile phone (e.g., software module 72 on phone 41) may prevent the user (e.g., 21, or another user who might not be authorized) from accessing module 201 or module 72 if the software (e.g., 72) or the phone (e.g., 41) has not been used for a specified period of time (for example, one minute, two minutes, and the like), if the user has failed to provide the correct password for the software (e.g., 72), if a remote lock command has been received by phone 41, and the like. Access to module 201 and/or module 72 may afterward be restored, for example via entry of the correct password. In other embodiments, the software (e.g., software module 72 on phone 41) may provide the GPS coordinates of the phone (e.g., to module 61 on server 15) at regular intervals, upon accessing or exiting the software (e.g., 72), upon accessing the phone, upon sending a secure message, upon turning the phone off, upon turning the phone on, upon running out of battery charge, or a combination thereof, as examples. In various embodiments, GPS coordinates or other location data may be transmitted as a secure SMS message from module 72 on phone 41 to module 61 on server 15. Moreover, a delivery acknowledgement, an open acknowledgement, and/or the like, may also include GPS coordinates, timestamp information, cell tower triangulation information, and/or the like.

As described herein, specific embodiments include, among other things, ways to communicate information to other electronic devices, and, in certain embodiments, ways to affirmatively make selections. In some embodiments, the electronic device or reader (e.g., device 88) may query the phone (e.g., 42) for the particular information that is needed, a handshake routine may be followed, or both. In some embodiments, an affirmative act of assent may be required, at least for certain functions, for example, to authorize a transaction or payment, or to authorize access. Such an act of assent may include, in some embodiments, for example, user 22 entering a personal identification number (PIN) or a password into a graphical user interface or keyboard on the mobile phone, providing a signature on a touch pad, providing a biometric, passing the phone (e.g., 42) by an NFC reader (e.g., device 88), or the like.

Further, in some of these embodiments, for yet another example, the first software module (e.g., module 61) includes programming instructions to receive (e.g., in act 905) instructions from the user identifying at least one threshold for alarm (e.g., used in act 940) for at least a portion of the particular information (e.g., nugget 78). In some of these embodiments, at least one of the first software module (e.g., 61) and the second software module (e.g., 72) includes programming instructions to compare (e.g., in act 940) at least a portion of the particular information to the threshold. And in some such embodiments, at least one of the first software module (e.g., 61) and the second software module (e.g., 72) includes programming instructions to provide an alarm (e.g., in act 945) to the user if the particular information passes the threshold (e.g., in act 940).

Figure 2:
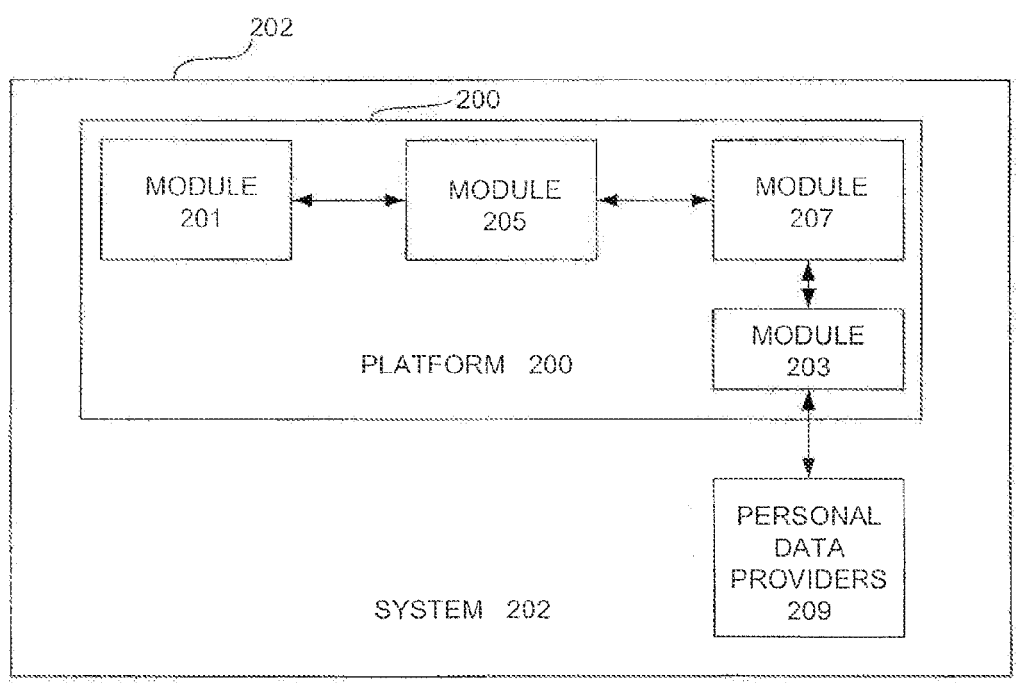
FIG. 2 is a block diagram illustrating an example of a systems for managing and disseminating information and/or messages for a number of users, which system can be used in connection with the present invention.

Referring now to FIGS. 1, 2, and 11, in a particular embodiment provided as an example, system 202 manages personal information and/or enables secure communication for any number of users, and includes a SECURE MOBILE INFORMATION MANAGEMENT™ (SMIM) platform 200 and Personal Data Providers 209. SMIM platform 200 is an example of a technology platform for system 100 which enables mobile phone users (e.g., 21 to 23) to have access to certain personal information via their mobile phone (e.g., 41 to 43), in some embodiments, even when there is no signal or internet connection for the cell phone (e.g., from mobile telephone network 40). In this embodiment, SMIM platform 200 includes one or more blocks of code configured to provide the framework and foundation of system 100 and encompasses functionality from defining standards under which development takes place to defining security, to communication between components and various core software applications.

In certain embodiments, SMIM platform 200 includes module 201 (e.g., MICRO AGENT™ module or MICRO AGENT TECHNOLOGY™ (MAT) module) and module 203 (e.g., WEB SERVICES module or CELLTRUST WALLET WEB SERVICES™ module). In this example of an embodiment, module 201 runs on mobile phones, and is an example of the second software module 72, or a portion thereof, and module 203 is an example of first software module 61, or a portion thereof. In this example, module 203 is a block of code or software that runs on server 15 and that communicates with or exchanges data with module 201 on the phones, website 65, and secure storage 64, for example. Module 203 may be a communication layer between module 201, website 65, and storage 64, for instance. Module 203 may provide or allow authentication, communication, protocol definition, auditing of the integrity of data, prevention of unauthorized access, and so on, and may allow access to website 65 from the Internet 10. Module 201 allows users 21, 22, and 23 to create, send, receive, and store secure SMS and MMS messages via phones 41, 42, and 43.

Module 203 also, in various embodiments, allows third parties (e.g., 31 to 33) or Personal Data Providers 209 (e.g., banks, airlines, merchants, health care providers, and the like) to communicate with a customer (for example, to update their customer's accounts or personal information on storage 64, website 65, and/or secure areas thereof, to exchange electronic medical records in a HIPAA-compliant manner, to provide flight information and/or booking, and so forth). Module 201 or second software module 72 provides a user interface, local storage, synchronization, and alerts components, in this embodiment on one or more of phones 41 to 43. Further, in certain embodiments, a user interface, within mobile phone 41 or second software module 72, may gather information from the user (e.g., 21) and provide information back to the user. For example, Personal Data Providers 209 include financial institutions, airlines, retailers, or merchants. Module 203 allows Personal Data Providers 209 to update customer accounts or personal information such as bank account information and statements, flight information, credit card information and charges.

In some embodiments, local storage (e.g., folder 76 on mobile phone 41) enables the application (e.g., second software module 72) to store information (e.g., nuggets 78 and 79 of information) on the phone (e.g., 41), which may provide for faster access, reduce dependence on the network (e.g., mobile phone network 40, the Internet 10, or both), and may reduce the total cost of ownership by limiting the amount of data communication through mobile phone network 40 that takes place (e.g., at the expense of user 21). In some embodiments, the data (e.g., nuggets 78 and 79) on the phone (e.g., 41) is synchronized with data on server 15 to ensure that the user (e.g., 21) has access to updated information both on their phone (e.g., 41) and on the web (i.e., Internet 10, which may be accessed, at least by user 23, through computer 13, for instance).

In certain embodiments, data is compressed, encrypted, or both, for communication with the mobile phone or device (e.g., between module 201 and module 203 or between the first software module 61 and the second software module 72). In addition, in some embodiments, alerts may provide substantially real time notification of various events or activities that can be sent to a phone (e.g., 41) running module 201 (an example of module 72, or a portion thereof). For example, alerts may inform the user of an important or critical event such as a large withdrawal from their account or a flight cancellation, flight changes, gate changes, or the like. In addition, in some embodiments, module 207 provides a middle tier between users (e.g., 23) operating on their computers (e.g., 13) and module 205, module 201, or both. In some embodiments, module 203 may provide information (e.g., from Personal Data Providers 209) to module 207, which may then be provided to module 205, module 201 (e.g., on the mobile phones), or both.

As used herein, "passive" or "passively" means to not be powered by the battery or electrical system of the phone or electrically connected to the phone (or another battery or electrical system). Further, as used herein, in this context, the "component" of the phone excludes disposable packaging for the phone (that may contain a bar code for product sales or tracking purposes, for example). Further, in some embodiments, the component is comprises a back of the mobile phone, a battery cover of the mobile phone, a battery for the mobile phone or a case for the mobile phone, as examples.

Further, in some embodiments, the mobile phone has a phone number and the passive code comprises the phone number of the mobile phone. Further, in some embodiments, for another example, the passive code comprises a number that is unique to the component from all other components for mobile phones and all other mobile phones. In other embodiments, the passive code may comprise or include the name of the user, an indicia for the user, an indicia for an account, a portion thereof, or a combination thereof, as examples.

With further reference to FIG. 1, website 65 may include a main or home page (or more than one such page) to which new users and new third parties may be directed. New users may be directed to this page or pages or to website 65 by search engines, advertisers, brokers, agents, or the like, as examples. Users (e.g., 21 to 23) may be assigned (or asked to elect) user names, user ID's, passwords, and/or the like, which they may use to access secure areas or pages of website 65, for example, where their personal information may be entered, displayed, updated, and/or the like. In some embodiments, security of such areas may be provided, for example, using novel systems and methods which may be described herein, for instance. In some embodiments, these secure areas may include information entered by third parties (e.g., 31, 32, and 33). Further, in some embodiments, third parties (e.g., 31 to 33) may have their own secure areas (e.g., that are password protected, or protected as described herein), for example, within website 65 or on server 15 or another server, in which the third parties (e.g., some or all of 31, 32, and 33) may be able to enter, view, update, or a combination thereof, information for a number of users.

In some embodiments, the first software module 61 filters the personal information and selects nuggets of the personal information which the first software module 61 sends to the mobile phone (e.g., 41) of the appropriate user (e.g., 21). As used herein, a "nugget of information" is a discrete piece of information that is a subset of the total information. Nuggets of information may be in digital form, for example, and may be in text form, in the form of numbers or values, or a combination thereof, as examples. In some embodiments, nuggets may include pictures, text, graphics, or the like, as further examples. These nuggets may be sent, for example, through mobile phone network 40, for instance, and may be sent as text, MMS messages, or SMS messages, for instance. In some embodiments, server 15 may access mobile phone network 40 through the Internet 10, for example.

In various embodiments, a second software module 72, is operating (e.g., independently) on more than one of the mobile phones (e.g., 41 to 43, although module 72 is shown only on phone 41). Further, in this embodiment, the second software module 72 is configured to receive the nuggets of the personal information of the user (e.g., 21) from the first software module 61 through the Internet 10 and through mobile phone network 40, and to store the personal information on mobile phone 41 so that the personal information may later be accessed by user 21, for example, even when mobile phone 41 is not connected to mobile phone network 40. User 21 may access the personal information, for instance, by viewing folder 76 containing nuggets 78 and 79, which may be organized by subject matter, for example. One such subject may be financial information, for example, which may include account balances, transaction records, and the like, and another such subject, in some embodiments, may be travel information, as another example, which may include, for example, flight departure times and locations, and the like. Other examples of subjects are described herein, and include insurance information, bank card information, medical records, appointments, and the like.

In some such embodiments, for multiple users (e.g., 21 to 23), second software module 72 is downloadable by the users from first software module 61 to the mobile phones (e.g., 41 to 43), for example, through website 65, through the Internet 10, through mobile phone network 40, or a combination thereof. Further, in some embodiments, for many of the users (e.g., 21 to 23), first software module 61 includes instructions to search some or all of the e-mails received for or to the users (e.g., 21 to 23) for keywords, identifying numbers, or both, and to select the nuggets (e.g., 78 and 79) of the personal information from the e-mails using the keywords, identifying numbers, or both. For example, software module 61 may search e-mails received for a specific user (e.g., 21, 22, or 23) for account numbers, flight numbers, names of third parties (e.g., one or more of 31, 32, and 33), etc., and may extract nuggets of information pertaining thereto. In some embodiments, software module 61 may search all e-mails (e.g., sent to particular users), while in other embodiments, only e-mails from certain sources, or certain e-mail addresses may be searched.

In addition, in some such embodiments, for many or all of the users, second software module 72 contains instructions to allow the user (e.g., 21) to select at least a portion of the personal information that is stored on the mobile phone (e.g., select nugget 78), select or enter an identifier of at least one of a different party (e.g., 22) and a different party mobile phone (e.g., 42), and elect to send the personal information (e.g., nugget 78) to the different party mobile phone (e.g., 42). Examples of such a different party are other users, for instance, for user 21, users 22 and 23 may be different parties, and their phones 42 and 43 may be different party mobile phones. Examples of such an identifier include the name of the different party, the phone number for the different party, a user identification number, etc. In many embodiments, for multiple users, the first software module 61 further contains instructions to evaluate whether the different party mobile phone has certain functionality or contains a copy of particular software, such as second software module 72.

In some such embodiments, if the different party mobile phone contains a copy of the second software module 72, for example, then the first software module 61 may send the (at least a) portion of the personal information to the copy of the second software module 72 on the different party mobile phone, for instance, through mobile phone network 40, the Internet 10, or both. On the other hand, in some embodiments, if the different party mobile phone does not contain a copy of the second software module 72, for example, or in some cases other software having adequate equivalent functionality, then the first software module 61 may send the (at least a) portion of the personal information to the different party mobile phone, in another form, for instance, in the form of a standard e-mail or text message.

In other embodiments, software module 72 may send the information directly to the different party rather than having the first software module (e.g., module 61) do it. In some embodiments, for more than one of the users, the first software module 61 further contains instructions to receive a command from the user (e.g., from user 21), for instance, through mobile phone network 40, and upon the receipt of the command, to transmit at least a portion of the nuggets of the personal information to a different party (e.g., to user 22 or 23, or specifically, in some embodiments, to their phones 42 or 43), for example, through the Internet 10.

In addition, in some embodiments, for many or all of the users, first software module 61 contains instructions to receive a command from the user (e.g., one of users 21 to 23), for instance, through mobile phone network 40, to dispute a financial transaction for a particular account described in the nuggets of the personal information. In particular embodiments, for example, upon the receipt of the command, first software module 61 may contain instructions to transmit a dispute of the transaction to a manager of the particular account through a network, such as Internet 10, for example. The manager of the account may be third party 33, for example, and may be a bank or financial institution, for instance. Such a dispute of the transaction may be transmitted to the third party (e.g., 33) in the form of an e-mail or a text message, for example, sent via the Internet 10, mobile phone network 40, or both, while in other embodiments, a dispute of a transaction may be sent through a private or financial network, as another example.

In various embodiments, software module 72, software module 61, and/or various other components may be configured to support a particular application and/or user group, for example mobile banking, entry of health care information, domain registration, airline check-in, intra- and inter-government agency communication, enterprise communication, and the like.

Further, in some embodiments, some or all of the mobile phones (e.g., 41 to 43) may be configured to transmit, receive, or both, local signals. For example, mobile phone 42 includes local transmitter, receiver, antenna, or a combination thereof, local communication device 82, which, in this embodiment, communicates with reader or local communication device 88. In different embodiments, device 88 may read signals, send signals, or both. Communications devices 82 and 88 may exchange signals in one or both directions through near-field communications, a personal area network, Bluetooth, bar codes, WiFi, or the like, as examples.

Various embodiments also include second software module 77 for running (e.g., that is running) on the user's mobile phone (e.g., the appropriate one of phones 41 to 43). Second software module 77 may include programming instructions to store (e.g., in folder 76) the particular information on the user's mobile phone (e.g., the appropriate one of phones 41 to 43), and provide access to the particular information by the user (e.g., one of users 21 to 23). Such a second software module 77 may be recorded on a computer readable medium, for instance, such as a hard drive, random access memory (RAM) read only memory (ROM), a disk, a memory stick, or the like, as examples.

In some embodiments, second software module 77 may be stored or recorded on a server (e.g., server 15), for downloading onto the user's mobile phone (e.g., the appropriate one or more of phones 41 to 43). In a number of embodiments, second software module 77 may be recorded on memory within the user's mobile phone (e.g., the appropriate one of phones 41 to 43), for example. Such a second software module 77 may be, for example, part of software module 72 shown in FIG. 1 on mobile phone 41. The particular information may be, include, or be included within, for example, the nuggets 78, 79, or both, for instance, as described herein.

Further, in some embodiments, first software module 67 or 61 includes programming instructions to encrypt the particular information before sending the particular information to the user's mobile phone (e.g., 41). In some embodiments, second software module 77 or 72 includes programming instructions to decrypt the particular information. Even further, in some embodiments, first software module 67 or 61 includes programming instructions to compress the particular information before sending the particular information to the user's mobile phone (e.g., 41). And in some embodiments, second software module 77 or 72 includes programming instructions to decompress the particular information. Decryption and compression may be used together or separately in different embodiments.

Additionally, in certain embodiments, first software module 67 or 61 includes programming instructions to receive instructions from the user (e.g., user 21) identifying at least one threshold for alarm for at least a portion of the particular information. In particular such embodiments, first software module 67 or 61 or second software module 77 or 72 (or a combination thereof) includes programming instructions to compare at least a portion of the particular information to the threshold. Furthermore, in some embodiments, first software module 67 or 61 or second software module 77 or 72 (or a combination thereof) includes programming instructions to provide an alarm to the user if the particular information passes the threshold. Such an alarm may be, for example, in a manner described herein, such as an audible alarm a light or display, a vibratory alarm, or a combination thereof.

In some embodiments, for example, for one or more of multiple users (e.g., users 21 to 23), the particular information includes financial account information, which may include, for instance, amounts of withdrawals or debits from an account, such as a financial or bank account. In certain embodiments, the (e.g., at least one) threshold may be, or include, the amount of a withdrawal or debit, for example, and first software module 67 or second software module 77 (or both) may include programming instructions to provide an alarm to the user [e.g., the appropriate one (or more) of users 21 to 23] if a withdrawal or a debit (or both) exceeds the threshold. In another example, in some embodiments, for each of a number of the users (e.g., users 21 to 23), the particular information includes travel information, which includes a departure time, a departure location (e.g., a departure gate), or both. In some such embodiments, first software module 67 or second software module 77 (or both) includes programming instructions to provide an alarm if there is a change in the departure time or the departure location (or both), as examples. In other embodiments, alarms may be provided for other thresholds or other criteria.

Further, in a number of embodiments, for one or more of the users (e.g., users 21 to 23), second software module 77 contains programming instructions to allow the user (e.g., user 21) to select at least a portion of the particular information that is stored on the mobile phone (e.g., 41), select or enter a third party mobile phone number (e.g., the phone number of user 22), and elect to send at least a portion of the particular information to the third party mobile phone (e.g., to mobile phone 42 of user 22). In some embodiments, at least for many users (e.g., user 21), first software module 67 further contains instructions to evaluate whether the third party mobile phone (e.g., mobile phone 42 of user 22) contains a copy of second software module 77, module 72, or both. In some such embodiments, if the third party mobile phone (e.g., mobile phone 42 of user 22) contains a copy of second software module 77, for example, then first software module 67 may send the portion of the personal information to the copy of second software module 77 on the third party mobile phone (e.g., mobile phone 42 of user 22) for example, through mobile phone network 40, the Internet, or both.

The invention also provides various methods of managing information for a number of users, methods of authorizing actions, methods of authenticating transactions, methods of authenticating access, and methods of alarming as to proximity to a location. FIGS. 2 to 4A illustrate examples of such methods, and different methods in accordance with the invention may include a selection of the operations or acts shown in FIGS. 2 to 4A, described herein, or both, which may be performed or accomplished in the order presented, or in many embodiments, in a different order.

Turning now to FIG. 9, this figure is a flowchart illustrating an example method of managing information for a number of users using the Internet and mobile phones of the users. Some methods of the invention can include some of the acts shown in FIG. 9. In the particular embodiment illustrated, method 900 includes receiving information from a user (act 905). This may include, in some embodiments, at least for each of a plurality of the users, receiving a first set of personal information (e.g., of the user) from the user through at least one of the Internet and the mobile phone of the user.

For example, user 23 shown in FIG. 1 may go to or access website 65 through computer 13 and the Internet 10, may open an account, and may enter information, select options, etc. Information that may be entered or selected may include, for example, names of financial institutions, account numbers, names of airlines, frequent flyer numbers, names of insurance companies, insurance policy numbers, driver's license numbers, passport information, etc. In some cases, this personal information may be complete, while in other cases, the first set of personal information may include information to facilitate receipt or completion of information from one or more third parties (e.g., 31 to 33), such as by identifying the third parties, accounts, etc.

Further, in some embodiments, the first set of personal information includes identification of information that is important to the user, which may include a criteria for alarming. Such a criteria (e.g., received in act 905) may be entered by the user or selected from one or more menus, for example. The criteria may include, for instance, an election to receive an alarm if a withdrawal, debit, or charge from a financial account exceeds a threshold that is entered or selected by the user. In some embodiments, the criteria (e.g., received in act 905) may include a selection or indication of whether the user is to receive alarms throughout the day, or only during certain hours of the day, as another example, which may vary depending upon the nature of the alarm or the particular threshold. Other examples of alarms include whether travel departure times, departure locations, or the like, have changed, whether bills are due, whether insurance coverage has expired, whether stock prices have changed, whether weather conditions or forecasts, or other environmental conditions meet a certain criteria, whether a document or credential is about to expire, whether someone has requested a particular action or access, whether children have traveled into a region of concern, etc.

In certain embodiments, method 900 further includes downloading a mobile phone module (act 910). In some embodiments, for example, for at least a plurality of users, the user instructs the server (e.g., 15) or selects at a website (e.g., 65) to download a mobile phone module, for example, second software module 72 shown in FIG. 1. In a particular embodiment, for instance, second software module 72 is downloaded from first software module 61 through the Internet 10 and mobile phone network 40 to mobile phone 41, upon instruction by user 21. In other embodiments, software module 72 may be downloaded to mobile phone 43, for example, through the Internet 10, and computer 13, for instance, through a USB port or a wireless network. In other embodiments, software module 72 may be loaded onto the phone at a store where the mobile phone was purchased, or at an establishment of the entity that controls server 15, that operates website 65, or that provides a service or system of managing information for a number of users.

In a number of embodiments and methods of the invention, and in the particular one shown in FIG. 9, method 900 includes receiving information from third parties (act 915). In some embodiments, for example, for each of a plurality of the users, this act (915) includes receiving a second set of personal information of each user from at least one third party, for instance, through a network (e.g., the Internet 10). In many embodiments, this act (915) may be performed or accomplished, for a particular user, after receiving personal information (act 905) from that particular user, which may identify the third party, provide information with which the third party can identify the particular user, identify particular information that the particular user authorizes or requests be provided from the third party, identify bank accounts, etc.

In many embodiments, the user may directly request a third party to send the information. For example the user may visit a third party website (e.g., via the Internet 10), login to the third party website and provide information to the third party through the website to identify the user in system 100 (FIG. 1), which would also indicate the user's willingness for the third party to send the information. In various embodiments, the information received from the third parties (e.g., in act 915) may include one or more account balances, one or more descriptions of account transactions (e.g., an amount of a withdrawal, which may include, who the withdrawal is to), flight information, changes in flight information, insurance information, loyalty information, passwords, pass codes, calendar entries, navigational information, account numbers, bank card numbers, location information concerning regions of concern, etc.

In the embodiment illustrated, method 900 further includes selecting a fraction of the information (act 920). In some embodiments, a fraction of the information received from the third parties (e.g., in act 915) may be selected, for example, by the first software module 61. As used herein, "selecting a fraction" of certain information means selecting less than all of that information. For example, particular subsets or nuggets of the information may be selected. In some embodiments, the fraction of the information may be selected (e.g., in act 920) using a criteria that has been predefined (e.g., in module 61). In some embodiments, the fraction of the information may be selected (e.g., in act 920) using the criteria (e.g., received in act 905).

In various embodiments, in act 920, particular information is selected that is considered to be of particular importance or concern to the user. Examples include changes in departure time, status, or departure location for a flight that the user is booked on, withdrawals from an account that exceed a threshold, account balances, etc. In particular embodiments, for each of a plurality of the users, for instance, act 920 may include selecting a fraction of the second set of personal information described herein, while in various embodiments, act 920 may include selecting a fraction of the first set of personal information instead, or in addition.

Various embodiments and methods of the invention include encrypting the fraction of the information (act 925). The information that is encrypted may be the fraction of the information that is selected in act 920, for example. In some embodiments, a fraction of the second set of personal information in encrypted (e.g., in act 925), for example. Information may be encrypted (e.g., in act 925), for example, to maintain its confidentiality. Information may be encrypted (e.g., in act 925), for example, using PGP (pretty good privacy), public-key cryptography, asymmetric key encryption, or the like, as examples.

Further, various embodiments of the invention include compressing the fraction of the information (act 930). The information that is compressed may be the fraction of the information that is selected in act 920, for example. In some embodiments, a fraction of the second set of personal information in compressed (e.g., in act 930), for instance. Information may be compressed (e.g., in act 930), for example, to make it easier, quicker, or less expensive to transmit, store, or both.

In different embodiments, information may be compressed (e.g., in act 930), encrypted (e.g., in act 925), or both, in either order. In some embodiments, method 900 further includes, for each of a plurality of the users, before the transmitting of the fraction of the second set of personal information (e.g., act 935), for example, to the user's mobile phone, at least one of encrypting (e.g., act 925) the fraction of the second set of personal information (e.g., selected in act 920), and compressing (act 930) the fraction of the second set of personal information (e.g., selected in act 920). In certain embodiments, the encrypting (e.g., act 925), and the compressing (act 930), for example, of the fraction of the second set of personal information (e.g., selected in act 920), may be repeated, for instance, along with other acts, as described herein.

In the embodiment illustrated, method 900 also includes, as mentioned, transmitting information (act 935). Such information may include, for example, the fraction of the second set of personal information (e.g., selected in act 920). In various embodiments, the receiving (act 905), for example, of the first set of personal information, the receiving (act 915), for example, of the second set of personal information, the selecting of the fraction (act 920), and the transmitting of the fraction (act 935), are all performed by the first software module 61 residing on server 15 connected to the Internet 10. And in some embodiments, the first software module 61 further forms the (at least one) Internet website 65. In some embodiments, methods include, for example, for each of a plurality of the users, transmitting the fraction (e.g., selected in act 920) of the second set of personal information to the user's mobile phone, for example, through the mobile phone network (e.g., network 40 shown in FIG. 1) for storage on the user's mobile phone, for instance, using second software module 72 (e.g., residing on the phone).

In this embodiment, method 900 further includes evaluating whether information satisfies a criteria (act 940). Such a criteria may be, as described herein, or provided or selected by the user (e.g., in act 905). If the information (e.g., the fraction of the information selected in act 920, transmitted in act 935, or both) satisfies the criteria (e.g., for alarming, for instance, as determined in act 940), then an alarm may be provided (act 945). In some embodiments, the method includes, for each of a plurality of the users, for example, using the second software module, providing an alarm to the user (act 945) if at least a portion of the fraction of the second set of personal information satisfies the criteria. Such an alarm (e.g., of act 945) may be audible, visual, or, for example, in the form of a vibration. In some embodiments, a sound or vibration may be produced by the mobile phone of the user (e.g., in act 945), and the reason for the alarm may be displayed on the screen of the phone, for instance. In some embodiments, the default ring tone of the phone or an existing phone ring setting may be used for the alarm (e.g., in act 945), as examples.

In some embodiments, the user may be prompted to acknowledge the alarm or the description of the reason for the alarm, or may be asked to make a response or take an affirmative action to provide consent, for example, for the reason for the alarm or an event described in the description. For example, if the reason for the alarm is that a withdrawal has been made from the user's bank account, the mobile phone may ring or vibrate. The user may then open the phone or press a button on the phone to acknowledge the alarm. The phone may then display the amount of the withdrawal, for example, along with a description of the account, and of the transaction. In some embodiments, the user may be asked to make a selection to provide consent to the withdrawal, for instance. In another scenario, the phone may ring to provide an alarm that the user's flight has been delayed, as another example. The user may open the phone to acknowledge the alarm, and a brief description of the delay, and new estimated departure time, may be provided on the screen of the mobile phone, for instance. Other examples are described herein.

In some such methods, for example, for each of a plurality of the users, the first set of personal information (e.g., received in act 905) includes an identification of at least one financial account, the second set of personal information (e.g., received in act 915) includes an identification of deposits into the account, withdrawals from the account, and a balance of the account, and, the providing of an alarm (act 945) includes at least one of alarming if a withdrawal exceeds a first threshold identified within the criteria, and alarming if the balance of the account drops below a second threshold identified within the criteria. As used herein, such a "withdrawal" may be a debit from or a charge to the account, as examples.

As another example, in some methods, for each of a plurality of the users, the first set of personal information (e.g., received in act 905) includes at least one of travel information (e.g., frequent flyer information such as a frequent flyer identification number) and an identification of at least one of a common carrier and a travel agent. Further, in some embodiments, the second set of personal information (e.g., received in act 915) includes travel itinerary, which may include identification of a departure time and a departure location, for example. And the providing of an alarm (act 945) may include alarming if there is a change in at least one of the departure time and the departure location, in some embodiments. In many embodiments, if the information (e.g., the fraction of the information selected in act 920, transmitted in act 935, or both) does not satisfy the criteria (e.g., for alarming, for instance, as determined in act 940), then an alarm may not be provided, and act 945 may be skipped, at least for that particular iteration of method 900.

In various embodiments, method 900 further includes transmitting information to a different party (act 955). In many such embodiments, the user may (e.g., first) select, or otherwise provide instructions or commands to send certain information to the third party (evaluated in act 950). In particular, in some embodiments, (e.g., in the order indicated or in another order), for at least a plurality of the users, method 900 may include, upon instruction by the user (e.g., evaluated in act 950), transmitting (e.g., in act 955) at least a portion of the second set of personal information (e.g., received in act 915, selected in act 920, transmitted in act 935, or a combination thereof) to a different party mobile phone. In some embodiments, this may be accomplished through the mobile phone network (e.g., 40) for storage on the different party mobile phone, for instance, for access by the different party.

Referring to FIG. 1 for an example, user 21 may provide an instruction or command (e.g., in act 950), for instance, through user 21's mobile phone 41, to send at least a portion of the information received (e.g., in act 935), to different user 22, specifically, via mobile phone 42. In different embodiments, mobile phone 41 may send the portion of the information to mobile phone 42, for example, through mobile phone network 40, or mobile phone 41 may instruct server 15 or first software module 61 to send the portion of the information to mobile phone 42, for instance, through the Internet 10, mobile phone network 40, or both, as examples. In some embodiments, delivery may be certified, or delivery may be tracked and the sender may be notified when delivery has been accomplished, or alternatively, when delivery has been unsuccessful.

In some embodiments, the first software module 61 receives a command (e.g., in act 950) from the user (e.g., 21), for instance, through mobile phone network 40, and upon the receipt of the command (e.g., in act 950), transmits (e.g., in act 955) at least a portion of the nuggets (e.g., 78) or fraction of the personal information to the different party (e.g., 22) through the Internet 10. In some embodiments, the system (e.g., system 100) may send the particular information, fraction thereof, or nuggets in different ways (e.g., in act 955), depending on whether the different party is a user of system 100 [e.g., has visited website 65 and elected to have their personal information managed by system 100, or has downloaded (e.g., act 910) or otherwise received, or has installed, the second software module 72 on their mobile phone].

In some embodiments, the user (e.g., 21) may select (e.g., in act 950) at least a portion of the personal information that is stored on the mobile phone (e.g., 41), select or enter (e.g., in act 950) an identifier of at least one of a different party (e.g., 22) and a different party mobile phone (e.g., 42), and elect (e.g., in act 950) to send (e.g., in act 955) the at least a portion of the personal information to the different party mobile phone (e.g., 42). In many embodiments, the first software module 61 evaluates whether the different party mobile phone (e.g., 42) contains a copy of the second software module 72, and if the different party mobile phone (e.g., 42) contains a copy of the second software module 72, then the first software module 61 sends (e.g., in act 955) the portion of the personal information to the copy of the second software module 72 on the different party mobile phone (e.g., 42), for example, through the mobile phone network 40 (e.g., by SMS). In some embodiments, delivery may be certified, or a notification message may be sent (e.g., by SMS to user 21) when delivery has been accomplished, or alternatively, after a certain amount of time or number of attempts when delivery has been unsuccessful.

In particular embodiments, for example, the portion of the second set of personal information (e.g., transmitted in act 955) includes a travel itinerary, for instance. Thus, a user is able to conveniently send their travel itinerary to another person. In FIG. 9, in many embodiments, if the user does not instruct particular information to be sent to a different party, then the act of transmitting information to a different party (act 955) is omitted, at least for that iteration of method 900.

Still referring to FIG. 9, in many embodiments of the invention, and in the embodiment illustrated, method 900 further includes receiving a local signal (act 960), transmitting a local signal (act 965) or both. As used herein, a local signal is a signal that is transmitted and received without going through the main transmitter that the mobile phone uses for placing telephone calls and without going through the main receiver that the mobile phone uses for receiving telephone calls. Similarly, a local signal does not go through the mobile phone network (e.g., 40). For example, a local signal from mobile phone 42 may be transmitted by local transmitter or communications device 82 and received (i.e., directly) by reader or communications device 88, or vice versa. Examples of local signals include near field communication (NFC) signals and Bluetooth communication signals, for example, that use transmitters, receivers, or both (e.g., device 82), on the mobile phone that are separate from the transmitter and receiver that are used for telephone conversations.

In particular embodiments, method 900 further includes, for each of a plurality of the users, using signal receiving hardware (e.g., device 82 shown in FIG. 1) located on the user's mobile phone (e.g., 42), and using the second software module (e.g., 72), under the control of the user (e.g., user 22), receiving (e.g., in act 260) a local signal from a transmitter (e.g., device 88) within proximity to the mobile phone (e.g., 42). Further, some embodiments of the invention include, for example, for each of a plurality of the users, using local signal transmitting hardware (e.g., device 82) located on the user's mobile phone (e.g., 42), and using the second software module (e.g., 72), under the control of the user (e.g., 22), transmitting a local signal (e.g., in act 965) that includes at least a portion of at least one of the first set of personal information (e.g., received in act 905) and the second set of personal information (e.g., received in act 915) to a reader (e.g., device 88) within proximity to the mobile phone (e.g., 42). As used herein, "proximity", in this context, means within ten (10) feet, and "close proximity" means within one (1) foot.

In the embodiment illustrated, method 900 further includes organizing certain information (act 970), for example, information that is handled by system 100. For example, in many embodiments of the invention, the second software module 72 organizes (act 970), at the mobile phone (e.g., 41), the fraction (e.g., nuggets 78, 79, or both) of the second set of personal information (e.g., selected in act 920 and transmitted in act 935), which may include, in various embodiments, where applicable, decrypting the information, decompressing the information, making the fraction of the second set of personal information accessible to the user (act 975), for instance, on the user's mobile phone, or a combination thereof. In some embodiments, for each of a plurality of the users, the second software module (e.g., 72) organizes (act 970) the fraction of the second set of personal information based on topic and makes the fraction of the second set of personal information (e.g., nuggets 78, 79, or both) accessible (act 975) to the user (e.g., 21), for instance, based on the topic of the information (e.g., in folder or folders 76).

In various embodiments of the invention, some or all of the acts of method 900 may be repeated. For example, in some embodiments (e.g., for each of a plurality of the users) method 900 may involve repeating, at least a plurality of times, the receiving (act 915), for example, of the second set of personal information, the selecting of the fraction (act 920), and the transmitting of the fraction act 935). In many embodiments, where applicable, the encrypting (act 925), compressing (act 930), providing of an alarm (act 945), transmitting of information to a different party (act 955), receiving or transmitting (or both) of local signals (acts 960, 965, or both), the organizing of the information (act 970), the providing of the information to the user (act 975) or a combination thereof, may be repeated, as appropriate. Further, in some embodiments, the receiving of information from the user (act 905) may be repeated, but may be repeated less often than certain other acts, such as the receiving of information from third parties (act 915), for instance.

In many embodiments (e.g., for each of a plurality of the users), the repeating includes (e.g., as part of act 970) replacing at least a portion of the fraction of the second set of personal information that is stored on the user's mobile phone, while maintaining the organization of the information, for instance, based on the topic of the information. Further, in various embodiments, for each of a plurality of the users, the repeating includes (e.g., as part of act 970) synchronizing at least a portion of the fraction of the second set of personal information that is stored on the user's mobile phone with corresponding personal information that was already stored on the mobile phone, while maintaining the organization of the information based on the topic of the information. As used herein, "synchronizing" of information includes both replacing and appending the information, while sorting or maintaining a sorted organizational structure based on topic. Topics may include, for example, travel information, account information (which may be sorted for different accounts), bank card information, loyalty information, insurance information, etc.

In some embodiments, the mobile phone (e.g., software module 72 on phone 41) may lock the user (e.g., 21, or another user who might not be authorized) from accessing information if the software (e.g., 72) or the phone (e.g., 41) has not been used for a specified period of time, or if the user has repeatedly failed to provide the correct password for the software (e.g., 72). In other embodiments, the software (e.g., software module 72 on phone 41) may provide the GPS coordinates of the phone (e.g., to module 61 on server 15) at regular intervals, upon accessing or exiting the software (e.g., 72), upon accessing the phone (e.g., 41), upon turning the phone off, upon turning the phone (e.g., 41) on, upon running out of battery, or a combination thereof, as examples.

Further, in some of these embodiments, for yet another example, the first software module (e.g., module 61) includes programming instructions to receive (e.g., in act 905) instructions from the user identifying at least one threshold for alarm (e.g., used in act 940) for at least a portion of the particular information (e.g., nugget 78). In some of these embodiments, at least one of the first software module (e.g., 61) and the second software module (e.g., 72) includes programming instructions to compare (e.g., in act 940) at least a portion of the particular information to the threshold. And in some such embodiments, at least one of the first software module (e.g., 61) and the second software module (e.g., 72) includes programming instructions to provide an alarm (e.g., in act 945) to the user if the particular information passes the threshold (e.g., in act 940).

In a number of embodiments, such examples of method 900 also include, for each of a plurality of the users (e.g., users 21 to 23 shown in FIG. 1), sending (e.g., in act 935) the particular information to the user's mobile phone (e.g., phone 41 of user 21) through a mobile phone network (e.g., 40) for storage on the user's mobile phone (e.g., 41) and access by the user (e.g., 21). In some embodiments, the particular information that is sent may be, contain, or be similar to, the nuggets (e.g., 78 and 79, and may be stored, for example, within folder 76, by module 77, for example). In some embodiments, software module 67 on server 15 may be a sorting software module, and may perform or initiate the acts of receiving the e-mails (e.g., act 915), searching for keywords or identifying numbers (or both) and extracting the particular information (e.g., in act 920), and in some embodiments, transmitting or sending (e.g., act 935) the particular information. In some embodiments, the particular information may be the same or similar to the fraction of the information described herein, for example, with reference to acts 920 to 935.

In many embodiments, method 900 also includes acts of repeating, for example, multiple times, the searching (e.g., part of act 920), the extracting (e.g., part of act 920), and the sending (e.g., act 935). Various embodiments of such methods may be performed in various orders and may include additional acts. For example, in some embodiments, method 900 may include, (e.g., for each of a plurality of the users 21 to 23), after the extracting of the particular information (e.g., in act 920), and before the sending of the particular information (e.g., in act 935), for example, to the user's mobile phone (e.g., 41 to 43), acts of encrypting the particular information (act 925), compressing the particular information (act 930), or both.

In particular embodiments, (e.g., for each of a plurality of the users), method 900 may include acts of receiving instructions (e.g., in act 205) from the user (e.g., one of users 21 to 23), and identifying at least one criteria or threshold for alarm for at least a portion of the particular information. In some such embodiments, after the extracting of the particular information (e.g., act 920), method 900 may include comparing (e.g., in act 940) at least a portion of the particular information to the criteria or threshold for alarm, and providing an alarm (e.g., in act 945) to the user (e.g., one of users 21 to 23) if the particular information satisfies the criteria or passes the threshold, as examples.

Still other embodiments include, (e.g., for at least a plurality of the users 21 to 23), upon instruction by the user (e.g., user 21), transmitting (e.g., act 955) at least a portion of the particular information to a third party (e.g., 22) mobile phone (e.g., 42) for instance, through mobile phone network 40, for storage on the third party mobile phone (e.g., 42), for access by the third party (e.g., user 22). In some such embodiments, the at least a portion of the particular information (e.g., transmitted in act 955) does not include a complete e-mail (e.g., an e-mail received by user 21 or by module 67, and forwarded to user 22). As an example, in some embodiments, the (at least a portion of the) particular information includes a travel itinerary (e.g., of user 21). Thus, user 21 can easily send his travel itinerary (or other of the particular information) to another person, to facilitate such communication.

Turning now to FIG. 10, this flowchart illustrates, among other things, an example method of authorizing an action and authenticating access. Most of the various acts of the method 1000 may be performed in an automated process, for instance, by server 15, module 61, or both, shown in FIG. 1. In various embodiments, method 1000 may be performed by a company or business, for instance, as a service for other companies or businesses, or the like.

In FIG. 10, method 1000 includes receiving (act 1003), for example, from a person having authority to authorize the action, an identification of a first phone number for obtaining authorization for the action. Such a person having authority to authorize the action may be, for example, one of users 21 to 23 shown in FIG. 1. In some embodiments, the person having authority to authorize the action may provide the phone number (e.g., received in act 1003) through their computer or mobile phone, for example. For instance, if user 23 is the person having authority to authorize the action, user 23 may provide the phone number (e.g., received in act 1003) of phone 43 via phone 43 or via computer 13 and website 65.

In some embodiments, the person having authority to authorize the action may enter or key in the phone number directly, while in other embodiments, the person (e.g., user 23) may enter or select a name, for example, or other identifier or indicia, which may be used (e.g., in act 1003, for instance, by server 15 or module 61) to look up the appropriate phone number (e.g., of phone 43). In some embodiments, the person having authority to authorize the action may select the phone number, for example, from a menu, or the number may be read automatically from the person's phone or from a caller ID feature or service when the phone is used. As used herein, all such are examples of acts (e.g., 1003) of receiving, from a person having authority to authorize the action, an identification of a first phone number for obtaining authorization for the action.

Still referring to FIG. 10, method 1000 also includes an act (1009) of receiving, for instance, from a person seeking the action, a request for authorization of the action. In different embodiments, acts 1003 and 1009 may occur in either order, including, for example, the order shown in FIG. 10. In different embodiments or different situations, the person seeking the action (e.g., who requests authorization in act 1009) and the person having authority to authorize the action (e.g., who provides the number in act 1003) may be the same person, or may be different people (e.g., of users 21 to 23).

After the receiving of the identification of the first phone number (e.g., in act 1003), and after the receiving of the request for authorization (e.g., act 1009), in the embodiment illustrated, method 1000 also includes an act (1015) of sending a first message, for example, through a mobile phone network (e.g., 40 shown in FIG. 1) to a first mobile phone, for instance, having the first phone number. In such embodiments, the first message (e.g., of act 1015) may include a description of the action for which authorization is requested, for example. In some embodiments, the first phone message is sent (e.g., in act 1015) automatically, meaning herein that other than making the request for authorization (e.g., received in act 1009), and providing the number and any criteria (e.g., received in one or both of acts 1003 and 1009), no human interaction is involved (i.e., between acts 1009 and 1015).

In addition, in the embodiment illustrated, after the sending of the first message (e.g., after act 1015), method 1000 includes an act (1021) of receiving, for example, from the first mobile phone, (i.e., having the first phone number) a second message, which may authorize the action. In various embodiments, the second message (e.g., received in act 1021) may be the result of the person who controls the phone taking an affirmative action to indicate authorization of the action (act 1018). Act 1018 may be performed, by one of users 21 to 23 shown in FIG. 1, for example.

In some embodiments, the first message (e.g., of act 1015) includes at least one menu and at least one prompt to authorize the action by making a selection from the menu. The person who controls the phone may take an affirmative action to indicate authorization of the action (act 1018) by making a selection from the menu, for example. In some embodiments, authorization is indicated (act 1018) and the second message authorizing the action is sent (e.g., which is received in act 1021) by pressing, for example, a single button on the mobile phone, after the first message (e.g., sent in act 1015) is received by the mobile phone. As used herein, "pressing a single button" does not include such actions such as opening a flip phone, scrolling to view a message, or pressing "send". In other words, when determining how many buttons have been pressed, opening a flip phone, scrolling to view a message, or pressing "send", are not counted.

In some embodiments, the first message (e.g., sent in act 1015), the second message (e.g., received in act 1021), or both, are SMS messages. One or both (e.g., of the first and second messages sent in act 1015 and received in act 1021, respectively) may be transmitted (e.g., sent and received) through the mobile phone network (e.g., 40 shown in FIG. 1). Further, in some embodiments, the first message, (e.g., sent in act 1015), the second message (e.g., received in act 1021), or both, are voice message, as further examples, which may be computer generated, interpreted using voice recognition software, or both, as examples. In some embodiments, the first message (e.g., sent in act 1015), may be a voice message, while the second message (e.g., received in act 1021), is an SMS message. Other embodiments may have other combinations.

In the embodiment illustrated, method 1000 also includes an act (1027) of evaluating whether the second message (e.g., received in act 1021) authorizes the action. If so, then (in act 1030) the action may be allowed, facilitated, or performed, as examples. Some embodiments include an act of allowing the action (act 1030) only if the second message is received (e.g., in act 1021) and the second message authorizes the action (e.g., as determined in act 1027). Some embodiments further include repeating the receiving of the request for authorization of the action (e.g., act 1009), the sending of the first message (e.g., act 1015), and the receiving of the second message (e.g., act 1021). These acts may be repeated, for example, for requests for different actions, requests for the same action for different people, requests for the same action or same person at different times, etc.

Further still, some of these embodiments further include an act (1012) of encrypting the first message, for example, before the sending of the first message (e.g., act 1015), for instance, to the first mobile phone. Some embodiments also (or instead) include an act (1024) of decrypting the second message, for example, after the receiving of the second message (e.g., act 1021), for instance, from the first mobile phone. In such embodiments, the first mobile phone may decrypt the first message and encrypt the second message, as examples. In some embodiments, compression and decompression may also (or instead) be utilized.

In some embodiments, prior to the receiving of the request for authorization of the action (e.g., act 1009), the first phone number is received (e.g., in act 1003) through an Internet website (e.g., website 65 via the Internet 10 shown in FIG. 1), the mobile phone network (e.g., 40), or both. Some embodiments further include an act (1006) of receiving, for instance, through an Internet website (e.g., website 65 via the Internet 10) or a mobile phone network (e.g., 40), or both, for example, from each of at least a plurality of persons having authority to authorize the action, an indication of a criteria for obtaining authorization for the action, for instance, for that particular person. Such a criteria may be typed in or entered verbally by the person, or may be selected by the person from one or more menus, for example. In some embodiments, act 1006 may be similar to act 205 shown in FIG. 9 and described herein. Further, in some embodiments, act 1003 may be included within act 1006 or vice versa, or acts 1003 and 1006 may be performed in another order.

As an example, in some embodiments of method 1000, act 1006 includes receiving, for instance, from the person having authority to authorize the action, through at least one of the Internet website (e.g., website 65 via the Internet 10 shown in FIG. 1) and the mobile phone network (e.g., 40), an identification of time limits for sending the first message (e.g., in act 1015). In many such embodiments, the sending of the first message (e.g., act 1015) may be performed only in accordance with the time limits. For example, in some embodiments, the person may not want to be prompted for certain kinds of authorization during certain nighttime hours, and may enter a criteria or make selections accordingly.

In a number of embodiments, the person who controls the phone (e.g., who is in a position to indicate authorization in act 1018) is, in fact, or is intended to be, the person having authority to authorize the action (e.g., from whom the number was received in act 1003, criteria was received in act 1006, or both). In other embodiments, the person who controls the phone is, in fact, or is intended to be, a person who is authorized by the person having authority to authorize the action (e.g., from whom the number was received in act 1003, criteria was received in act 1006, or both). Further, some embodiments provide certain assurances that the person who controls the phone is the correct person.

For example, in some embodiments, the second message (e.g., received in act 1021) includes a password or an authorization code which has been memorized by the person having authority to authorize the action and keyed into the first mobile phone (e.g., in act 1018) after receiving the first message (e.g., sent in act 1015) and before sending the second message (e.g., received in act 1021). As another example, certain embodiments include, for example, in the first message (e.g., in act 1015), an act of asking a personal question about the person having authority to authorize the action who is expected to be in control of the mobile phone. Such embodiments may also include, in the second message (e.g., in act 1021), an act of receiving a present answer to the personal question. Such embodiments may further include (e.g., in act 1027) an act of comparing the present answer to a previous answer to the personal question provided (e.g., in act 1006), for instance, by the person having authority to authorize the action.

In a number of embodiments, the first message (e.g., sent in act 1015) identifies the person seeking the action. And in some embodiments, the first message (e.g., sent in act 1015) also (or instead) identifies the action being requested (e.g., in act 1009). Such information may be valuable, for example, in embodiments or situations where the person requesting the authorization (e.g., in act 1009) is different than the person who has the authority to authorize the action (e.g., that provided the number received in act 1003, to which the first message was sent in act 1015, who indicates the authorization in act 1018, etc.). In some embodiments, on the other hand, the first mobile phone is controlled by the person seeking the action (e.g., who requests the authorization received in act 1009), and in some embodiments, the person seeking the action (e.g., who requests the authorization received in act 1009) is the same person having authority to authorize the action (e.g., in act 1003, act 1018, or both).

Moreover, some embodiments further include an act (e.g., within act 1006) of receiving, from the person having authority to authorize the action, for instance, through the Internet website (e.g., website 65 via the Internet 10 shown in FIG. 1) or the mobile phone network (e.g., 40), or both, an identification of a second phone number for advising a third person of the action (e.g., the action for which a request is received in act 1009, which is allowed in act 1030, or both). Some such embodiments include an act (e.g., 1033), for example, after receiving the request for authorization (e.g., in act 1009), of automatically sending the first message, the second message, a third message, or a combination thereof (e.g., in act 1033), to the second phone number. The act (1033), of notifying the third parson, may include, for example, sending a description of the action for which authorization is requested, identifying the person requesting the action (e.g., in act 1009), or both, as examples.

In the embodiment illustrated, method 1000 further includes act 1036 of tracking the authorization granted for the action over time, which may include reporting results of the tracking. For example, a report may be issued which may indicate which authorizations were requested (e.g., in act 1009), when authorizations were requested, who requested such authorizations, whether and when authorizations were granted (e.g., in act 1018), and whether or when actions were allowed (e.g., in act 1030). In some embodiments, such a report or data may be provided (e.g., in act 1036) to or through the (e.g., first or second) mobile phone, for example, as SMS messages or nuggets of information described herein, as examples.

In some embodiments, information may be provided via a local signal (received in act 1007). Act 1007 may be similar to act 260 shown in FIG. 9 and described herein with reference thereto. A local signal may be received (e.g., in act 1007), for example, via local communications devices 88 and 82 shown in FIG. 1 and described herein with reference thereto, wherein device 88 is receiving and device 82 is transmitting. A local signal may be received (e.g., in act 1007), via NFC, for instance, and may be received (e.g., in act 1007) when the mobile phone is passed by a reader (e.g., device 88).

In different embodiments, different types of actions are requested (e.g., in act 1009), authorized (e.g., in act 1018), and allowed (e.g., in act 1030). Some embodiments are limited to particular types of actions. For example, some actions involve providing access, physical or otherwise, and some embodiments involve transfer of funds or money from one entity or account to another, for instance. As a specific example, in some embodiments, the action is granting of computer access to electronically stored information, and the person seeking the action (e.g., requesting the authorization in act 1009) is seeking the computer access to the electronically stored information. Embodiments of method 1000 may be used to provide computer access, for example, instead of a password, if a password has been forgotten, or in addition to a password, for example, to provide an added level of security in case an unauthorized user has obtained the password. In some such embodiments, the first message (e.g., of act 1015) may include a description of the computer access or electronically stored information for which authorization is requested.

In another example, the action is granting of physical access to a controlled space and the person seeking the action (e.g., requesting the authorization in act 1009) is seeking the physical access to the controlled space. Physical access may be controlled, for example, to a building, part of a building, a floor of a building, a room, an enclosure, a compound, a storage area, a parking area, a road, furniture such as a desk or filing cabinet, a safe, etc. In such embodiments, physical access may be allowed (e.g., in act 1030), for example, by electronically unlocking or opening a door, gate, or compartment, by allowing an elevator to reach a particular floor, etc. In such embodiments, the first message (e.g., of act 1015) may include a description of the room, floor, building, space, etc., for which authorization for access is requested.

In another specific example, in particular embodiments, the action (e.g., requested in act 1009, authorized in act 1018, allowed in act 1030, or a combination thereof) is (or includes) a financial transaction, the first message (e.g., sent in act 1015) includes an amount of the transaction, and the second message (e.g., received in act 1021) includes an authorization (e.g., from act 1018) of the transaction. Some such embodiments include (e.g., in act 1006), receiving from the person having authority to authorize the action, for example, through an Internet website (e.g., website 65 via the Internet 10 shown in FIG. 1) or a mobile phone network (e.g., 40), or both, an identification of a threshold monetary value of transactions. In some such embodiments, the first message is sent (e.g., act 1015) for transactions exceeding the threshold, and transactions below the threshold are approved or authorized without sending the first message (e.g., without acts 1012 through 1027).

Further, in some embodiments, the transaction is (or includes) a withdrawal or a debit from a bank account and the person having authority to authorize the action is an authorized user of the account. Thus, in some embodiments, a user (e.g., 21 to 23 shown in FIG. 1) can elect (e.g., in selecting or indicating the criteria that is received in act 1006) to be notified via their phone (e.g., 41 to 43) of large withdrawals or debits (e.g., in act 1015), but not to be bothered (e.g., by a first message sent in act 1015) with smaller (e.g., routine) withdrawals or debits. Furthermore, in a number of embodiments, the user must authorize (e.g., in act 1018) the larger transactions, thus protecting the user, the bank (or other financial institution), or both from losses resulting from unauthorized withdrawals or debits.

Turning now to FIG. 4A, this flowchart illustrates an example method of providing positional awareness, for instance, of a particular individual using mobile phones. In the embodiment illustrated, method 400 includes acts of obtaining (act 416) and storing (act 420) location information. Particular embodiments include (at least) the act of obtaining (act 416) or storing (act 420) (or both) at least one location coordinate defining at least one region of concern, for example. Such location coordinates may be (or include) global positioning system (GPS) coordinates, for example, latitude and longitude, grid coordinates, elevation, coordinates or distances from one or more known points, Cartesian coordinates, polar coordinates, or the like, as examples.

A region of concern may be defined by one such coordinate and a distance therefrom, by more than one coordinate and a distance therefrom (e.g., by two coordinates defining a line segment and a distance therefrom), or by three, four, or more coordinates, which may define a perimeter or parcel of land (e.g., four coordinates defining corners of squares or rectangles), as examples. In other embodiments, street addresses may be used. Location information or coordinates defining regions of concern may be obtained, for example, from a third party (e.g., 31 to 33 shown in FIG. 1), from an Internet website, through Internet 10, from a user (e.g., 21 to 23), or the like. In some embodiments, there may be a number of locations, regions of concern, coordinates, or the like, which may correspond to different regions of concern, which may be of concern for different reasons, in certain embodiments.

In the embodiment illustrated, method 400 also includes monitoring the location of a first mobile phone (act 424), which may be possessed by a particular individual, for example. Such monitoring may be, for example, continuous, at regular intervals of time, during certain times of the day, or the like, which may be selectable by the user in some embodiments. In some embodiments, the frequency of monitoring may be increased if the particular individual is near a region of concern. In the embodiment illustrated, method 400 also includes evaluating whether the first phone is near or within a region (act 428), for example, of concern, and providing an alarm (act 432), for example, through a second mobile phone, when the first mobile phone passes into a region of concern, or within a predetermined distance of a region of concern. Such a predetermined distance may be, for example, 25 feet, 50 feet, 75 feet, 100 feet, 200 feet, 300 feet, 500 feet, or the like, and may be user selectable, in some embodiments. In addition, or instead of alarming at the second phone, in some embodiments, an alarm may be provided (e.g., in act 432) at the first mobile phone, which may be the same or a different alarm, in different embodiments.

An alarm may be provided (e.g., in act 432) in a manner similar to other alarms described herein, for example, in act 245 shown in FIG. 9, or may be similar to the notification of the third person (act 333) or the first message (e.g., sent in act 315) shown in FIG. 10, or a combination thereof. An alarm (e.g., provided in act 432) may include a typical ringing of the phone, making a particular ring tone, a text or SMS message, a vibration, a synthetic voice message, one or more lights, or a combination thereof, as examples. The nature of the alarm (e.g., provided in act 432) may be selectable by the user, in many embodiments, for example, in an act similar to act 205, act 306, or both. In some embodiments, the alarm (e.g., provided in act 432) may identify the first phone, the person to which the first phone is assigned, the phone number of the first phone, a name of the region of concern, the reason why the region is of concern, how far away from the region of concern the first phone is located, uncertainty associated with such information, etc.

In some such embodiments, for example, the location coordinate (e.g., obtained in act 416, stored in act 420, or both) is for a reported residence of a registered sex offender.

In some such embodiments, the first phone (e.g., of which the location is monitored in act 424) may be assigned to or used by a child, and the second phone (e.g., which receives the alarm in act 432) may be assigned to a parent or guardian of the child. Thus, the parent or guardian may be alerted (e.g., automatically) if the child enters or approaches the residence of a registered sex offender. In some embodiments, the alarm (e.g., provided in act 432) may indicate that the region of concern is the residence of a registered sex offender, in some embodiments, including details of the offender, crimes that he has been convicted or accused of, a description of him, a picture of him, etc.

In some embodiments, registered residences of a number of registered sex offenders may be obtained (e.g., in act 416), for example, through the Internet 10, for instance, from one or more governmental websites, which may be converted into coordinates, for example, demarking the property boundary, the center of the property, or the like. Location information may be stored (e.g., in act 420), for instance, on server 15, in storage 64, by software module 61, or the like, which may be temporary storage, for example, for the area in which the first mobile phone is located. Other information included in alarms (e.g., provided in act 432) may be obtained from the website(s) as well, in act 416, or both.

In other embodiments, regions of concern may be for other threats, such as traffic hazards, pollution or toxic waste sites, areas of high radioactivity, industrial areas, neighborhoods with high crime rates, gang-controlled areas, quarantine areas, areas with insect infestations, high-drug use or dealing areas, bars, adult establishments, houses of prostitution, gambling establishments, construction areas, areas of severe weather, areas of fighting in theater of war, forbidden areas, foreign territory, private land, areas below high tide, areas where rip-tides occur, areas of shallow water, coastlines, or other maritime navigational hazards, etc. Besides protecting children, embodiments may notify (e.g., in act 432), protect, or both, individuals with substance abuse, alcohol, or gambling problems, police officers, fire fighters, probation officers, parole officers, census workers, soldiers, delivery personnel, salesmen, missionaries, sailors, etc. In some embodiments, the alarm (e.g., provided in act 432) may be provided to the first phone, in addition to, or instead of the second phone.

In some embodiments, special software may be provided on one or more mobile phones to accomplish certain acts of the method (e.g., method 400). For instance, a number of embodiments of method 400 further include, for example, the acts of providing a first mobile phone software module for installation on the first mobile phone (act 404), providing a second mobile phone software module for installation on the second mobile phone (act 408), or both. In some such embodiments, the first mobile phone software module (e.g., provided in act 404) includes programming instructions for the monitoring (e.g., in act 424) of the location of the first mobile phone, for instance, possessed by the particular individual. And in some embodiments, the second mobile phone software module (e.g., provided in act 408) includes programming instructions for the providing of the alarm (e.g., in act 432), for example, through the second mobile phone when the first mobile phone passes into a region of concern or within the predetermined distance of a region of concern. In some embodiments, the first mobile phone software module (e.g., provided in act 404), the second mobile phone software module (e.g., provided in act 408), or both, may be similar, at least in some respects, or part of, the second software module 72 described herein, for example.

Particular embodiments of such methods (e.g., method 400) further include an act of obtaining or providing a third software module (act 412), for example, installed on at least one Internet server (e.g., 15) and forming at least one Internet website (e.g., 65). In some embodiments, the third software module (e.g., provided in act 412) may be similar, at least in some respects, or part of, the first software module 61 described herein, for example. In some of these embodiments, at least a plurality of users (e.g., users 21 to 23) visit the website (e.g., 65) through the Internet 10 and elect to be provided the alarm (e.g., in act 432) through their mobile phone, for example, through the second mobile phone. In various embodiments, information, criteria, selections, etc., may be received from the users (or potential users) for example, in acts similar to acts 205, 306, or both, shown in FIGS. 2 and 3 and described herein with reference thereto.

In a number of such embodiments, the third software module (e.g., obtained or provided in act 412) further contains instructions to download (e.g., in act 404), for instance, through mobile phone network 40, for example, to the first mobile phone, the first mobile phone software module. In many such embodiments, the first mobile phone software module (e.g., provided or downloaded in act 404), the third software module (e.g., obtained or provided in act 412), or both, includes programming instructions for the monitoring (e.g., in act 424) of the location of the first mobile phone, for instance, possessed by the particular individual. Further, in some such embodiments, the third software module (e.g., obtained or provided in act 412) further contains instructions to download (e.g., in act 408), for instance, through mobile phone network 40, for example, to the second mobile phone, the second mobile phone software module.

In many such embodiments, the second mobile phone software module (e.g., provided or downloaded in act 408) includes programming instructions for the providing of the alarm (e.g., in act 432), for instance, through the second mobile phone when the first mobile phone passes into the region of concern or within the predetermined distance of the region of concern. And in particular embodiments, the first mobile phone software module (e.g., provided or downloaded in act 404) also, or instead, includes programming instructions for the providing of the alarm (e.g., in act 432), or instance, through the first mobile phone when the first mobile phone passes into the region of concern or within the predetermined distance of the region of concern.

Moreover, in many embodiments, at least a plurality of the users (e.g., 21 to 23) enter (e.g., in act 416), for example, through the Internet website (e.g., 65) at least one location coordinate defining at least one region of concern. Thus, in different embodiments, some or all of the regions of concern may be of specific concern to the particular user. On the other hand, in some embodiments, the third software module (e.g., obtained or provided in act 412) further contains instructions to obtain from a third party website (e.g., from one or more of third parties 31 to 33), data with which to determine at least one location coordinate defining at least one region of concern. An example of such data includes street addresses, which may be used to determine longitude and latitude or GPS coordinates, for example. In some such embodiments, for example, the third party website contains reported residence addresses or locations for a plurality of registered sex offenders, there are at least a plurality of regions of concern (e.g., monitored in act 424), and at least a plurality of the regions of concern surround at least one of the reported residences of the registered sex offenders, as examples.

Some or all of the acts of method 400, or other methods described herein, may be repeated. For example, in many embodiments, location information may be obtained (e.g., act 416) and stored (e.g., act 420) periodically, when the first phone moves into another area, when new information becomes available, or the like. Further, in some embodiments, location information that is stored (e.g., in act 420) may be used many times (e.g., in acts 424 and 428, and if appropriate, in act 432) between instances when location information is obtained (e.g., in act 416). In a number of different embodiments, the acts illustrated or described may be combined in various combinations or with other acts or features (or both) described herein.

Referring now to FIGS. 3 and 4, in a particular embodiment provided as an example, SECURE INFORMATION MANAGEMENT (SMIM) includes a platform for system 100 which enables mobile phone users (e.g., 21 to 23) to have access to certain personal information via their mobile phone (e.g., 41 to 43), even when there is no signal or internet connection for the cell phone (e.g., from mobile telephone network 40). In this embodiment, SMIM includes one or more blocks of code that provide the framework and foundation of system 100 and encompasses functionality from defining standards under which development takes place to defining security, to communication between components and various core software applications.

In certain embodiments, SMIM includes MICRO AGENT and WEB SERVICES. In this example of an embodiment, MICRO AGENT runs on mobile phones, and is an example of the second software module 72, or a portion thereof, and WEB SERVICES is an example of first software module 61, or a portion thereof. In this example, WEB SERVICES is a block of code or software that runs on server 15 and that communicates with or exchanges data with MICRO AGENT on the phones, website 65, and secure storage 64, for example. WEB SERVICES may be a communication layer between MICRO AGENT, website 65, and storage 64, for instance. WEB SERVICES may provide or allow authentication, communication, protocol definition, auditing of the integrity of data, prevention of unauthorized access, and so on, and may allow access to website 65 from the Internet 10.

In some embodiments, local storage (e.g., folder 76 on mobile phone 41) enables the application (e.g., second software module 72) to store information (e.g., nuggets 78 and 79 of information) on the phone (e.g., 41), which may provide for faster access, reduce dependence on the network (e.g., mobile phone network 40, the Internet 10, or both), and may reduce the total cost of ownership by limiting the amount of data communication through mobile phone network 40 that takes place (e.g., at the expense of user 21). In some embodiments, the data (e.g., nuggets 78 and 79) on the phone (e.g., 41) is synchronized with data on server 15 to ensure that the user (e.g., 21) has access to updated information both on their phone (e.g., 41) and on the web (i.e., Internet 10, which may be accessed, at least by user 23, through computer 13, for instance).

Still another embodiment implements a method of eliminating a need to carry a card. This example of a method includes replacing an old component of a mobile phone with a new component. In some embodiments, the new component includes at least one of a back, a battery cover, a battery, and a case for the mobile phone, as examples. In some embodiments, the new component includes a magnetic code area configured to produce a magnetic code to be read by a card reader (e.g., device 88) when the phone is passed in close proximity to the card reader. Other embodiments may use a bar code, as another example.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present invention. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present invention, as set forth in the following claims.

What is claimed is:

1. A system for establishing a registration for secure communication between a server and an application on a mobile device, the system comprising:
    a software module configured to run as an application on a mobile device, wherein the mobile device has an associated phone number and the software module is configured to encrypt an SMS message or an MMS message via an encryption;
    wherein the application is configured to create registration information including at least one of a secure identification code and an encryption key for encrypted communication between a server and the application;
    wherein the mobile device, is configured to send to the server a first short messaging service (SMS) message or multimedia messaging service (MMS) message originated by the mobile device and to thereby reveal the phone number to the server;
    wherein the server is configured to verify the phone number of the mobile device originating the SMS or MMS message against a whitelist to authorize a registration between the mobile device and the server;
    wherein the mobile device is configured to, if the registration is authorized, receive a code sent by the server to the application on the mobile device via a second SMS message or MMS message; and
    wherein the mobile device is configured to, without user intervention, extract the code from the second SMS or MMS message and send at least one of the registration information and the code to the server.

2. The system of claim 1 wherein the registration information includes an encryption key for encrypting the second SMS or MMS message before being sent by the server.

3. The system of claim 1 wherein the application is configured to use a server public key to encrypt the registration information and the server is configured to decrypt the registration information using a server private key.

4. The system of claim 3 wherein the application is downloaded to the mobile device via a mobile network.

5. A system for VoIP communication over a mobile phone network, the system comprising:
- a server configured to communicate with a mobile device having a VoIP application on the mobile device;
- wherein the server is configured to send a message to the mobile device when there is a phone call waiting to connect to the mobile device;
- wherein the message comprises at least one of a short messaging service (SMS) message, a multimedia messaging service (MMS) message and a push notification; and
- wherein the message includes information to cause the mobile device to contact the server to receive the phone call.

6. The system of claim 5 wherein the push notification is provided via a mobile operating system manufacturer.

7. The system of claim 5 wherein the VoIP application is downloaded to the mobile device via at least one of an Internet and a mobile network.

8. The system of claim 5 wherein the server is configured to establish a registration between the mobile device and the server.

9. The system of claim 8 wherein the registration between the mobile device and the server is established using an encryption key between the mobile device and the server.

10. The system of claim 5 wherein communication between the server and the mobile device is secured by encryption.

11. The system of claim 5 wherein the mobile device is configured to contact the server using the VoIP application.

12. The system of claim 5 wherein the push notification message includes information to cause the VoIP application to contact the server to receive the phone call.

* * * * *